US007209904B1

(12) United States Patent
Abe

(10) Patent No.: US 7,209,904 B1
(45) Date of Patent: Apr. 24, 2007

(54) METHOD FOR SIMULATING AN OPTIMIZED SUPPLIER IN A MARKET

(76) Inventor: John R. Abe, 1755 Frobisher Way, San Jose, CA (US) 95124

( * ) Notice: Subject to any disclaimer, the term of this patent is extended or adjusted under 35 U.S.C. 154(b) by 148 days.

(21) Appl. No.: 10/652,640

(22) Filed: Aug. 28, 2003

(51) Int. Cl.
G06F 17/00 (2006.01)

(52) U.S. Cl. ...................................................... 705/400

(58) Field of Classification Search ................ 705/1, 705/10, 400, 7, 26
See application file for complete search history.

(56) References Cited

U.S. PATENT DOCUMENTS

| | | | |
|---|---|---|---|
| 5,377,095 A | 12/1994 | Maeda et al. ............... | 364/401 |
| 5,459,656 A | 10/1995 | Fields et al. ................ | 364/401 |
| 5,615,109 A | 3/1997 | Eder .......................... | 395/208 |
| 5,822,736 A | 10/1998 | Hartman et al. ............... | 705/1 |
| 5,873,069 A * | 2/1999 | Reuhl et al. .................... | 705/20 |
| 5,878,400 A | 3/1999 | Carter, III ..................... | 705/20 |
| 5,918,209 A | 6/1999 | Campbell et al. ............... | 705/5 |
| 5,987,425 A | 11/1999 | Hartman et al. .............. | 705/20 |
| 6,029,139 A | 2/2000 | Cunningham et al. ........ | 705/10 |
| 6,078,893 A | 6/2000 | Ouimet et al. ................ | 705/10 |
| 6,094,641 A | 7/2000 | Ouimet et al. ................ | 705/10 |
| 6,308,162 B1 | 10/2001 | Ouimet et al. ................. | 705/7 |
| 6,553,346 B1 * | 4/2003 | Walker et al. ................. | 705/1 |
| 6,553,352 B2 * | 4/2003 | Delurgio et al. ............ | 705/400 |
| 7,043,449 B1 * | 5/2006 | Li et al. .................... | 705/36 R |
| 2002/0116348 A1 * | 8/2002 | Phillips et al. .............. | 705/400 |
| 2003/0217016 A1 * | 11/2003 | Pericle ........................ | 705/400 |

FOREIGN PATENT DOCUMENTS

WO WO 00/52605 A1 * 9/2000

OTHER PUBLICATIONS

Unknown Author, The Dynamic Pricing Revolution, Aug. 2000, 18 pages.*
Office Action Summary from U.S. Appl. No. 10/644,949, which was mailed on Nov. 18, 2004.
Office Action Summary from U.S. Appl. No. 10/644,944 which was mailed on Dec. 8, 2004.
Office Action Summary from application No. 10/644,944 which was mailed on Nov. 17, 2006.

* cited by examiner

*Primary Examiner*—Thomas A. Dixon
(74) *Attorney, Agent, or Firm*—Zilka-Kotab, PC

(57) ABSTRACT

A computer-implemented method, system and computer program product are provided for simulating two or more suppliers in a market and forecasting their financial performance, with one supplier using optimization that utilizes feedback in generating an optimal price. In use, an optimal price is generated for the designated supplier. All suppliers compete in a simulated market place. A result of utilizing the optimal price is identified for the supplier with optimization and a reaction may then be carried out based on that result. The suppliers compete in a simulated market place again, and their financial performance recorded.

28 Claims, 70 Drawing Sheets

From Fig 42
Reference: 4208

METHOD FOR SIMULATING AN OPTIMIZED SUPPLIER IN A MARKET

FIELD OF THE INVENTION

The present invention relates to computer-implemented system that simulates an optimized supplier in a market.

BACKGROUND OF THE INVENTION

A supplier who competes in a market with one or more competitors is faced with the challenge of continuously pricing their goods and services. If a supplier understands the market's responsiveness to price as well as the supplier's cost, a supplier can determine the optimal price that ensures meeting one or more of the following business objectives; a) Maximizing revenue, b) Maximizing Gross Profit, c) Maximizing Earnings Before Income Tax, d) Market share, e) Factory utilization, and more. In addition to determining the optimum price to meet the designated business objective, the supplier may desire a capability to automatically update the optimal price as the market changes, forecast the supplier's financial performance based on the new optimized price, as well as forecast the performance of the supplier's competitors.

Prior art has multiple limitations that not only prevent a supplier from making an initial useable estimate of the optimal price, but also from making an accurate update of the optimal price, and forecasting the financial performance of the supplier and its competitors. The limitations begin with inaccuracies and potentially incorrect assumptions associated with the demand or yield curve, which depicts the relationship between quantity and price. These inaccuracies are the result of one or more of the following problems; a) Limited span in sales order data in which to build the demand curve, b) Lack of statistically relevant sales order data, c) Lack of market relevant sales order data, d) Implicit assumption that the historical and future sales environments remain the same, e) Lack of a rapid method for assessing whether a new optimized price is required as a result of a shift in market demand or pricing, f) Lack of a method of rapidly updating the optimized price calculation.

The demand curve is typically constructed using the supplier's historical sales order data, which limits the extent and completeness of the demand curve. For example, if the supplier behaves as the "low price leader", the sales order data can only be used to create a demand curve reflecting how the market responds to low pricing.

The demand curve should depict the market's responsiveness to all pricing scenarios, not just those scenarios, previously employed by the company. As a result of using a demand curve constructed using a limited span of sale order data, it is not likely that the optimum price can be determined.

Another challenge in constructing the demand curve is the lack of statistically relevant data. Frequently, there are pieces of sales data which conflict. An example is that one customer was willing to pay $2.23 each for 10,000 units. Another customer, in the identical customer group may demand 11,500 units for $2.23 each, a 15% difference in quantity. This situation is not unusual, especially for opaque markets where one buyer does not see what other buyers are paying and therefore facilitates a supplier charging different unit prices for the same goods or services. The current art attempts to resolve this situation through averaging algorithms and requires sufficient sale order data for statistical relevance. The challenge is that there is seldom-sufficient data to build a statistically relevant demand curve.

Yet another challenge with the current art is that even if the demand curve is statistically relevant, it is not market relevant. Statistical relevance can be assured through a large enough set of sales orders. However, collecting a large set of sales orders may necessitate waiting long periods of time to allow a sufficient number of orders to be accumulated for statistical relevance. During the long collection period, the market may have changed considerably in its responsiveness to pricing. So while the demand curve may have statistical relevance, it is meaningless because it is based on data too old for market relevance. As a consequence, determining an optimum price based on a data demand curve is unlikely.

In the current art, there is an implicit assumption that the historical sales and future sales environments are identical. For example, if the derived demand curve indicates that 10,000 units were sold when the price was $3.25, the expectation going forward is that the supplier will again sell 10,000 units at $3.25. The implicit assumption is that the overall economic environment, the supplier's approach to marketing, and selling methodology has remained the same. Rarely do the economic environment, the supplier's marketing, and selling methodologies remain intact for any length of time. As a consequence, the validity of the demand curve is questionable and its usefulness in doubt.

Without a representative demand curve, it is impossible to determine an optimum price that ensure meeting one or more of the following business objectives; a) Maximizing revenue, b) Maximizing Gross Profit, c) Maximizing Earnings Before Income Tax, d) Market share, e) Factory utilization, etc.

Even if prior art could overcome the aforementioned issues associated with the span of sales order data, statistical relevance, market relevance, and the accommodate changes in selling methodologies, prior art still must overcome the final issue of rapidly determining when market shifts in pricing and demand necessitate updating the demand curve. Without a method for rapidly determining when the demand curve is no longer representative of the market's responsiveness to price, a supplier will continue under the presumption that the current price is optimal when the market shifts have necessitated that a new optimal price is needed.

In accuracies and poor assumptions aside, once a demand curve is created, the supplier can make a determination of how to price their goods and services in order to satisfy certain business objectives. With an understanding of the relationship between quantity and price, an income statement, as well as additional metrics, can be constructed for each price through the following steps; a) Calculation of revenue by multiplying the price and quantity, b) Determination of the cost-of-goods by multiply the quantity and unit cost at that quantity, c) Calculation of gross profit by subtracting the cost-of-goods from the revenue, d) Determining the sales and general administration costs, e) Calculating the earnings before income tax by subtracting the sales and general administration costs from the gross profit, f) Calculation of market share by dividing the quantity by the total quantity sold by all suppliers, and e) Calculating factor utilization by dividing the units sold by the capacity of the factory for that product.

Once the income statement and additional metrics are calculated for each price, the optimum price can be selected to satisfy various business objects. For example, the supplier may wish to optimize pricing to maximize revenue. To identify the optimum price that maximizes revenue, the income statements are searched to identify where the revenue is maximized and the associated price extracted.

In addition to optimizations with one objective in mind, optimizations are possible that maximize the multiple business objectives. For example, the supplier may wish to optimize pricing to maximize revenue and gross profit. In this example, the income statements are searched for the price at which revenue is maximized and the price at which gross profit is maximized. The supplier then selects a price between the maximum gross profit and revenue price that represents the best tradeoff between these two business objectives.

While forecasting an income statement for a supplier using price optimization remains a challenge because of the limitation of prior in creating a demand curve, accurately modeling the financial performance of a supplier with optimization and their competitors is an even steeper challenge. If the optimized supplier lowers their price, sales volume is likely to increase with a corresponding reduction in sales for other suppliers. In the absences of an accurate relationship of price and quantity for any of the suppliers, it is challenging if not impossible to predict the financial performance of the suppliers.

DISCLOSURE OF THE INVENTION

A computer-implemented method, system and computer program product are provided for simulating two or more suppliers in a market and forecasting their financial performance, with one supplier using optimization that utilizes feedback in generating an optimal price. In use, an optimal price is generated for the designated supplier. All suppliers compete in a simulated market price. A result of utilizing the optimal price is identified for the supplier with optimization and a reaction may then be carried out based on that result. The suppliers compete in a simulated market place again, and their financial performance recorded.

DESCRIPTION OF THE PREFERRED EMBODIMENTS

The following description is present to enable one of ordinary skill in the art to make and use the present embodiment and is provided in the context of a patent application and its requirements. Various modifications to the illustrated embodiment will be readily apparent to those skilled in the art and the generic principles herein may be applied to other embodiments. Thus, the present embodiment is not intended to be limited to the embodiment shown but is to be accorded the widest scope consistent with the principles and features described herein.

Figure 1:
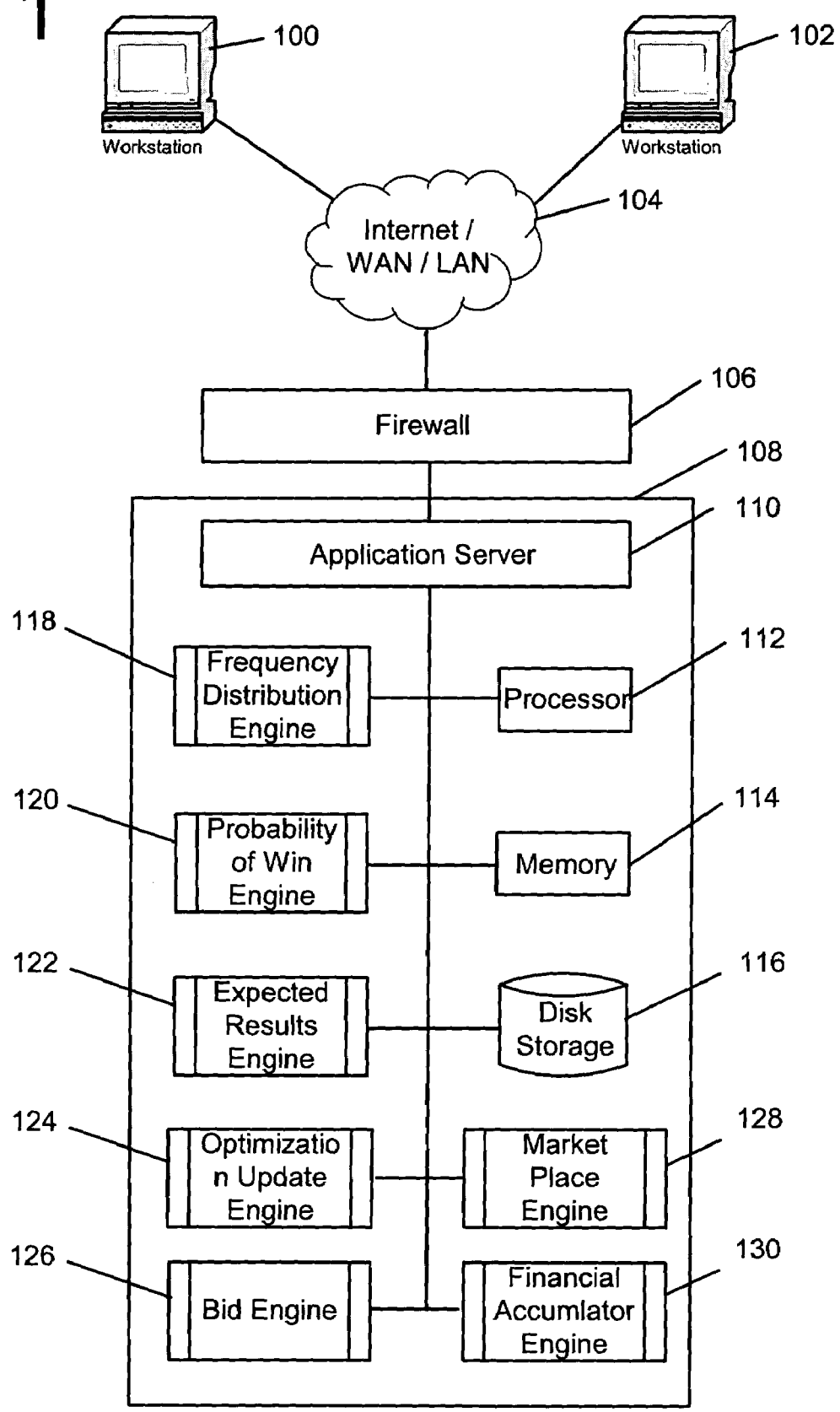
FIG. 1 is a diagram of a general-purpose computer system with principal elements used in one embodiment.

As shown in FIG. 1, a system includes one input/display device 100 or multiple input/display devices 102 such as a computer workstation that a user enters commands, inputs data, and views computed results; a connection to the Internet/WAN/LAN 104 that uses TCIP protocol; a firewall 106; a server or other such computing device 108 consisting of an application server 110, a processor 112, random access memory 114, and disk storage 116.

The memory 114 and disk 116 will store a Frequency Distribution Engine 118 that calculates the number of offers for the subject goods and services that the user believes competitors are offering in a particular market. In addition the memory 114 and disk 116 store the Probability of Win Engine 120, which calculates the probability that the user will receive a sale when the subject goods and services are priced at a specific value, and a Expected Results Engine 122 that calculates the anticipated revenue and gross profit for each price. The Optimization Update Engine 124 determines when an update of the optimal price should be conducted. The Bid Engine 126 provides supplier quotes based on the supplier's pricing behavior. The Market Place Engine 128 allows bids for a single competition to be compared and the lowest bidder identified. The Financial Accumulator 130 aggregates supplier's financial performance based on competitions conducted in the Market Place Engine 128. It will be understood that the described embodiments are embodied as computer instructions stored in memory 114 and executed by processor 112. These instructions can also be stored on a computer readable media such as a floppy disk, CD ROM, etc. and can also be transmitted via a network such as the internet, an intranet, etc., via a carrier wave embodying the instructions.

Figure 2:
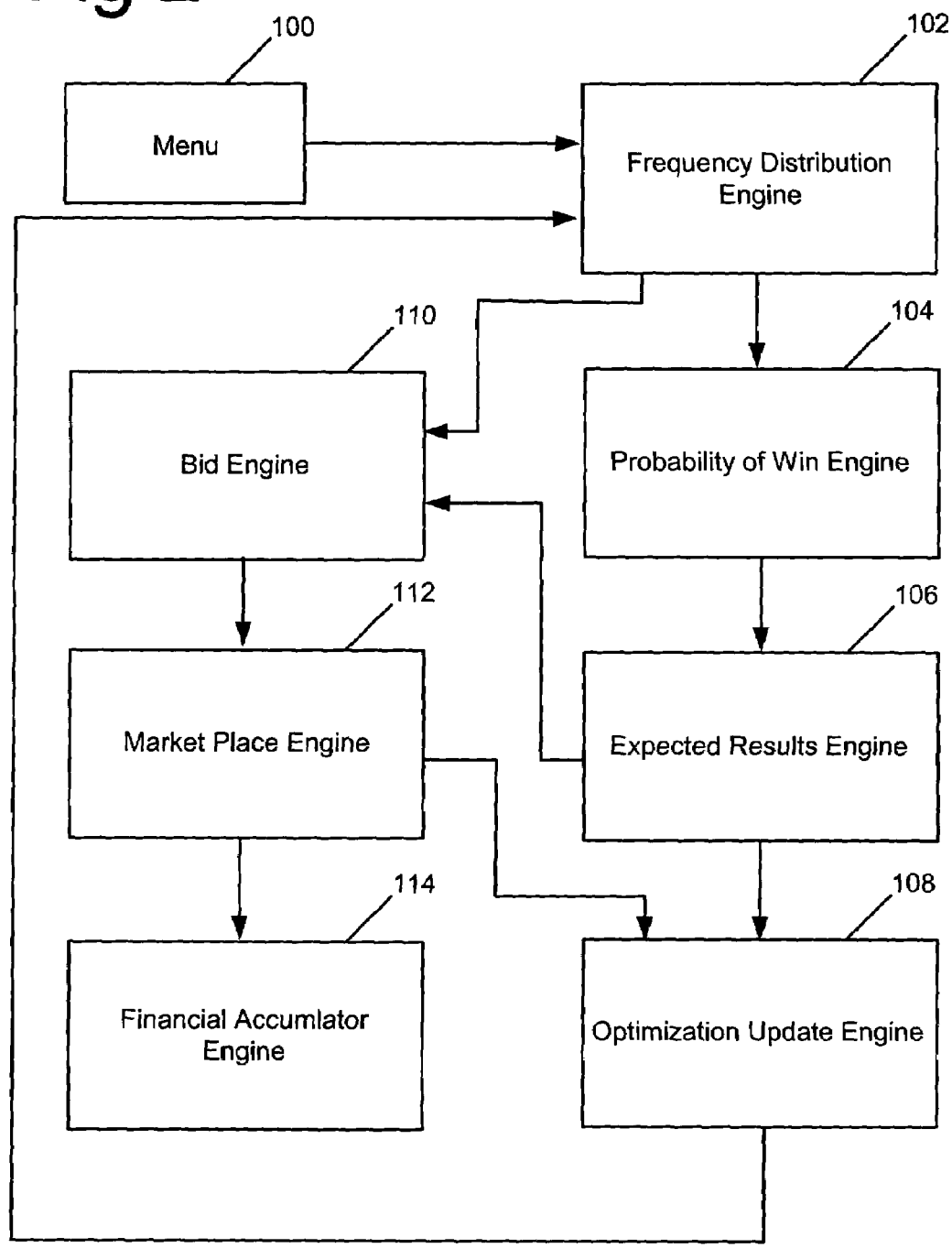
FIG. 2 is a diagram of the processing flow between the major processing components.

FIG. 2 shows the Menu 100, major processing engines, Frequency Distribution Engine 102, Probability of Win Engine 104, Expected Results Engine 106, Optimization Update Engine 108, Bid Engine 110, Market Place Engine 112, and Financial Accumulator Engine 114.

The user enters the bidding characteristics of the non-optimized suppliers, as well as the business objectives and optimization characteristics of the optimize supplier in Menu 100. For the non-optimized suppliers, the Frequency Distribution Engine 102 calculates the distribution of prices. The Bid Engine 110 produces a set of bids based on distribution of prices produced by the Frequency Distribution Engine 102.

For the optimized supplier, the Frequency Distribution Engine 102 calculates the optimized supplier's estimate of the non-optimized supplier's distribution of prices. The frequency distribution of prices is used by the Probability of Win Engine 104 to determine the probability of the optimized supplier winning at various prices. Based on the probability of win, the Expected Results Engine 106 projects an income statement for each price based on a number of competitions. Using the business objectives from Menu 100, the income statements are compared to determine which price yields the maximum income, gross profit, or other business objective. The optimal price is passed to the Bid Engine 110.

The Market Place Engine 112 randomly draws prices from the Bid Engine 110 for each competition. In the case of the non-optimized supplier, the randomly drawn bids will vary based on the distribution of prices calculated by the Frequency Distribution Engine 102. For the optimized supplier, the bids will be identical until updated. The engine determines which supplier wins and passes the results to the Financial Accumulator Engine 114 where the wins are recorded, actual income statements calculated, and statistics aggregated. In addition, the result of whether the optimized supplier wins is passed to the Optimization Update Engine 108.

The Optimization Update Engine 108 determines when and if the optimized price is updated. The determination is based on the number of competitions and the ratio of expected verses actual wins. If the number of competitions is less than the number specified in the Menu 100, no optimization is conducted. If the number of competitions are equal to the number specified in the menu, and the ratio of expected verses actual wins is outside of a tolerance window specified in the Menu 100, then the Optimization Update Engine 108 determines how the estimated frequency distribution of prices should be modified to produce a more accurate optimization. This determination, which consist of a new estimate of mean price, sigma high, and sigma low, is passed to the Frequency Distribution Engine 102 so that a new optimized price can be calculated.

Figure 3:
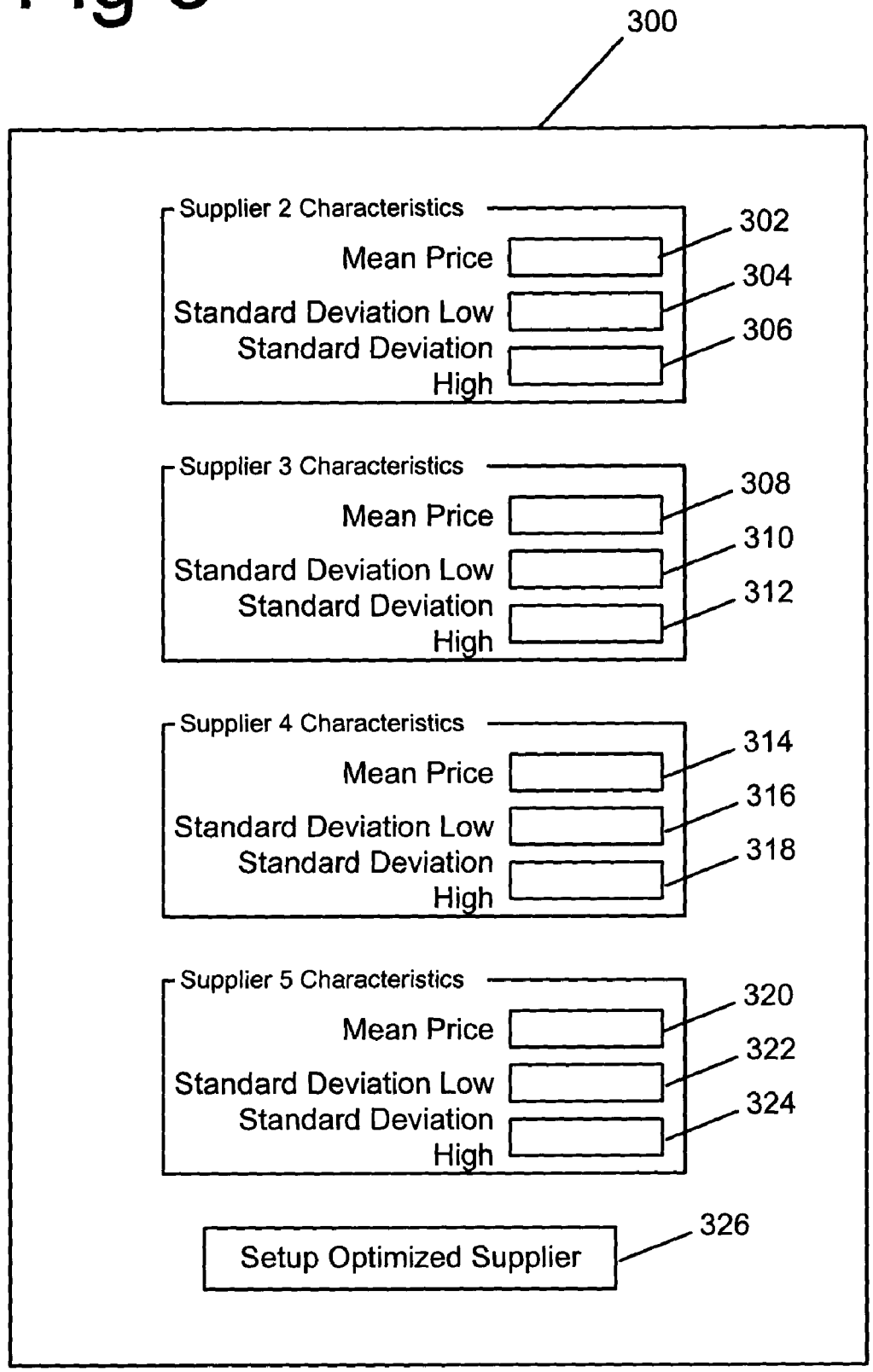
FIG. 3 is an input menu on the display device.

FIG. 3 shows a Menu 300 used to estimate the pricing behavior of non-optimized suppliers. Fields 302, 308, 314, and 320, define the Mean Price value for Suppliers 2 through 5 respectively. Fields 304, 310, 316, and 322, define the Standard Deviation Low value for Suppliers 2 through 5 respectively. Fields 306, 312, 318, and 324, define the Standard Deviation High value for Suppliers 2 through 5 respectively. After the user enters the values for fields 302 through 324, the Setup Optimized Supplier button 326, causes the Optimized Supplier Setup menu to be displayed.

Figure 4:
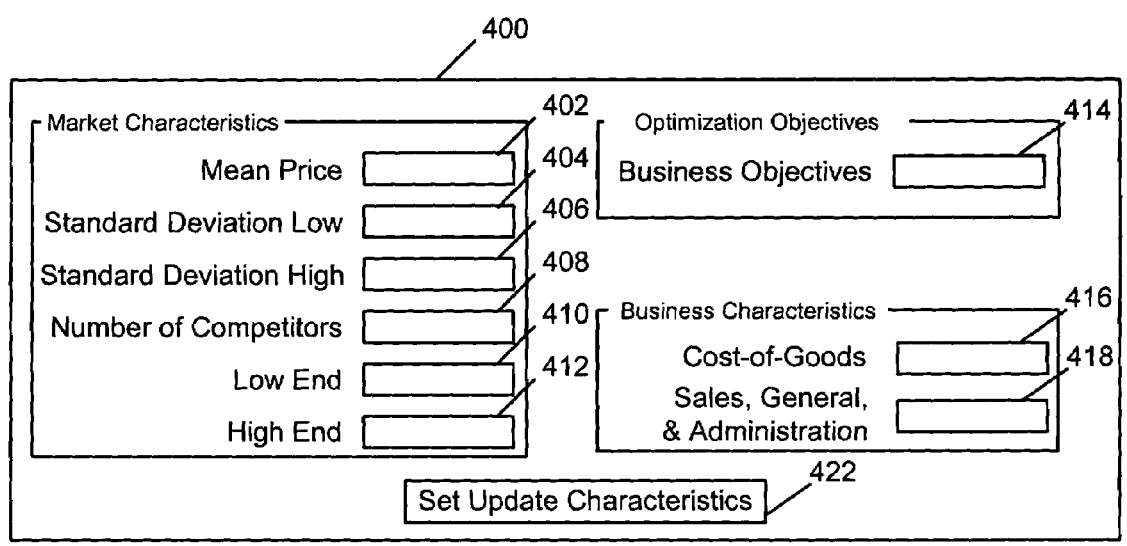
FIG. 4 is a second input menu on the display device.

FIG. 4 shows Menu 400, which specifies the optimized supplier's estimate of the other supplier's pricing behavior. The user enters in the estimated Mean Price, Standard Deviation Low, Standard Deviation High, Number of Competitors, Low End, and High End, in fields 402, 404, 406, 408, 410, and 412 respectively. The Business Objectives are set in field 414. The business characteristics depicting expense is set in fields 416 and 418. The Set Update Characteristics button 422 causes the Optimization Update Characteristics Menu 500 to be displayed.

Figure 5:
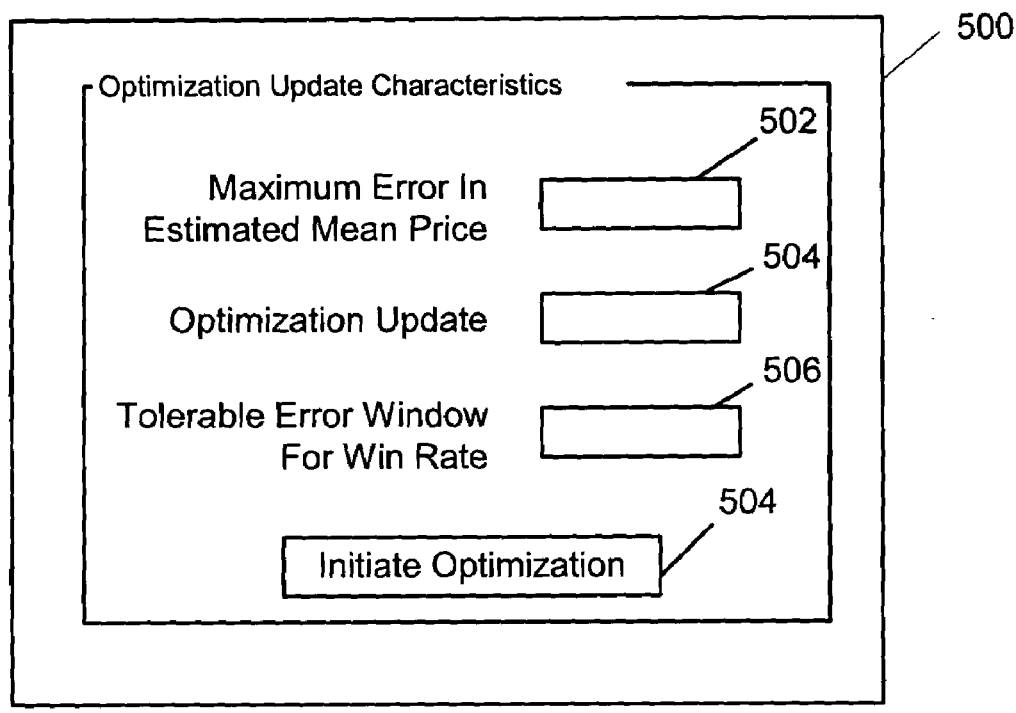
FIG. 5 is a third menu on the display device.

FIG. 5 shows Menu 500, which specifies the optimization update characteristics. The maximum error in the optimized supplier's estimate of Mean Price is entered in fieled 502. The number of competition between optimization updates in entered in field 504. The acceptable tolerance window for the ratio of expected verses actual wins is entered in 506. The Initiate Optimization button 504, starts the simulation.

Figure 6:
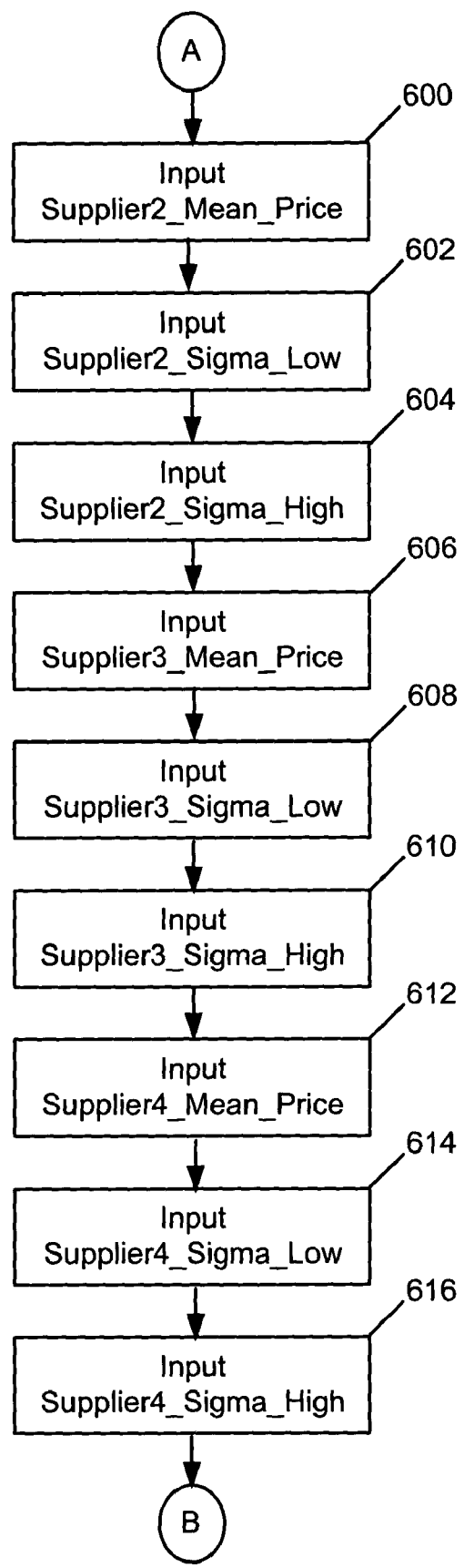
FIG. 6 is a flow chart illustrating the input of data.

FIG. 6 shows the inputting of non-optimized supplier characteristics into the program. Input and assignment of a value of Supplier2_Mean_Price 600 is accomplished in 600. Input and assignment of a value to Supplier2_Sigma_Low 602 is accomplished in 602. Input and assignment of a value to Supplier2_Sigma_High 604 is accomplished in 604. Input and assignment of a value to Supplier3_Mean_Price 606 is accomplished in 606. Input and assignment of a value to Supplier3_Sigma_Low 608 is accomplished in 608. Input and assignment of a value to Supplier3_Sigam_High 610 is accomplished in 610. Input and assignment of a value to Supplier4_Mean_Price 612 is accomplished in 612. Input and assignment of a value to Supplier4_Sigma_Low 614 is accomplished in 614. Input and assignment of a value to Supplier4_Sigma_High 616 is accomplished in 616.

Figure 7:
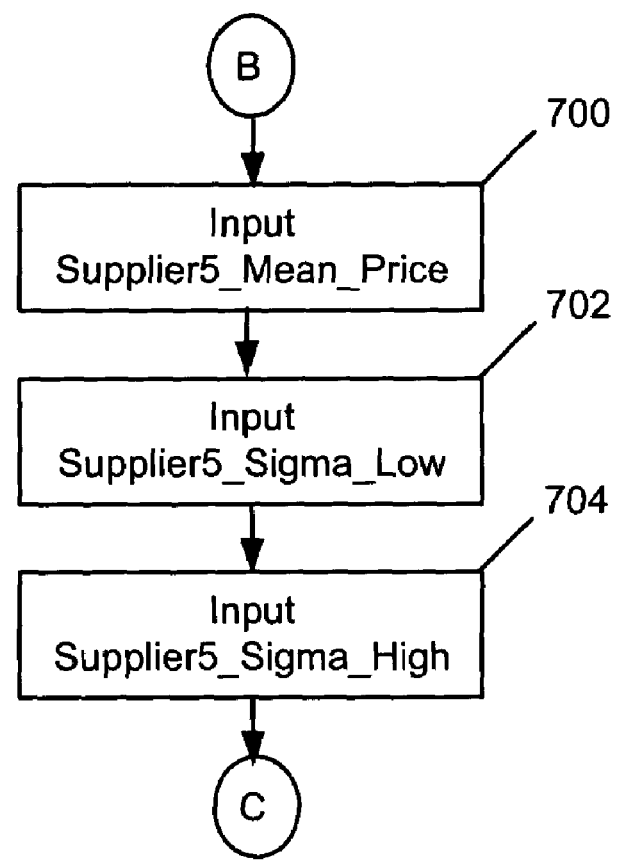
FIG. 7 is the second flow chart illustrating the input of data.

FIG. 7 shows the continued inputting of information into the program. Input and assignment of a value to Supplier5_Mean_Price 700 is accomplished in 700. Input and assignment of a value to Supplier5_Sigma_Low 702 is accomplished in 702. Input and assignment of a value to Supplier_Sigma_High 704 is accomplished in 704.

Figure 8:
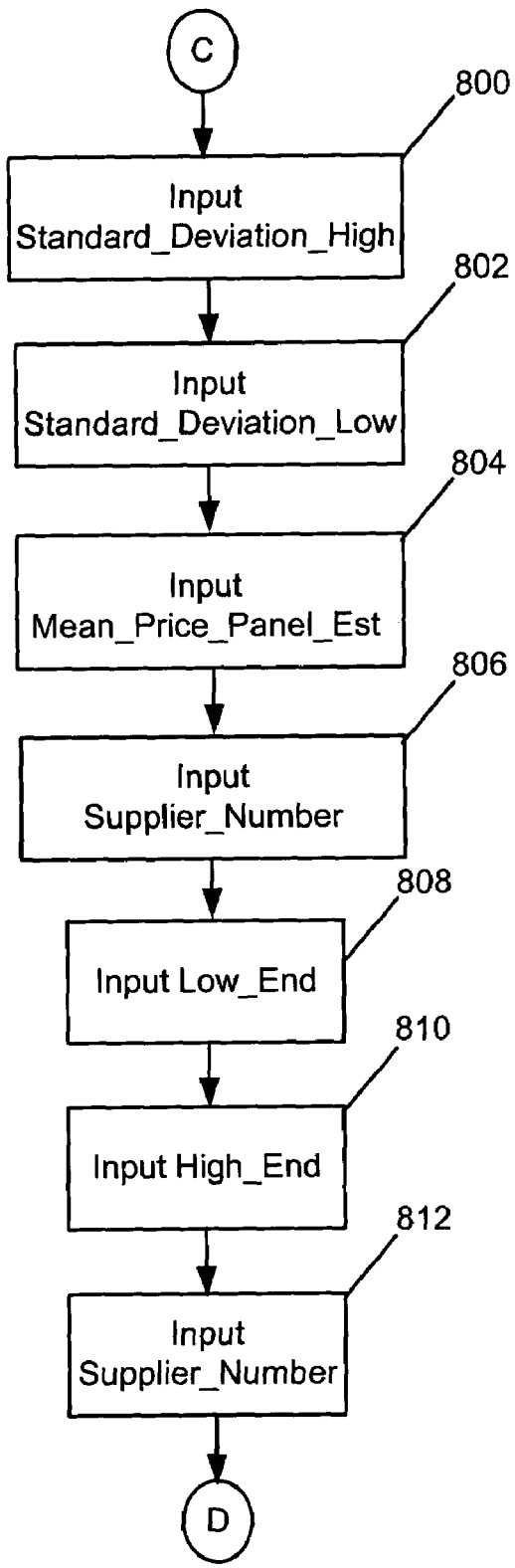
FIG. 8 is the third flow chart illustrating the input of data.

FIG. 8 shows the continued inputting of information into the program. Input and assignment of a value to Standard_Deviation_High 800 is accomplished in 800. Input and assignment of a value to Standard_Deviation_Low 802 is accomplished in 802. Input and assignment of a value to Mean_Price_Panel_Est 804 is accomplished in 804. Input and assignment of a value to Supplier_Number 806 is accomplished in 806. Input and assignment of a value to Low_End 808 is accomplished 808. Input and assignment of a value to High_End 810 is accomplished in 810. Input and assignment of a value to variable Supplier_Number 812 is accomplished in 812.

Figure 9:
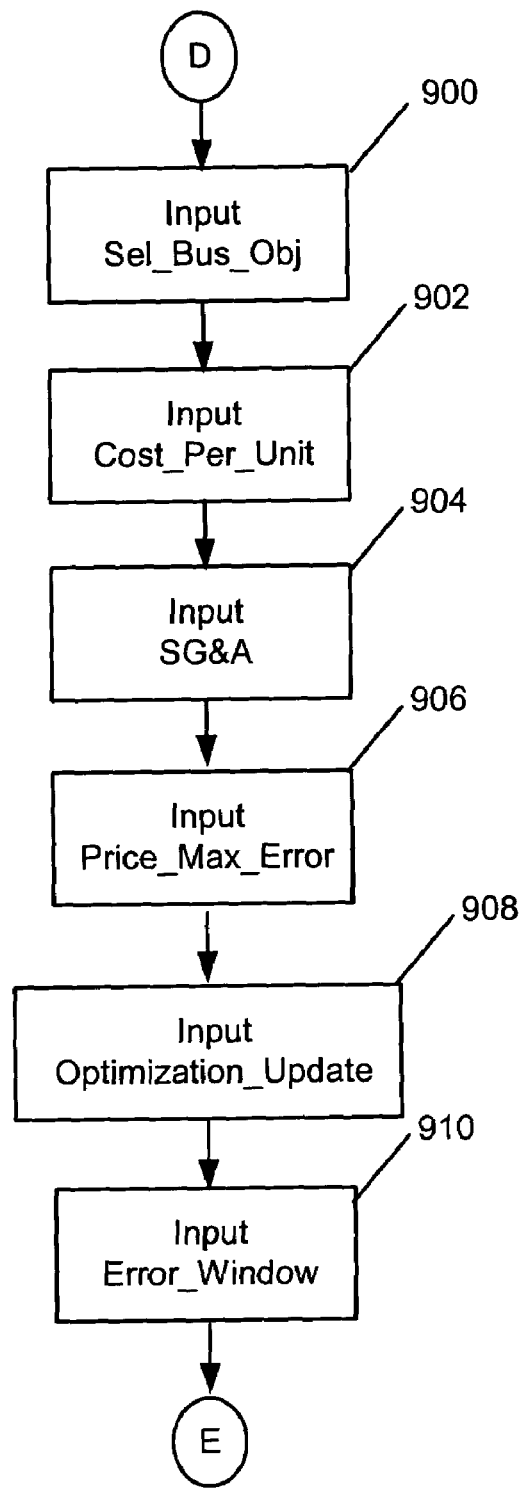
FIG. 9 is the fourth flow chart illustrating the input of data.

FIG. 9 shows the continued inputting of information into the program. Input and assignment of a value to Sel_Bus_Obj 900 is accomplished in 900. Input and assignment of a value to Cost_Per_Unit 902 is accomplished in 902. Input and assignment of a value to SG&A 904 is accomplished in 904. Input and assignment of a value to Price_Max_Error 906 is accomplished in 906. Input and assignment of a value to Optimization_Update 908 is accomplished in 908. Input and assignment of a value to Error_Window 910 is accomplished in 910.

Figure 10:
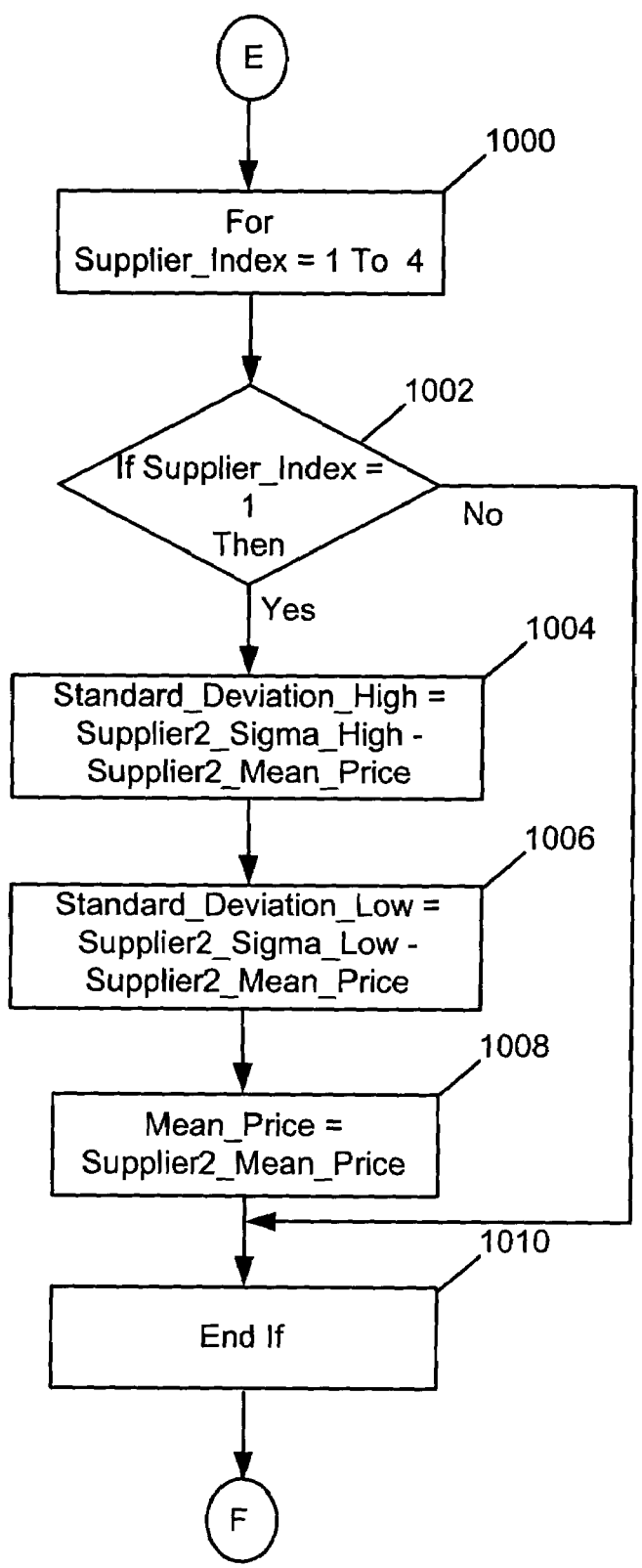
FIG. 10 is a flow chart illustrating the assignment of standard deviations and mean price to Supplier2.

FIG. 10 is a flow chart illustrating the assignment of standard deviations and mean price to Supplier2. A programming loop defined by 1000 to 1710 is initiated by the For statement 1000. In the For statement 1000, Supplier_Index 1000 is initialized to one and incremented to four in steps of one. A determination 1002 of whether Supplier_Index 1002 is equal to one is made. If the determination 1002 is true, then Standard_Deviation_High 1004 is calculated by subtracting Supplier2_Sigma_High 1004 from Supplier2_Mean_Price 1004. Standard_Deviation_Low 1006 is calculated by subtracting Supplier2_Sigma_Low 1006 from Supplier2_Mean_Price 1006. Mean_Price 1008 is assigned the value Supplier2_Mean_Price 1008. The determination 1002 is terminated in the End If statement 1010. If the determination 1002 is false, then the determination terminates in the End If satement 1010.

Figure 11:
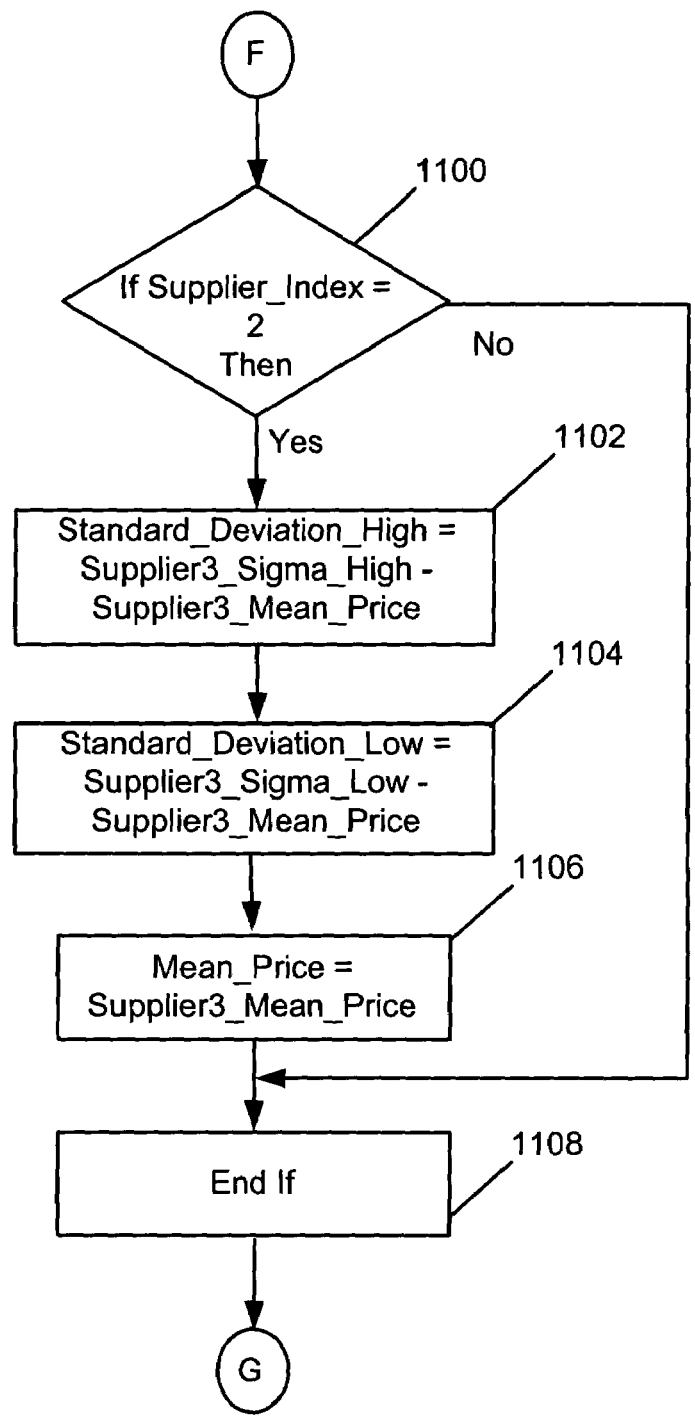
FIG. 11 is a flow chart illustrating the assignment of standard deviations and mean price to Supplier3.

FIG. 11 is a flow chart illustrating the assignment of standard deviations and mean price to Supplier3. A determination 1100 of whether Supplier_Index 1100 is equal to two is made. If the determination 1100 is true, then Standard_Deviation_High 1102 is calculated by subtracting Supplier3_Sigma_High 1102 from Supplier3_Mean_Price 1102. Standard_Deviation_Low 1104 is calculated by subtracting Supplier3_Sigma_Low 1104 from Supplier3_Mean_Price 1104. Mean_Price 1106 is assigned the value Supplier3_Mean_Price 1106. The determination 1100 is terminated in the End If statement 1108. If the determination 1100 is false, then the determination terminates in the End If statement 1108.

Figure 12:
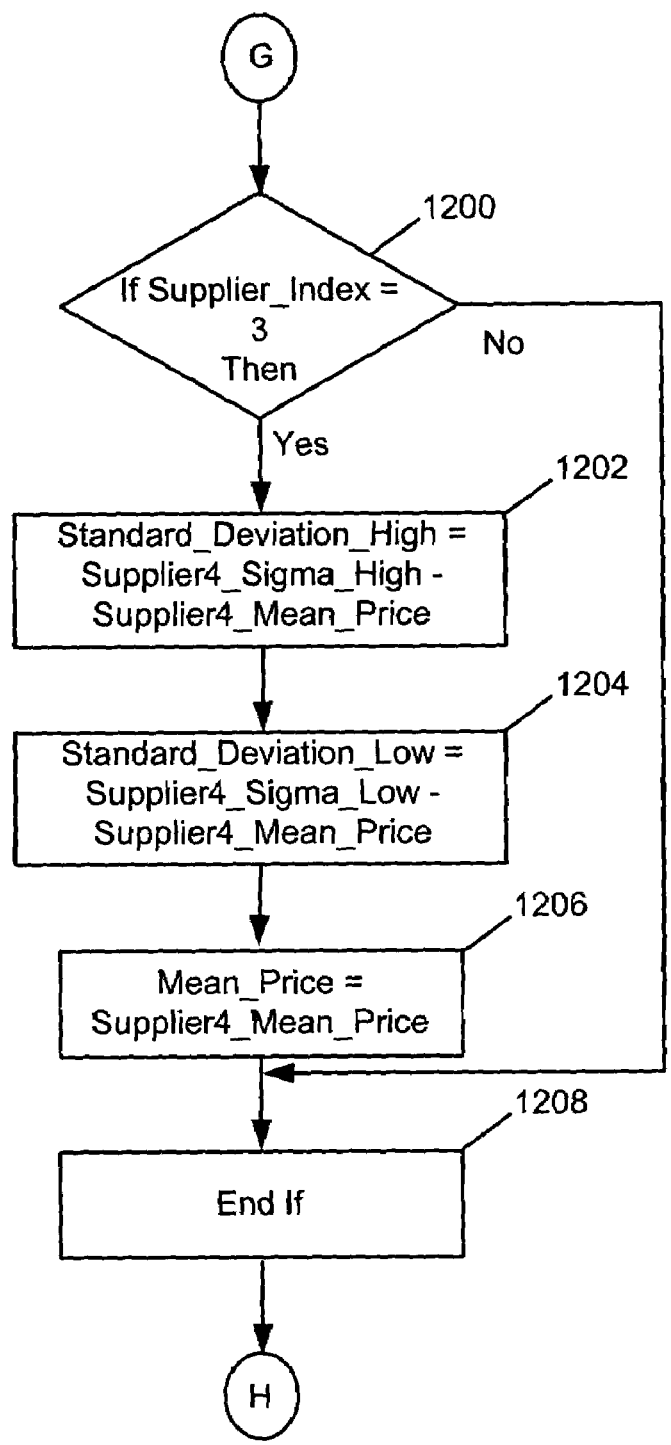
FIG. 12 is a flow chart illustrating the assignment of standard deviations and mean price to Supplier4.

FIG. 12 is a flow chart illustrating the assignment of standard deviations and mean price to Supplier4. A determination 1200 of whether Supplier_Index 1200 is equal to three is made. If the determination 1200 is true, then Standard_Deviation_High 1202 is calculated by subtracting Supplier4_Sigma_High 1202 from Supplier4_Mean_Price 1202. Standard_Deviation_Low 1204 is calculated by subtracting Supplier4_Sigma_Low 1204 from Supplier3_Mean_Price 1204. Mean_Price 1206 is assigned the value Supplier4_Mean_Price 1206. The determination 1200 is terminated in the End If statement 1208. If the determination 1200 is false, then the determination terminates in the End If statement 1208.

Figure 13:
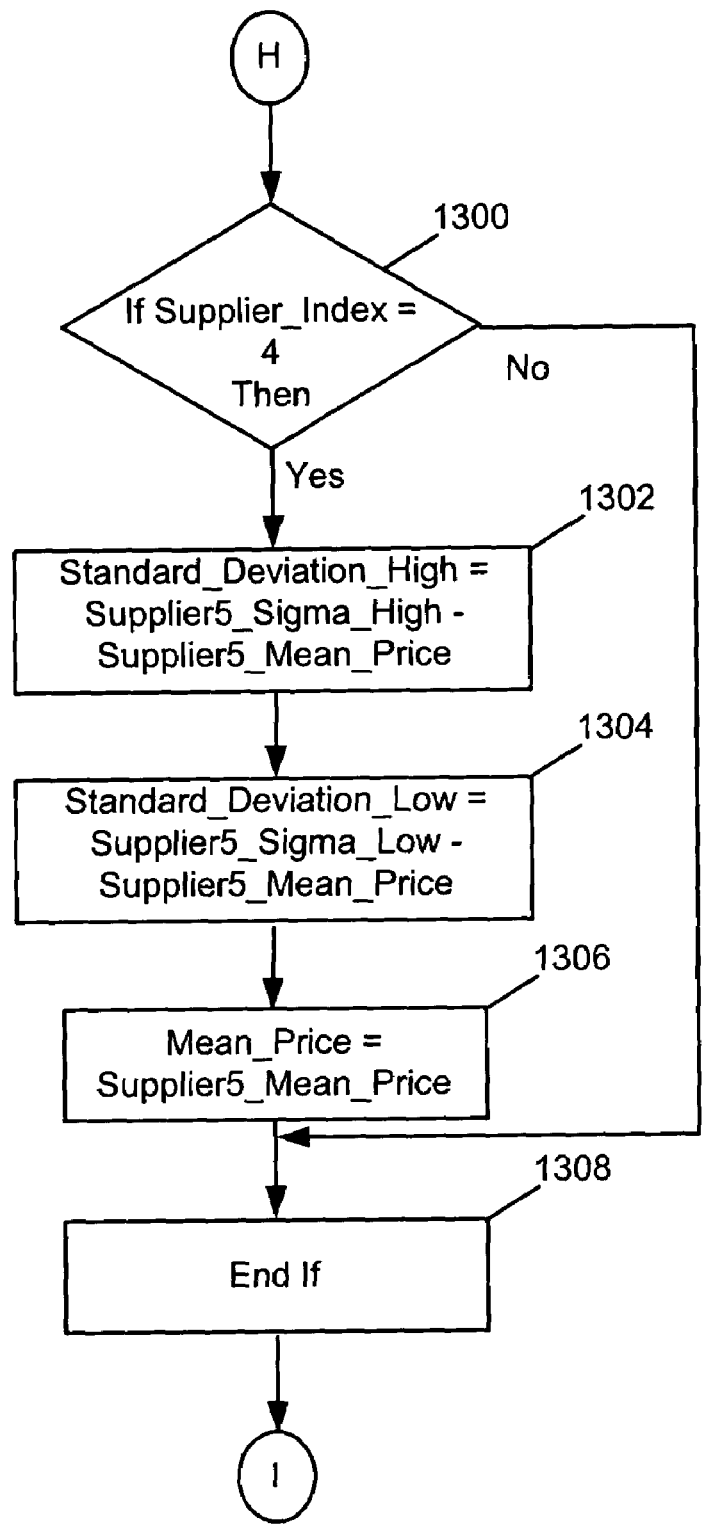
FIG. 13 is a flow chart illustrating the assignment of standard deviations and mean price to Supplier5.

FIG. 13 is a flow chart illustrating the assignment of standard deviations and mean price to Supplier5. A determination 1300 of whether Supplier_Index 1300 is equal to four is made. If the determination 1300 is true, then Standard_Deviation_High 1302 is calculated by subtracting Supplier5_Sigma_High 1302 from Supplier5_Mean_Price 1302. Standard_Deviation_Low 1304 is calculated by subtracting Supplier5_Sigma_Low 1304 from Supplier5_Mean_Price 1304. Mean_Price 1306 is assigned the value Supplier5_Mean_Price 1306. The determination 1300 is terminated in the End If statement 1308. If the determination 1300 is false, then the determination terminates in the End If statement 1308.

Figure 14:
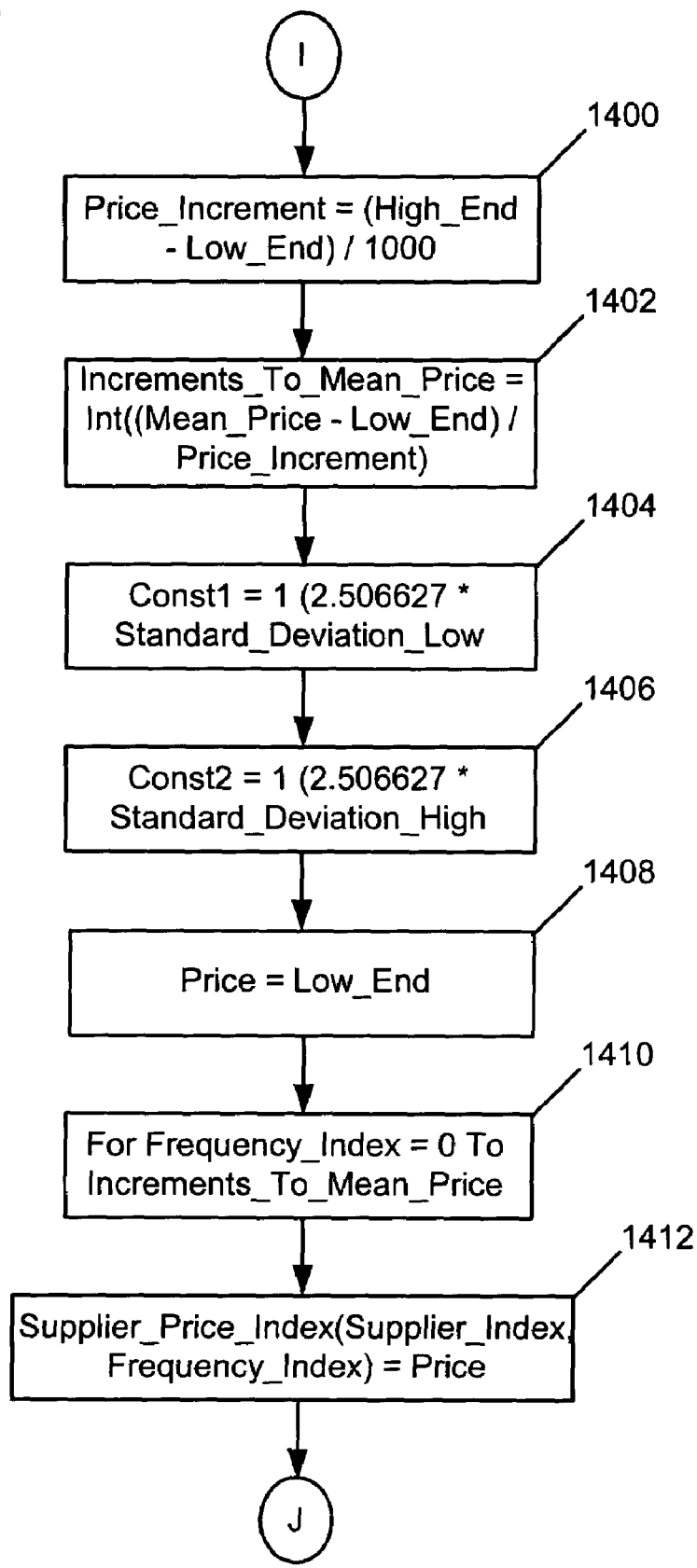
FIG. 14 is a flow chart that illustrates the assignment of variables and the calculation of the Frequency Distributions for each supplier.

FIG. 14 is a flow chart that illustrates the assignment of variables and the calculation of the Frequency Distribution for each supplier. The price increments between the lowest and highest price of the supplier's frequency distribution is calculated and assigned to Price_Increment 1400 by subtracting High_End 1400 from Low_End 1400 and then dividing by 1000. The number of price increments from the low end of the frequency distribution to the mean price is calculated and assigned to Increments_To_Mean_Price 1402 by taking the integer value of Mean_Price 1402 less Low_End 1402 divided by Price_Increment 1402. The value of Const1 1404 is calculated in 1404. The value of Const2 1406 is calculated in 1406. The value for Price 1408 is assigned the value contained in the variable Low_End 1408. A programming loop is defined by steps 1410 through 1504 and initiated by the For statement 1410. In the For statement 1410, Frequency_Index 1410 is initialized to zero and incremented to Increments_To_Mean_Price 1410 in steps of one. Supplier_Price_Index Array 1412 stores the value of Price 1412.

Figure 15:
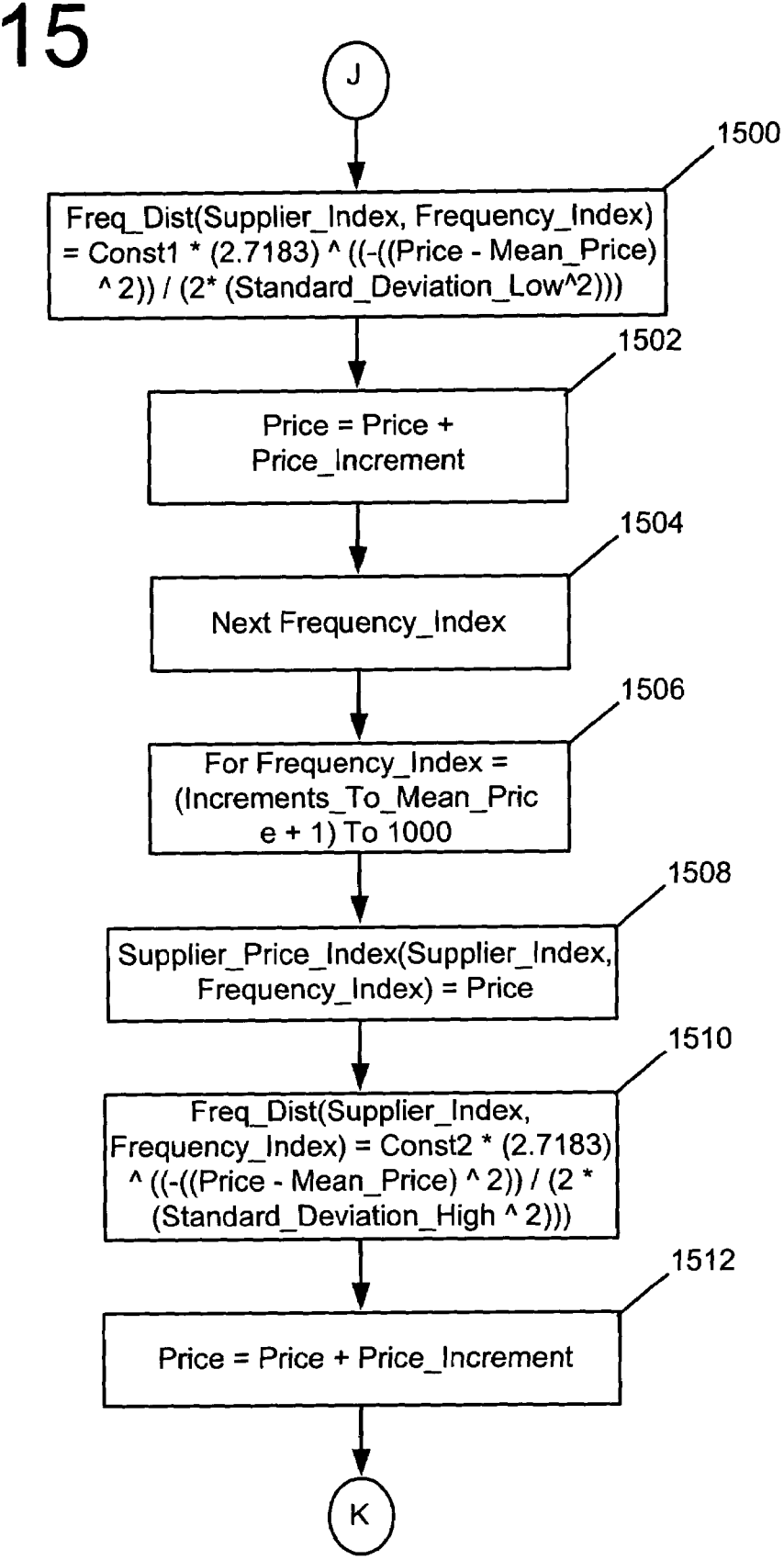
FIG. 15 is a flow chart illustrates the continued the calculations of Frequency Distributions for each supplier.

FIG. 15 is a flow chart illustrates the continued calculations of Frequency Distributions for each supplier. The frequency distribution is calculated for a given Price 1500, Mean_Price 1500, Const1 1500, Standard_Deviation_Low 1500 and stored in the Freq_Dist Array 1500. Price 1502 is incremented by Price_Increment 1502. The Next Frequency_Index 1504 is incremented by one and the programming loop defined by steps 1410 through 1504 is repeated until Increments_To_Mean_Price 1410 plus one is reached. A programming loop defined by steps 1506 to 1600 is initiated by the For statement 1506. In the For statement 1506 Frequency_Index 1506 is set to a value of Increments_To_Mean_Price 1506 plus one, and incremented to 100 in steps of one. The Supplier_Price_Index Array 1508 stores the value of Price 1508. The value of frequency distribution is calculated and assigned to an array element of Freq_Dist 1508. The frequency distribution is calculated for a given Price 1510, Mean_Price 1510, Const2 1510, Standard_Deviation_High 1510 and stored in the Freq_Dist Array 1510. Price 1512 is incremented by Price_Increment 1512.

Figure 16:
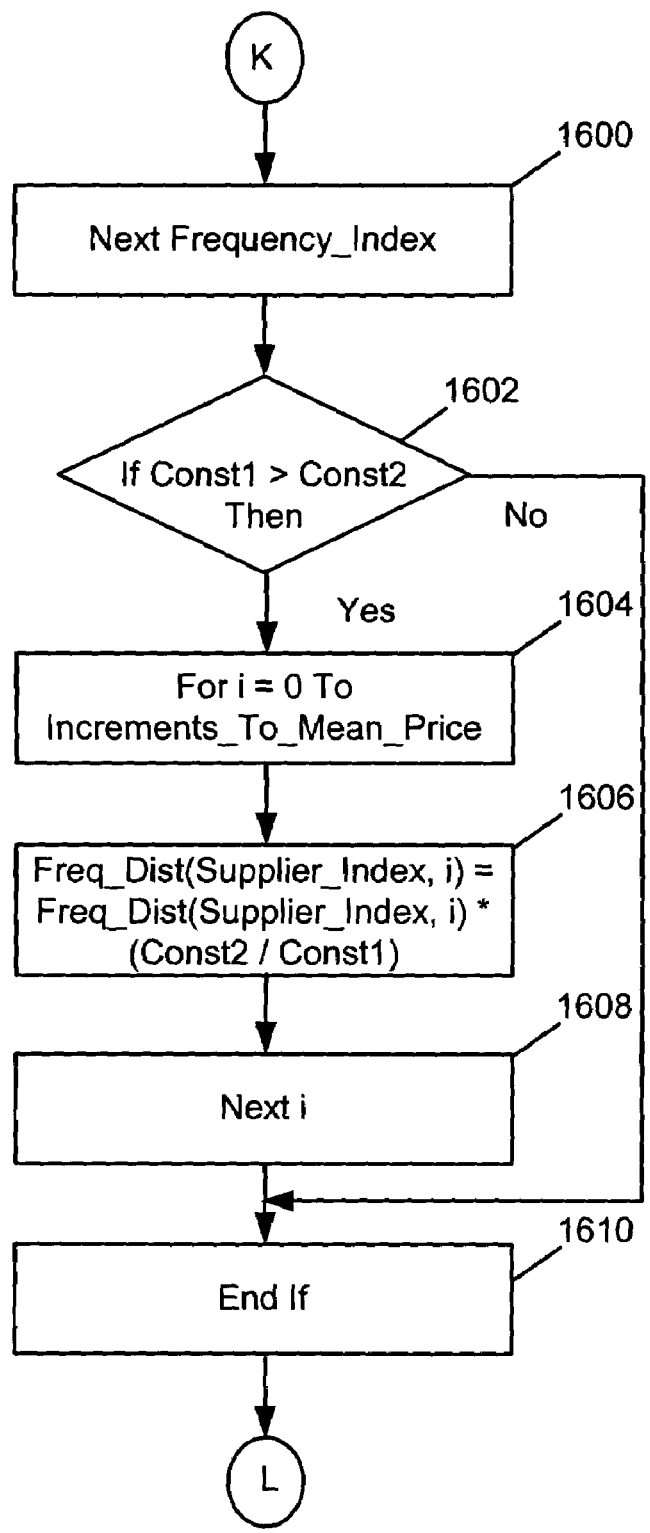
FIG. 16 is a flow chart illustrates completion of the supplier Frequency Distribution calculations and begins the Frequency Distribution smoothing process.

FIG. 16 is a flow chart illustrates completion of the supplier Frequency Distribution calculations and begins the Frequency Distribution smoothing process. The programming loop defined by steps 1506 through 1600 is completed by the Next Frequency_Index statement 1600. The smoothing, or joining of the two distributions at the mean price is accomplished by the steps 1602 through 1610. A determination as to whether Const1 1602 is greater than Const2 1602 is made. If the determination is true, then a program loop defined by steps 1604 through 1608 is executed. The For statement 1604 initializes i to zero and increments i in steps of one to the value contained in Increments_To_Mean_Price 1604. The values contained in the Freq_Dist Array 1606 are multiplied by the ratio of Const2 1604 divided by Const1 1604. The Next statement 1608 increments i by one and the programming loop defined by steps 1604 through 1608 is repeated until Increments_To_Mean_Price plus one is reached. If the determination 1602 is false, then the If statement 1602 is terminated in the End If statement 1610.

Figure 17:
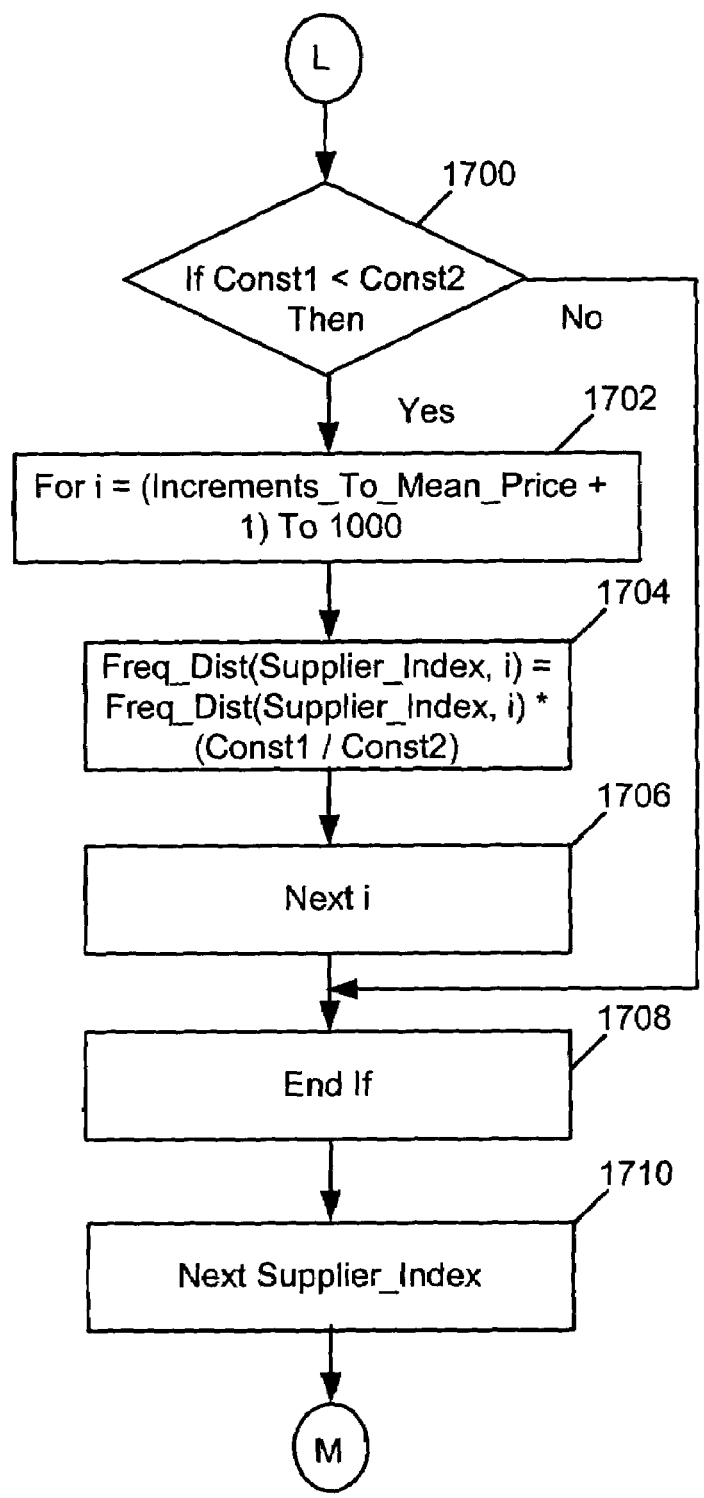
FIG. 17 is a flow chart that illustrates the completion of the Frequency Distribution smoothing process.

FIG. 17 is a flow chart that illustrates the completion of the Frequency Distribution smoothing process. The smoothing, or joining of the two distributions at the mean price is accomplished by the steps 1700 through 1708. A determination as to whether Const1 1700 is less than Const2 1700 is made. If the determination is true, then a programming loop defined by steps 1702 through 1706 is executed. The For statement 1702 initializes i to the value of Increments_To_Mean_Price and increments i in steps of one to 1000 plus one. The values contained in the Freq_Dist Array 1704 are multiplied by the ratio of Const1 1704 divided by Const2 1704. The Next statement 1706 increments i by one and the programming loop defined by steps 1702 through 1706 is repeated until 1000 plus one is reached. If the determination 1700 is false, then the If statement 1700 is terminated in the End If statement 1708. The Next statement 1710 increments Supplier_Index 1710 by one and the programming loop defined by steps 1000 through 1710 repeated until Supplier_Index 1000 equals four plus one.

Figure 18:
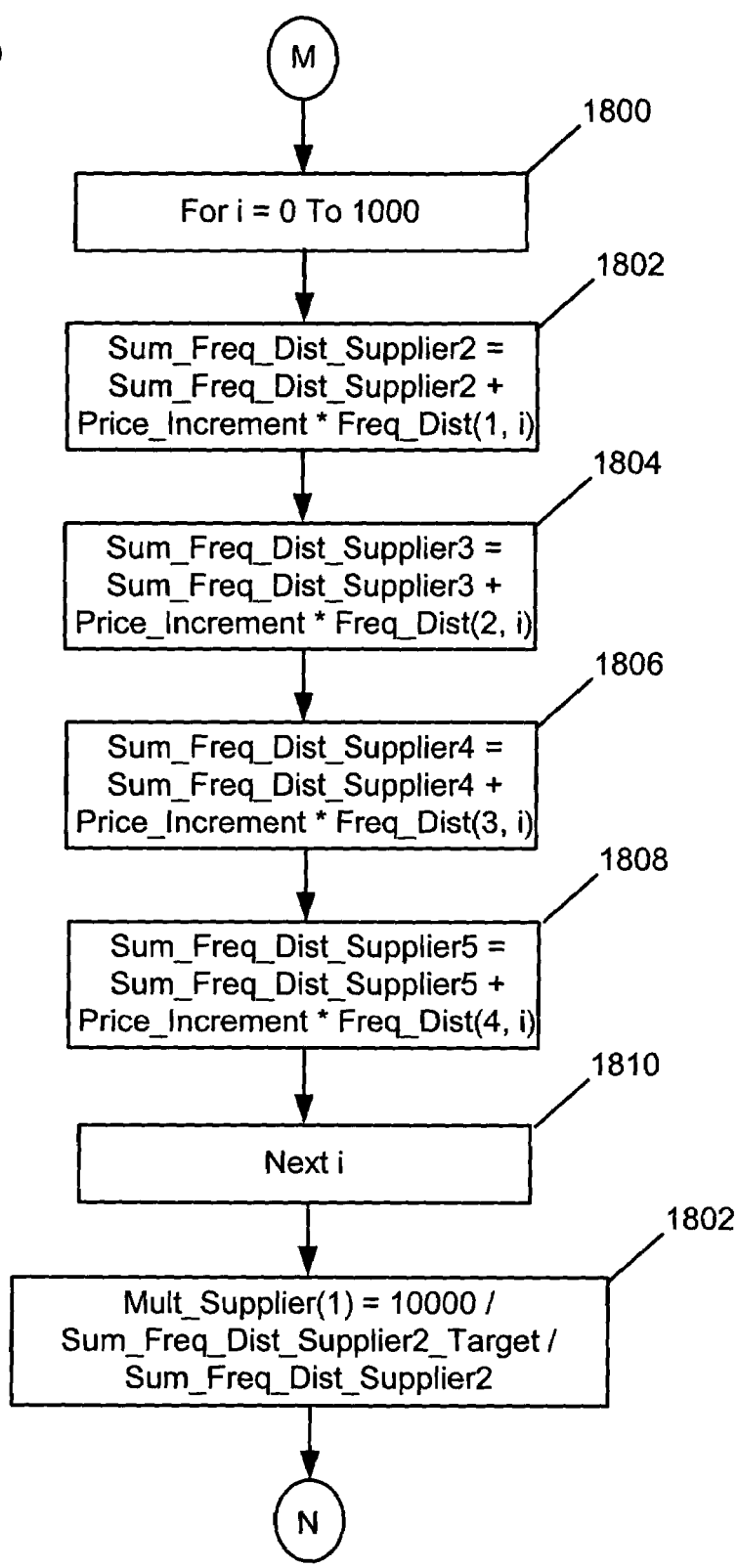
FIG. 18 is a flow chart that illustrates the integration of the Frequency Distributions and initiates the calculations of the normalization constants.

FIG. 18 is a flow chart that illustrates the integration of the Frequency Distribution and initiates the calculations of the normalization constants. A programming loop defined by steps 1800 through 1810 is established by the For statement 1800. i 1800 is initialized to zero and steps in increments of one to 1000. The integral for Supplier2 1802 is calculated in step 1802. The integral for Supplier3 1804 is calculated in step 1804. The integral for Supplier4 1806 is calculated in step 1806. The integral for Supplier5 1808 is calculated in step 1808. The Next statement 1810 causes i to be incremented and the programming loop defined by steps 1800 through 1810 repeated until 100 plus one is reached. The array element Mult_Supplier(1) 1802 is calculated by dividing 10000 by the integral of the frequency distribution for Supplier2.

Figure 19:
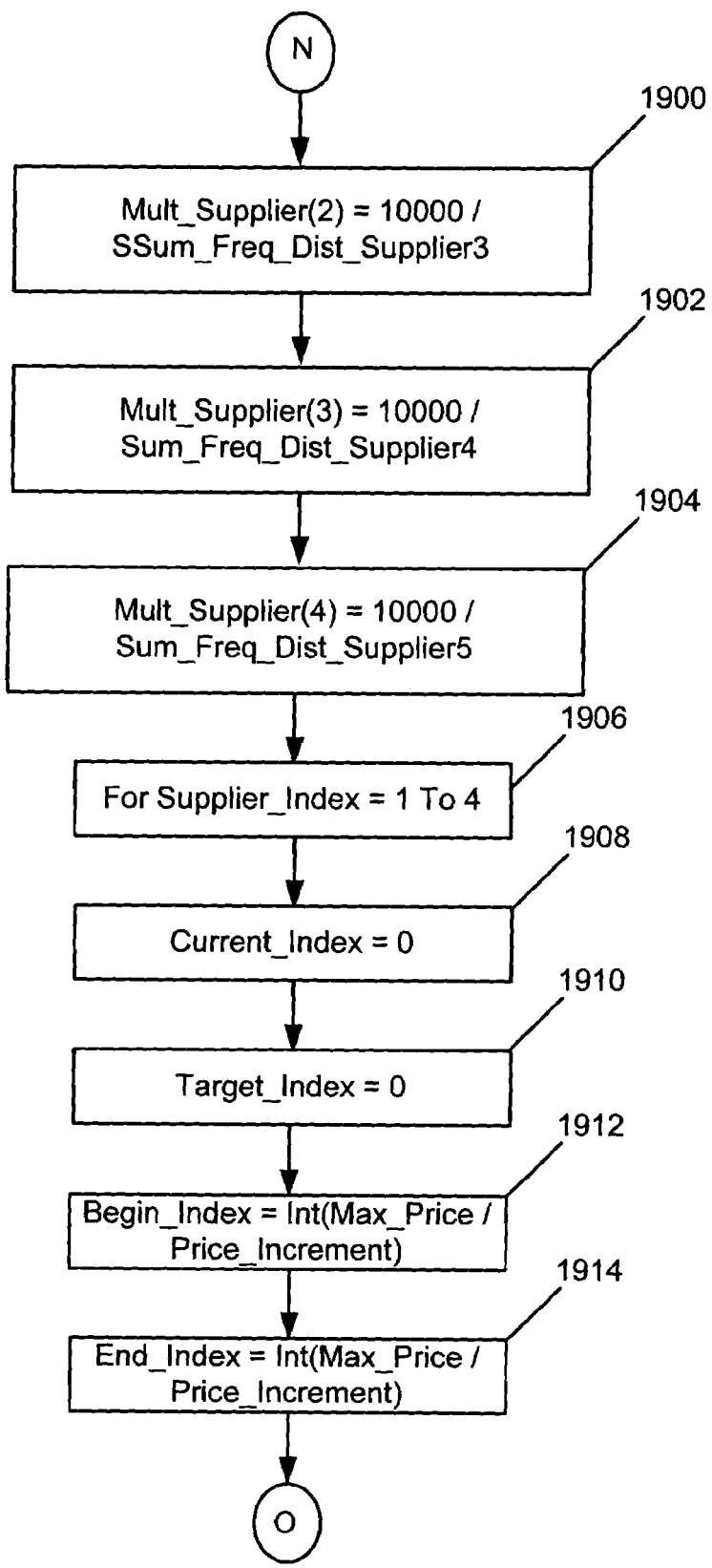
FIG. 19 is a flow chart that illustrates the completion of the calculations of the normalization constants and initiates the calculations of the Price Distribution.

FIG. 19 is a flow chart that illustrates the completion of the calculations of the normalization constants and initiates the calculations of the Price Distribution associated with the Bid Engine 126 reference in FIG. 1. The array element Mult_Supplier(2) 1900 is calculated by dividing 10000 by the integral of the frequency distribution for Supplier3. The array element Mult_Supplier(3) 1902 is calculated by dividing 10000 by the integral of the frequency distribution for Supplier4. The array element Mult_Supplier(4) 1904 is calculated by dividing 10000 by the integral of the frequency distribution for Supplier5. A programming loop defined by steps 1906 through 2208 is initiated by the For statement 1906. Supplier_Index 1906 is set to one and incremented to four plus one in steps of one. Current_Index 1908 is set to zero. Target_Index 1910 is set to zero. Begin_Index 1912 is calculated by determining the integer value of Max_Price 1912 divided by Price_Increment 1912. End_Index 1914 is determined by taking the integer value of Max_Price 1914 and dividing it by Price_Increment 1914.

Figure 20:
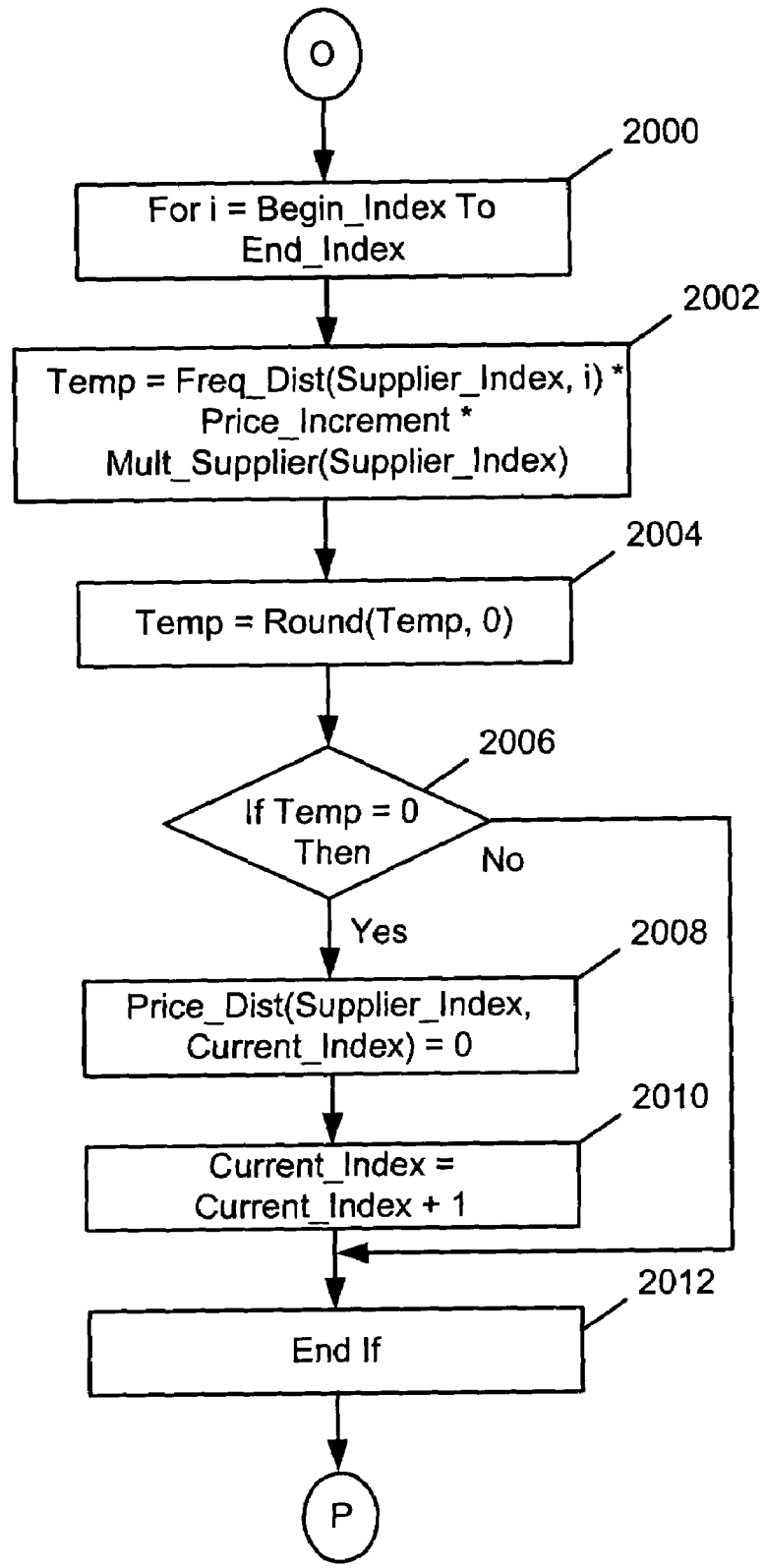
FIG. 20 is a flow chart that illustrates the continued calculation of the Price Distribution.

FIG. 20 is a flow chart that illustrates the continued calculations of the Price Distribution. A programming loop defined by steps 2000 through 2206 is initiated by the For statement 2000. i is initialized to Begin_Index 2000 and incremented by one until the value of End_Index 2000 plus one is reached. Temp 2002 is calculated by multiplying the value of Freq_Dist Array 2002 for a given index by the current Price_Increment 2002 multiplied by value of Mult_Supplier 2002 for a given index. Temp 2004 is rounded to the first digit to the left of the decimal point in step 2004. A determination of whether Temp 2006 is equal to zero is made in step 2006. If the determination 2006 is true, then Price_Dist array element 2008 is set to zero. The Current_Index 2010 is incremented by one in step 2010. If the determination 2006 is false, the If statement 2006 is terminated in the End If statement 2012.

Figure 21:
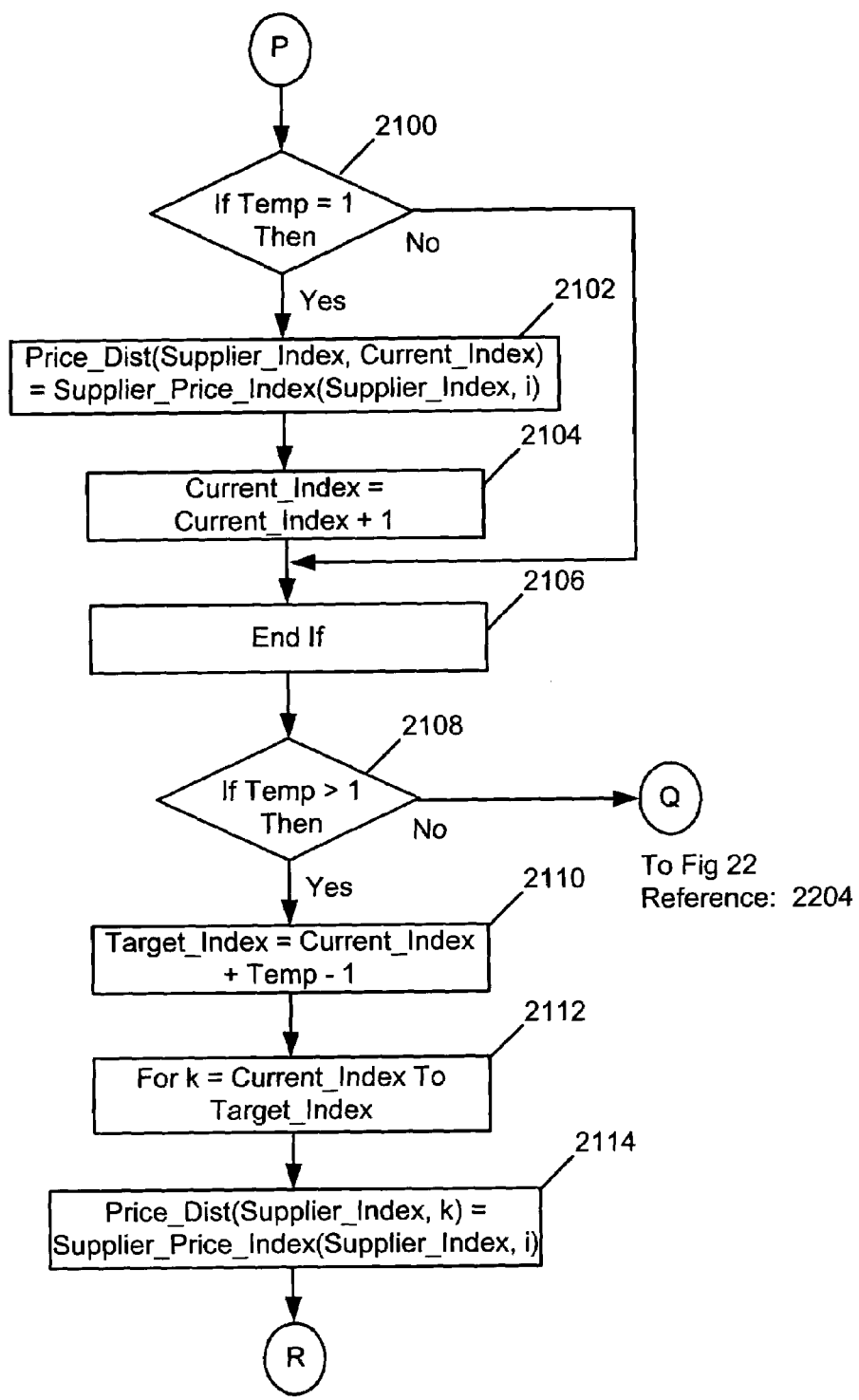
FIG. 21 is a flow chart that illustrates the continued calculation of the Price Distribution.

FIG. 21 is a flow chart that illustrates the completion of the Price Distribution calculations. A determination 2100 as to whether Temp 2100 is equal to one is made in step 2100. If the determination 2100 is true, then an array element of the Price_Dist Array 2102 is loaded with a value stored in the Supplier_Price_Index Array 2102. Current_Index 2104 is incremented by one in 2104. If determination 2100 is false, then the If statement 2100 terminates in an End If statement 2106. A determination as to whether Temp 2108 is greater than one is made in 2108. If the determination is true, then Target_Index 2110 is calculated by adding Current_Index 2110 and Temp 2110, then subtracting one. A programming loop defined by steps 2112 through 2200 is initiated with the For statement 2112. k 2112 is set equal to Current_Index 2112 and incremented by one until the value stored in Target_Index 2112 plus one is reached. The index array element of Price_Dist 2114 stores the value contained in the indexed array element of Supplier_Price_Index 2114.

Figure 22:
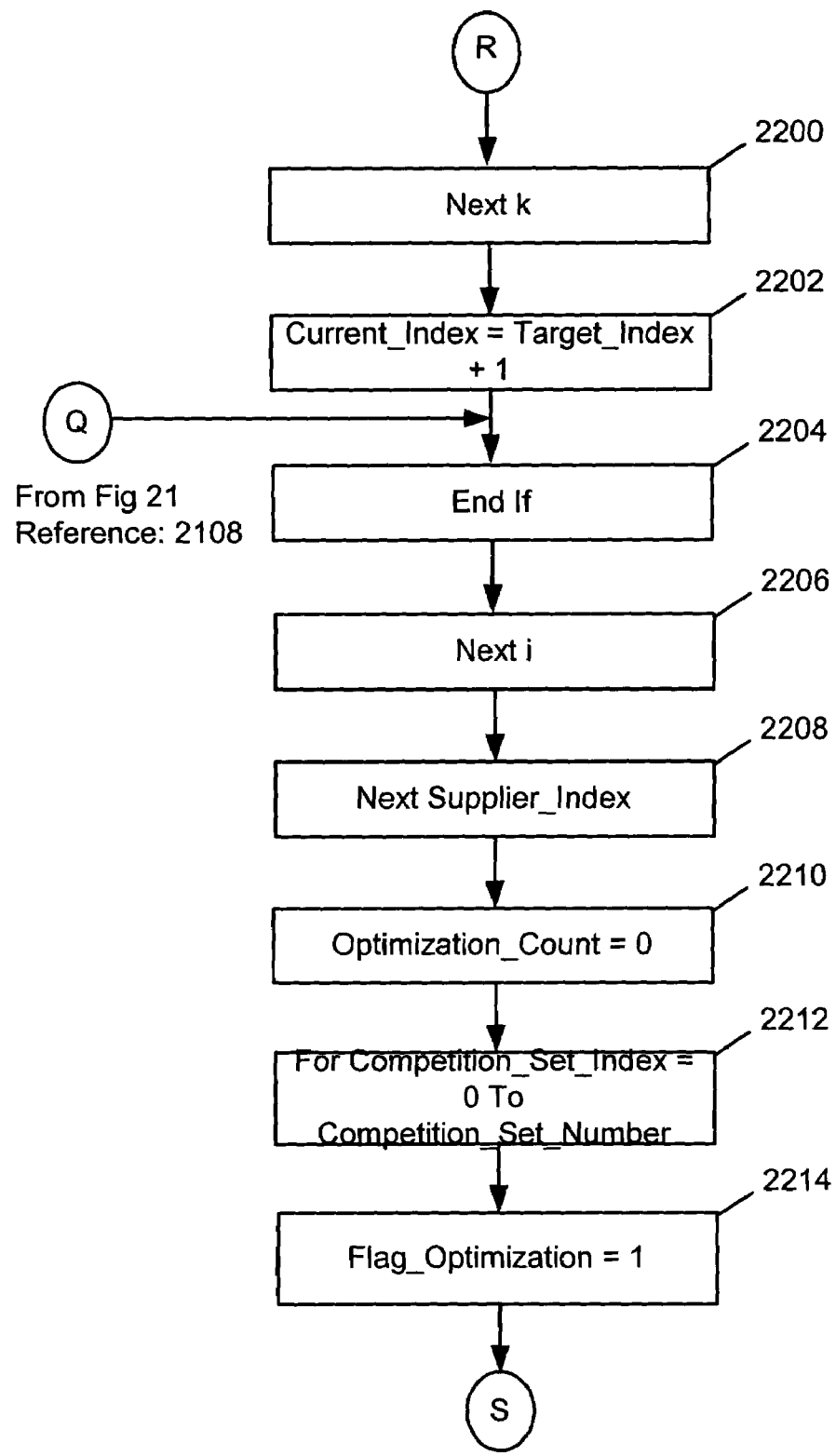
FIG. 22 is a flow chart that illustrates the completion of the Price Distribution calculations.

FIG. 22 is a flow chart that illustrates the completion of the Price Distribution calculations. The Next k statement 2200 increments k by one and the programming loop defined by steps 2112 through 2200 repeated until the value stored in Target_Index 2112 plus one is reached. The Current_Index 2202 is calculated by adding one to Target_Index 2202. If the determination 2108 is false, then the If statement 2108 is terminated in an End If statement 2204. The Next i 2206 statement increments i 2206 and the programming loop defined by steps 2000 through 2206 repeated. The Next Supplier_Index statement 2208 increments Supplier_Index 2208 by one and the programming loop defined by steps 1906 through 2208 repeated. The variable Optimization_Count 2210 is set equal to zero. A programming loop defined by steps 2210 through 6106 is initiated by the For statement 2212. Competition_Set_Index 2212 is set equal to zero and incremented in steps of one to the value Competition_Set_Number 2212 plus one. The variable Flag_Optimize 2214 is set equal to one.

Figure 23:
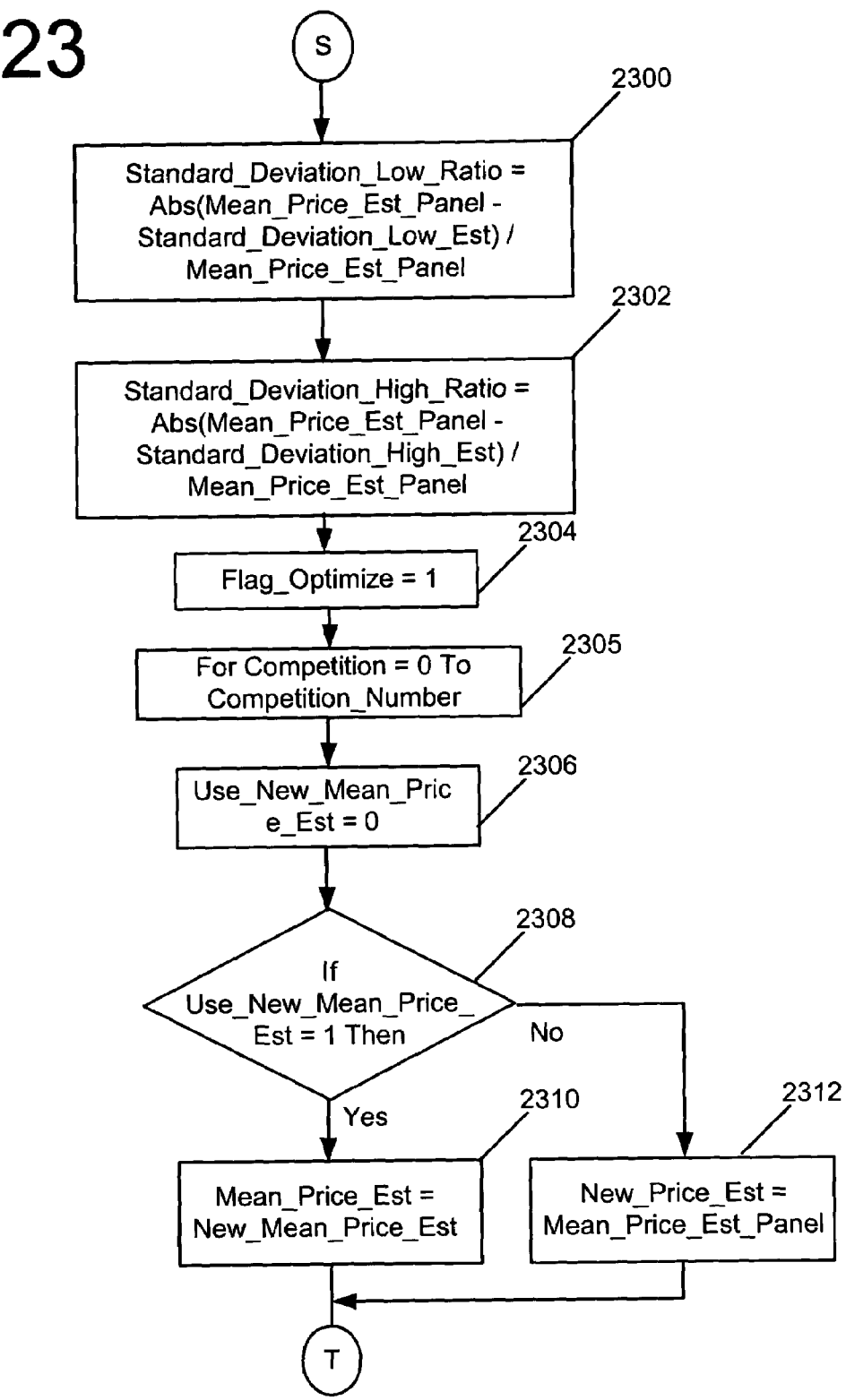
FIG. 23 is a flow chart that illustrates the initial steps of determining the Expected Results Array.

FIG. 23 is a flow chart that illustrates the initial steps of determining the Expected Results Array. The standard deviation low ratio, the ratio of the lower standard deviation to the mean price, is calculated in 2300 and assigned to variable Standard_Deviation_Low_Ratio 2300. The standard deviation high ratio, the ratio of the upper standard deviation to the mean price, is calculated in 2302 and assigned to variable Standard_Deviation_High_Ratio 2302. The flag, Flag_Optimization 2304, that determines whether an optimization is conducted is set to 1 in 2304. A programming loop is established by steps 2305 through 5806 and is initiated by the For statement 2305. The variable Competition 2305 is set equal to zero and is incremented in steps of one to a value store in the variable Competition_Number 2305 plus one. The flag, Use_New_Mean_Price 2306, is set to zero in 2306, which indicates the user's initial estimate of the mean price should be used rather than the estimate derived by the application. The optimization loop, defined by steps 608 through 3302, begins with a program branch 608. The program branches in 2308 based on the value of Use_New_Mean_Price 2308. If Use_New_Mean_Price 2308 has a value of one, the the program uses a New_Mean_Price_Est 2310 derived in subsequent steps. If Use_New_Mean_Price 2308 does not have a value of one, then the value the user entered in FIG. 4, menu 400, field 402 is used and is implemented by assigning the value stored in Mean_Price_Est Panel 2312 to NewPrice_Est 2312.

Figure 24:
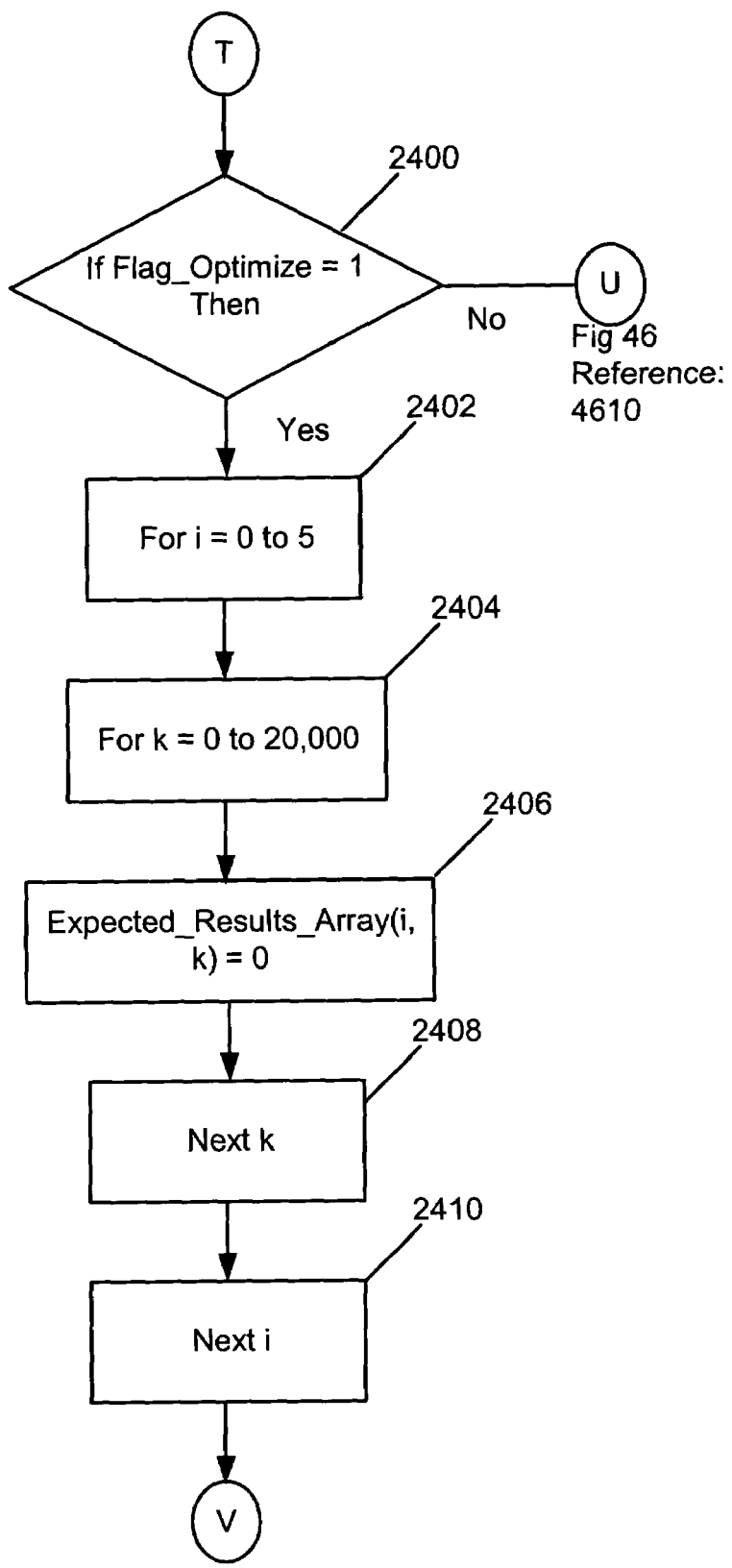
FIG. 24 is a flow chart illustrating the beginning of the optimization loop.

FIG. 24 illustrates the determination of whether the optimization will be conducted or delayed. If Flag_Optimization 2400 is not equal to one, then the optimization is delayed and the If statement 2400 terminates in and End If statement 4610. If Flag_Optimization 2400 is one, then the two dimensional array of size 5 by 20,000 called Expected_Results_Array 2406 is initialized to zero in a For—Next loop established by 2402, 2404, 2406, 2408, and 2410. Expected_Results_Array 2406 will store the expected win rate, revenue, and gross profit, for a given mean price estimate and price.

Figure 25:
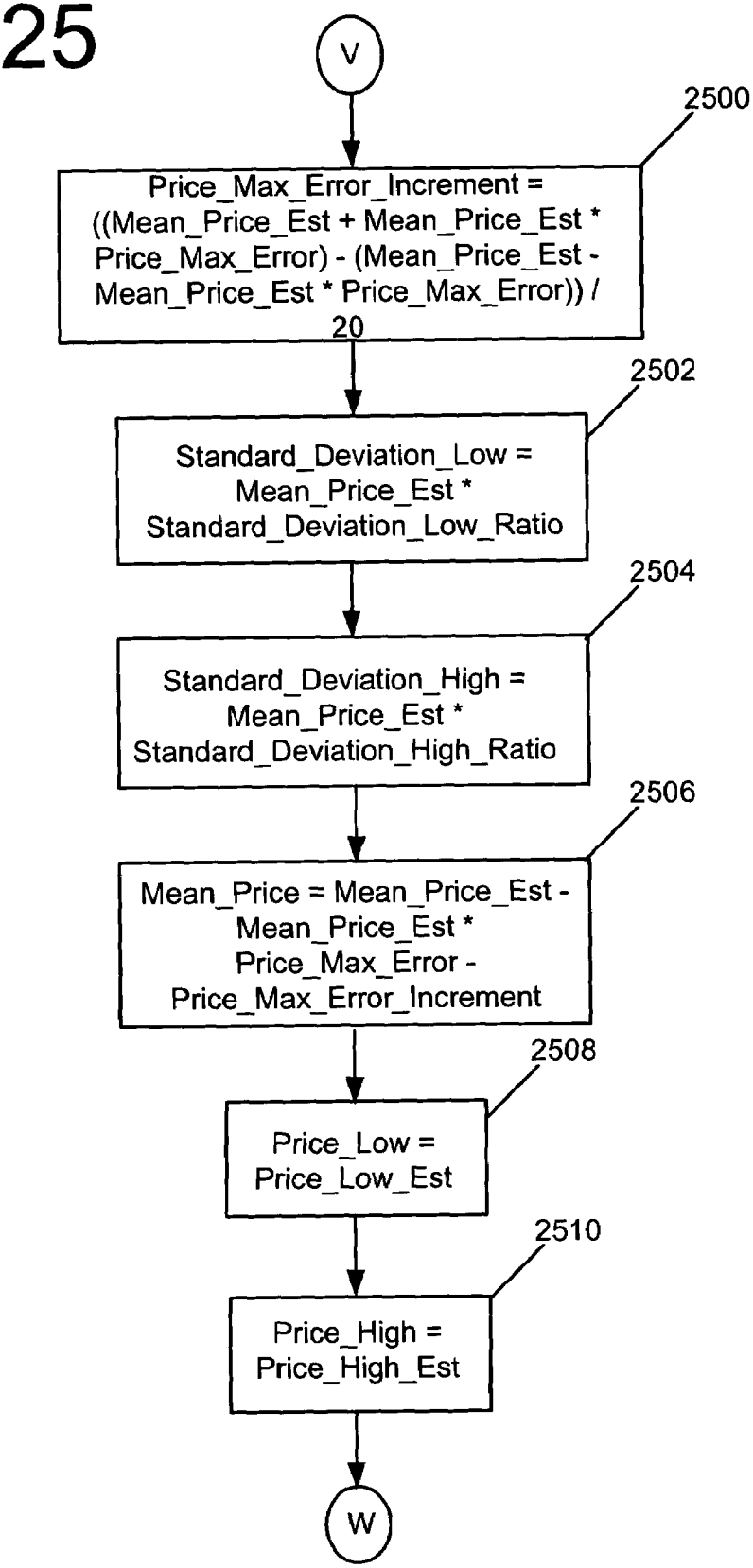
FIG. 25 is a flow chart illustrating the assignment of optimization variables.

FIG. 25 is illustrates the assignment of optimization variable. The size of the price increments between the lower and upper bounds of the range of Mean_Price_Est 2500, as defined by the user's entry in FIG. 4, field 402, is calculated in 2500. The lower standard deviation is calculated and assigned to Standard_Deviation_Low 2502. The upper standard deviation is calculated in and assigned to Standard_Deviation_High 2504. The first Mean_Price is calculated in 2506. The value for Price_Low_Est 2508 is assigned to Price_Low 2508. The value for Price_High_Est 2510 is assigned to Price_High 2510.

Figure 26:
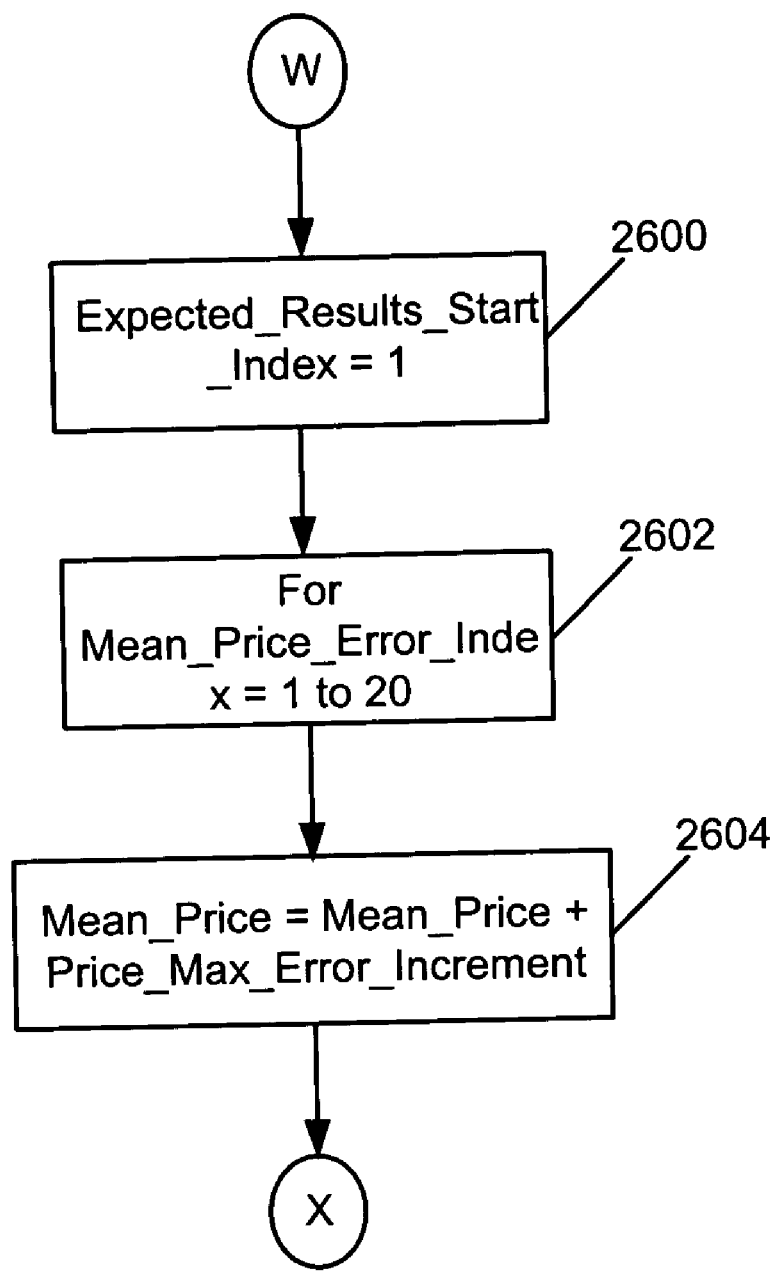
FIG. 26 is a flow chart illustrating the assignment of optimization variable and initiation of the Mean Price Error Index Loop.

FIG. 26 illustrates the assignment of the optimization variables and the initiation of the Mean Price Error Loop defined by steps 2602 through 3310. The value of Expected_Results_Start_Index 2600 is set to one. The Mean Price Error Loop defined by steps 2602 through 3310 is initiated by the For statement in 2602. The value of mean price is calculated and assigned to Mean_price 2604, which is recalculated for every repetition of the Mean Price Error Loop defined by steps 2602 through 3310.

Figure 27:
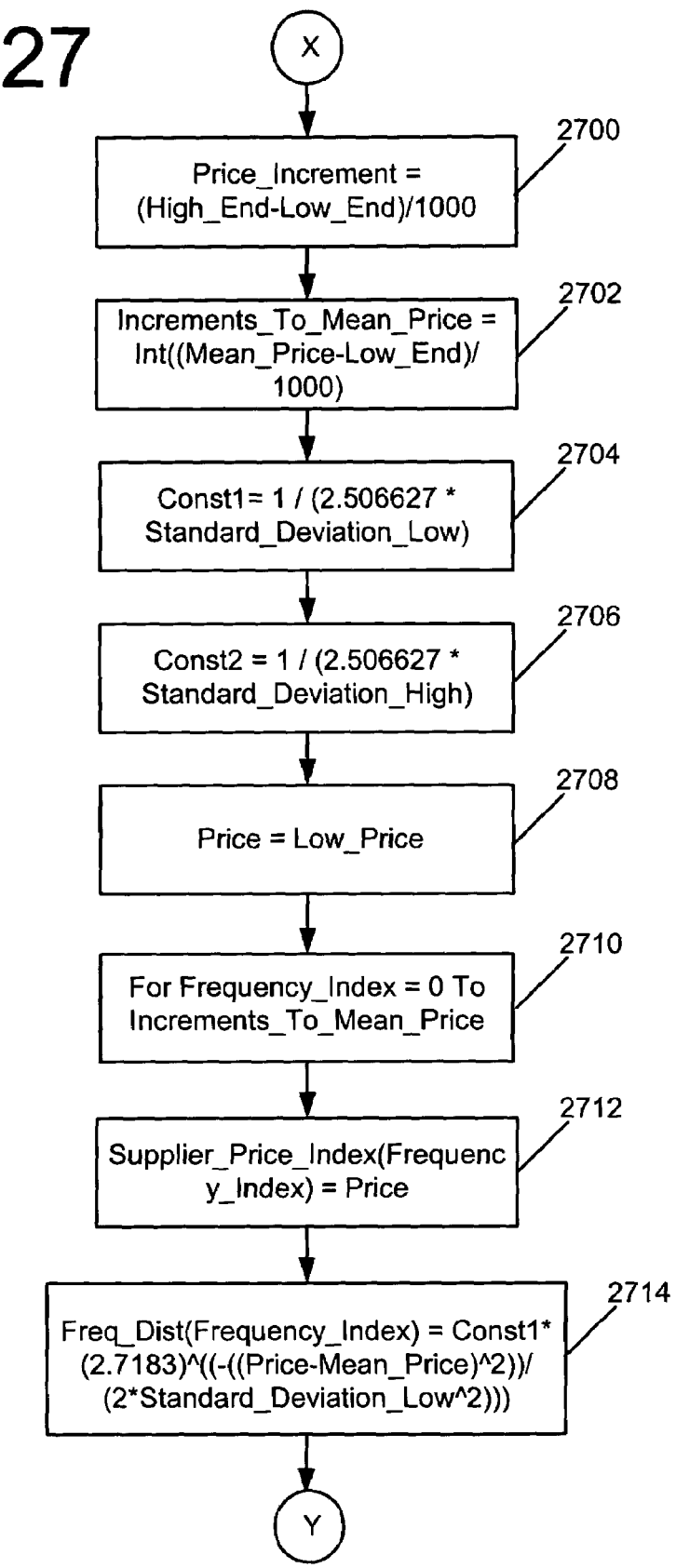
FIG. 27 is a flow chart illustrating the assignment of optimization variables and the calculation of the lower portion of the Frequency Distribution Array.

FIG. 27 illustrates the assignment of optimization variables and a continuation of the Mean Price Error Loop. FIG. 27 begins by determining the number of price increments represented by Price_Increment 2700 contained in the range of the frequency distribution, as well as the number of increments from the low end to the mean price represented by Increments_To_Mean_Price 2702. The values for variables Const1 2704 and Const2 2706 are calculated. The value of Price 2708 is initialized. A programming loop 2710 to 2802 is established that increments Frequency_Index 2710 in single steps to Increments_To_Mean_Price 2710. The value of variable Price 2708 is stored in Supplier_Price_Index 2712. The Frequency Distribution for the given variable Price 2708 is calculated and stored in an array called Freq_Dist 2714.

Figure 28:
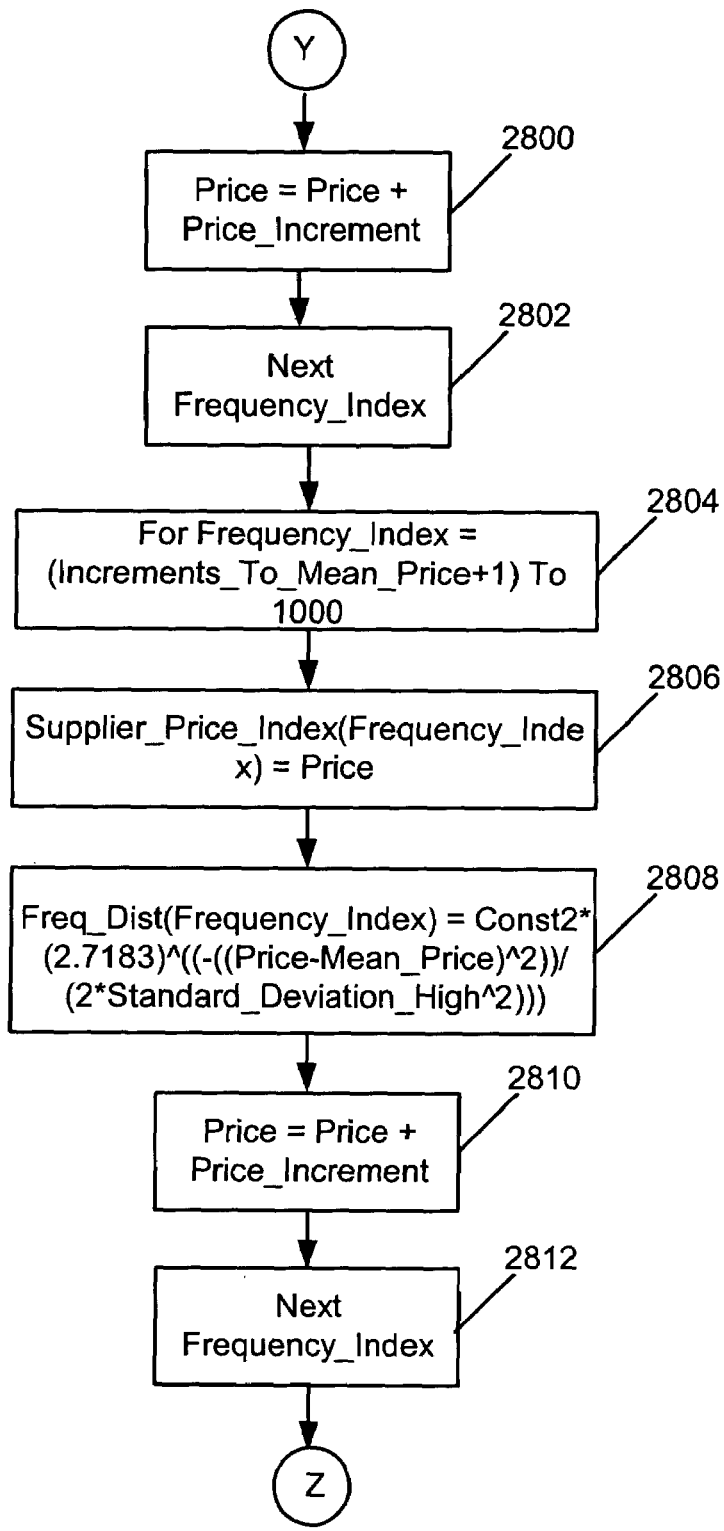
FIG. 28 is a flow chart illustrating the continued creation of the upper portion of the Frequency Distribution Array.

FIG. 28 illustrates the continued creation of the upper portion of the Frequency Distribution Array. The next value for the variable Price 2708 is calculated in 2800. The Frequency_Index 2802 is increment and the instruction in the loop 2710 repeated until the value of Frequency_Index 2710 is equal to Increments_To_Mean_Price 2710 plus one. A programming loop defined by steps 2804 through 2812 is established that increments Frequency_Index 2804 from the value of Increments_To_Mean_Price 2804 plus one in steps of one to 1000 inclusive. The Supplier_Price_Index 2806 array is set to the value contained in the variable Price 2806. The value for Freq_Dist 2808 array is calculated. The value of Price 2810 is incremented by the value of Price_Increment 2810. The Frequency_Index 2812 is incremented and the instructions in programming loop defined by steps 2802 through 2812 is repeated until the value of Frequency_Index 2804 is equal to Increments_To_Mean_Price 2804 plus one.

Figure 29:
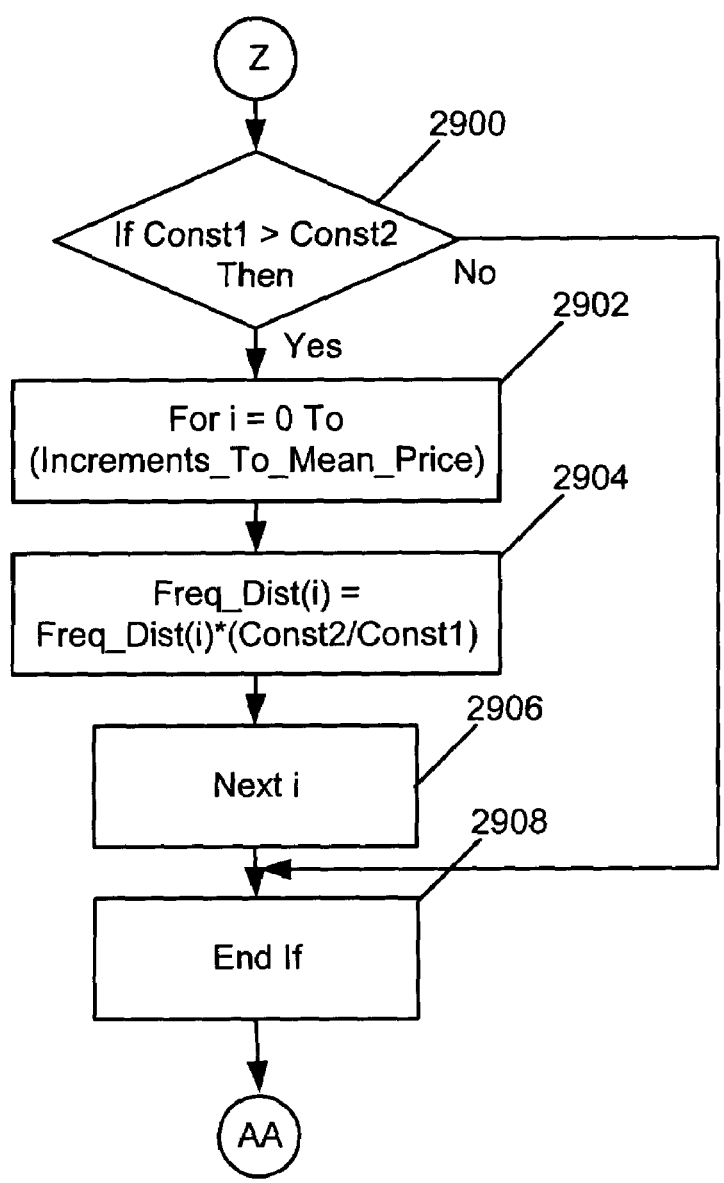
FIG. 29 is a flow chart illustrating the smoothing of the Frequency Distribution Array data.

FIG. 29 illustrates the smoothing of the Frequency Distribution Array data. The flow diagram that is the continuation of the Frequency Distribution Engine 118 referenced in FIG. 1 and relates to the normalization of the two halves of the distribution curve. The normalization begins with a determination 2900 of whether Const1 2900 is larger than Const2 2900. If it the determination 2900 is true, then a programming loop defined by steps 2902 through 2906 is initiated where i 2902 is initialized to zero and incremented by one to a value of Increments_To_Mean_Price 2902 plus one. The value stored in the array Freq_Dist(i) 2904 is multiplied by the ratio of Const2 2904 divided by Const1 2904 and restored in Freq_Dist(i) 2904. Then the value of i 2906 is incremented and the loop defined by 2902 through 2906 repeated. If Const1 2900 is not larger than Const1 2900, then the determination results in the End If 2908 statement.

Figure 30:
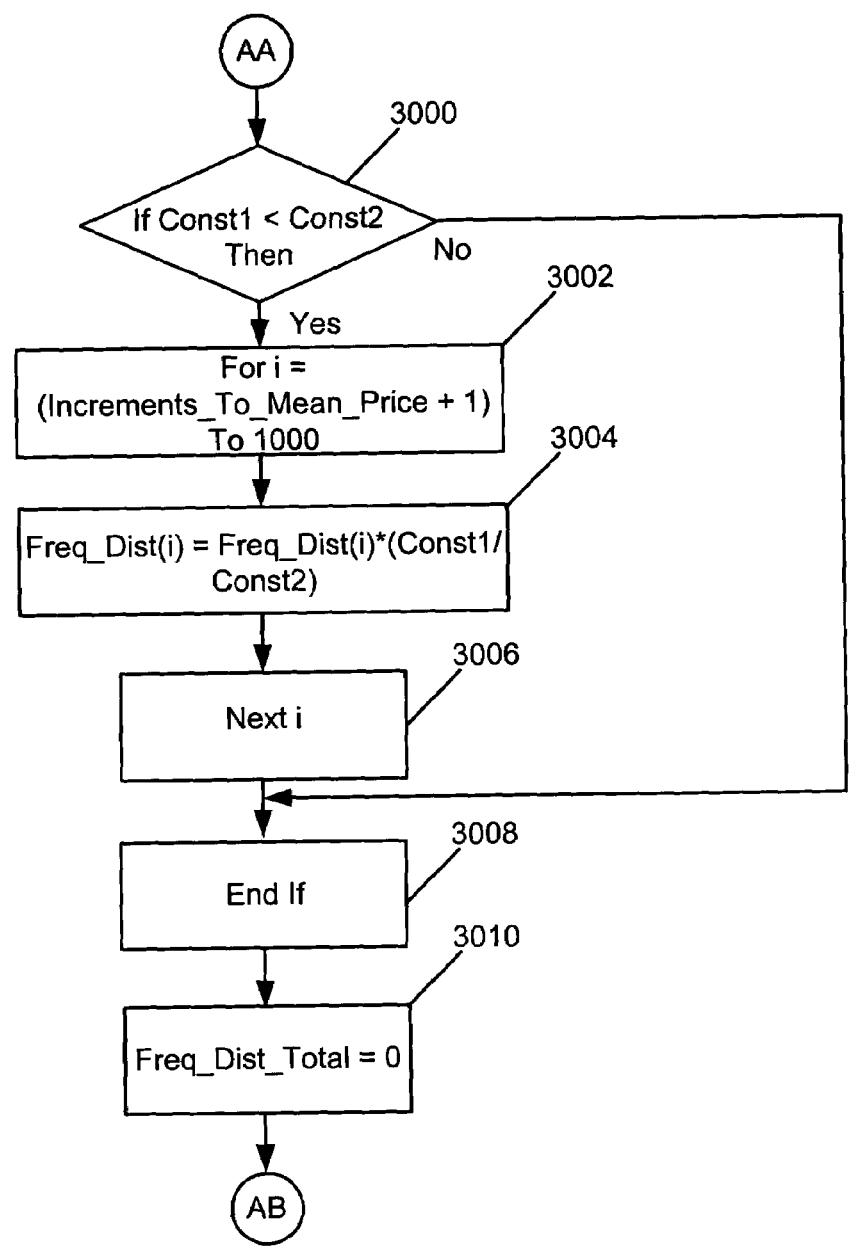
FIG. 30 is a flow chart illustrating the continued smoothing of the Frequency Distribution Array data.

FIG. 30 illustrates the continued smoothing of the Frequency Distribution Array and the determination of the Expected Results Array. If the determination 2900 is false, then a second determination 3000 of whether Const1 3000 is less than Const2 3000. If the determination 300 is true, then a programming loop 3002 through 3006 is established where i 3002 is initialized to a value of Increments_To_Mean_Price 3002 plus one and stepped by increments of one. The value stored in the array Freq_Dist(i) 3004 is multiplied by the ratio of Const2 3004 divided by Const1 3004 and restored in Freq_Dist(i) 3004. The value of i 3006 is incremented and the programming loop defined by 3002 through 3006 repeated. Once the programming loop defined by 3002 through 3006 is complete, a variable which represents the integrated value of the Frequency Distribution Array, Freq_Dist_Total 3010 is set to zero. If the determination of 3000 is false, the If statement 3000 terminats in an End If statement 3008, then the routine proceeds to step 3010 where Freq_Dist_Total is set to zero. The Probability of Win Engine 120 referenced in FIG. 1 calculates the probability of a customer purchasing a subject good or service based on a number of competitions. For programming expediency, the Probability of Win Engine 120 is embedded in the Expected Results Engine 122.

Figure 31:
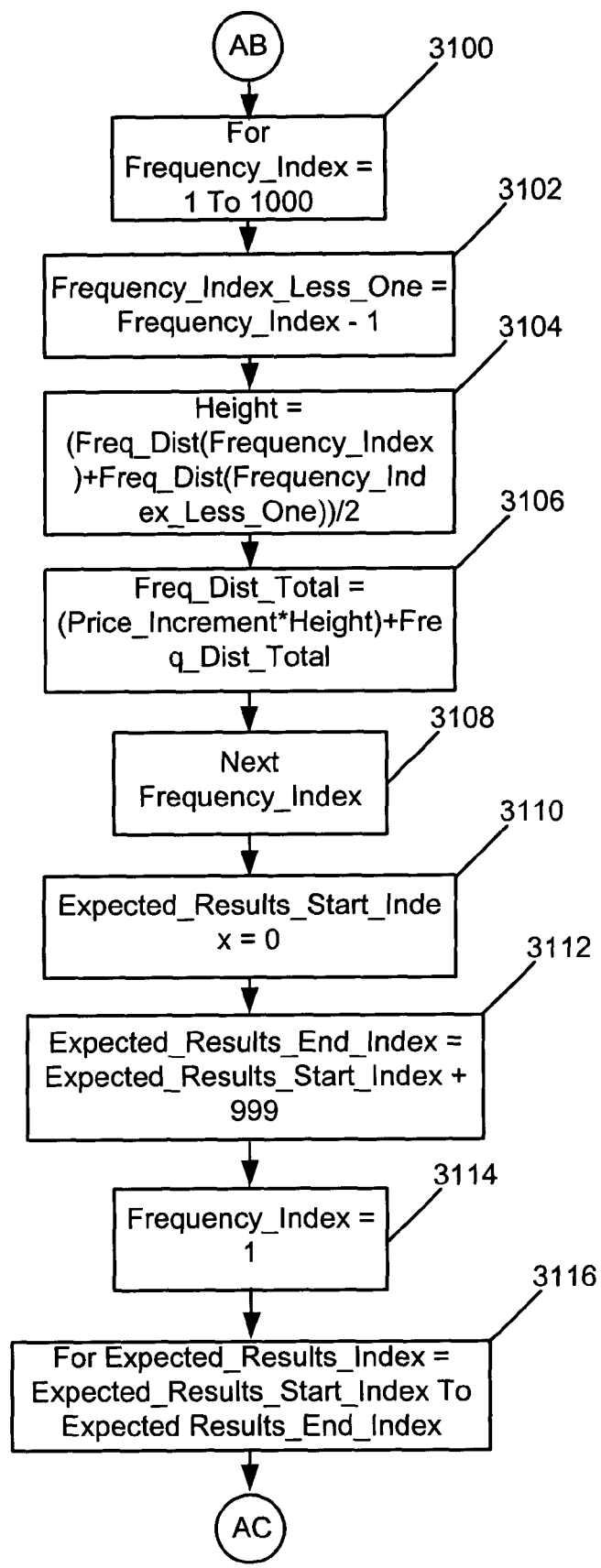
FIG. 31 is a flow chart illustrating the integration of the Frequency Distribution Array and the determination of the Expected Results Array.

FIG. 31 shows the flow diagram that is part of the Expected Results Engine 122 referenced in FIG. 1. The programming loop defined by steps 3100 through 3108 is used to integrate, or sum, the values defined by the first and last array elements of the Frequency Distribution Array. The programming loop defined by steps 3100 through 3108 is initiated by setting Frequency_Index 3100 to one and then incrementing in steps of one to 1000 for each loop. Frequency_Index_Less_One 3102 is calculated. The variable Height 3104 is calculated by taking the average of two adjacent values of array Freq_Dist 3104 for a given value of Frequency_Index 3104. Freq_Dist_Total 3106 is calculated by multiplying the Price_Increment 3106 by the Height 3106 and summing to the previous value of Freq_Dist_Total 3106. The next Frequency_Index 3108 is calculated by incrementing Frequency_Index 610 by one. The programming loop defined by 3100 through 3108 is repeated until Frequency_Index 3100 equals 1001.

On completion of the programming loop defined by steps 3100 through 3108, the value of Expected_Results_Index 3110 is set to zero. The value of Expected_Results_End_Index 3112 is calculated. The value of Frequency_Index 3114 is set to one. The programming loop defined by 3116 through 3308 is established where the value of Expected_Results_Index 3116 is set to the value of Expected_Results_Start_Index 3116 and is incremented by one until Expected_Results_End_Index 3116 is exceeded by a value of one.

Figure 32:
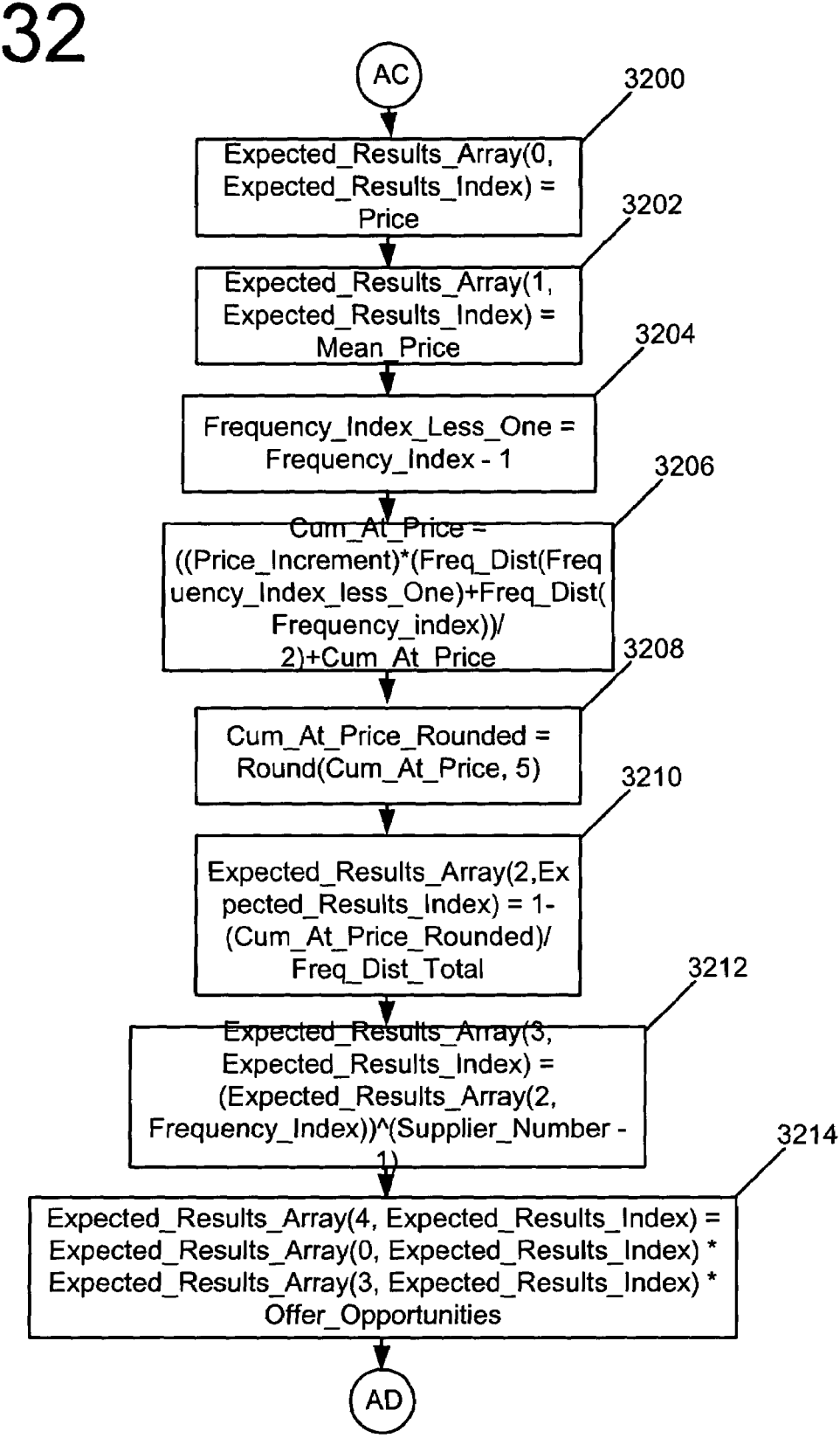
FIG. 32 is a flow chart illustrating the continued determination of the Expected Results Array.

FIG. 32 shows the continuation of the flow diagram that is part of the Expected Results Engine 122 referenced in FIG. 1. The Price 3200 is stored in the Expected_Results_Array 3200 column zero. The Mean_Price 3202 is stored in the Expected_Results_Array 3202 column one. The value for Frequency_Index_less_One 3204 is calculated. The value for Cum_At_Price 3206 is calculated in step 3206. The value for Cum_At_Price_Rounded 3208 which represents the integral from the value Low_End 808 to the current value of Price 3200 is calculated. The value for Expected_Results_Array 3210 column two is calculated and depicts the probability of win with one competitor. The value for Expected_Results_Array 3212 column three is calculated and depicts the probability of win with for more than one supplier. The value for Expected_Results_Array 3214 column four is calculated and depicts the anticipated revenue for a specific price based on the number of offer opportunities.

Figure 33:
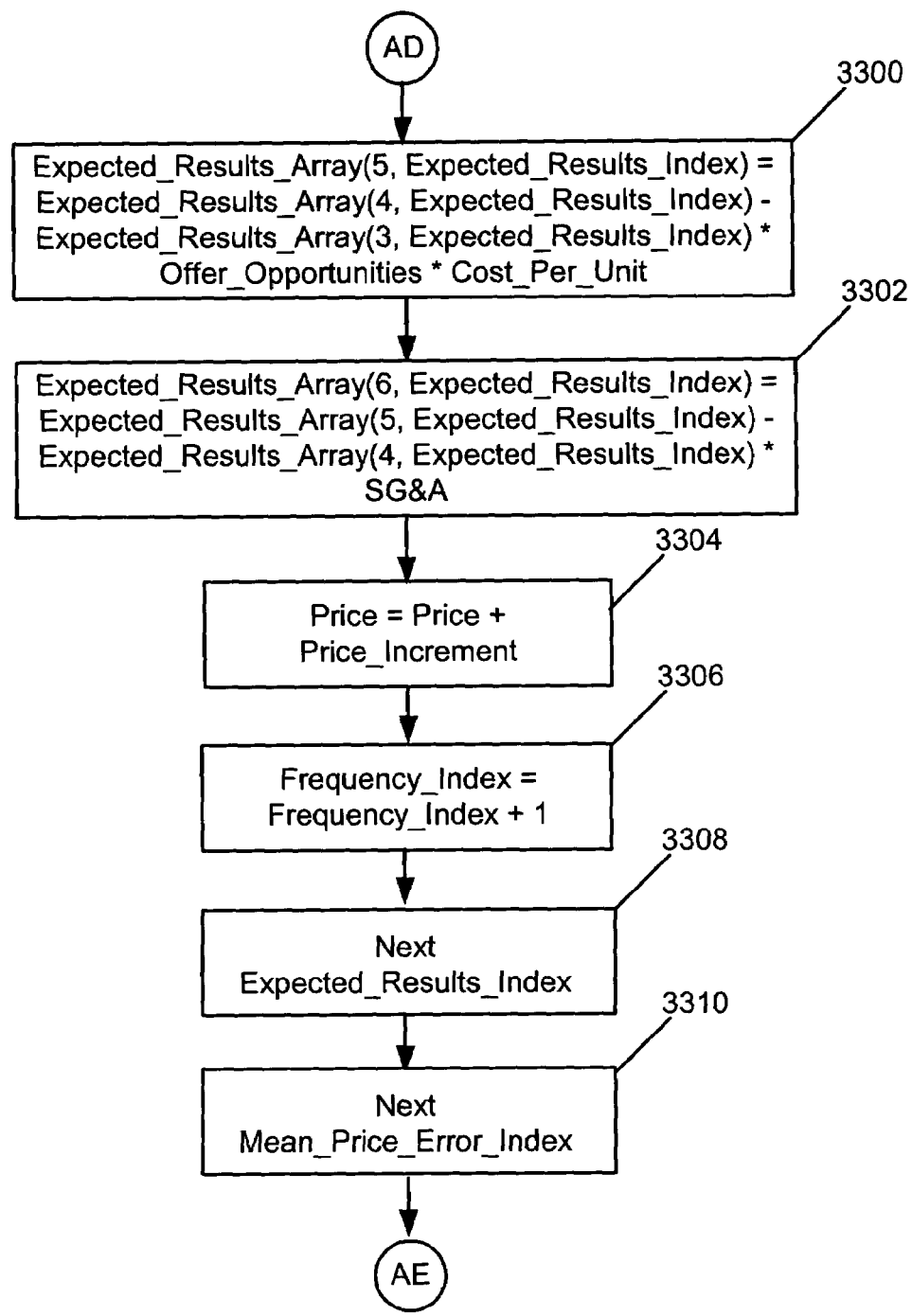
FIG. 33 is a flow chart illustrating the continued determination of the Expected Results Array.

FIG. 33 shows the continuation of the flow diagram that is part of the Expected Results Engine 122 referenced in FIG. 1. The value for Expected Results Array 3300 column five is calculated and depicts the anticipated gross profit for a specific price based the anticipated revenue and cost-of-goods. The value for Expected_Results_Array 3302 column six is calculated and depicts the anticipated earnings before income tax. The value of Price 3304 is incremented. The value of Frequency_Index 3306 is incremented. The value of Next_Expected_Results_Index 3308 is incremented and the programming loop defined by steps 3316 through 3310 repeated until Expected_Results_End_Index plus one is reached.

Figure 34:
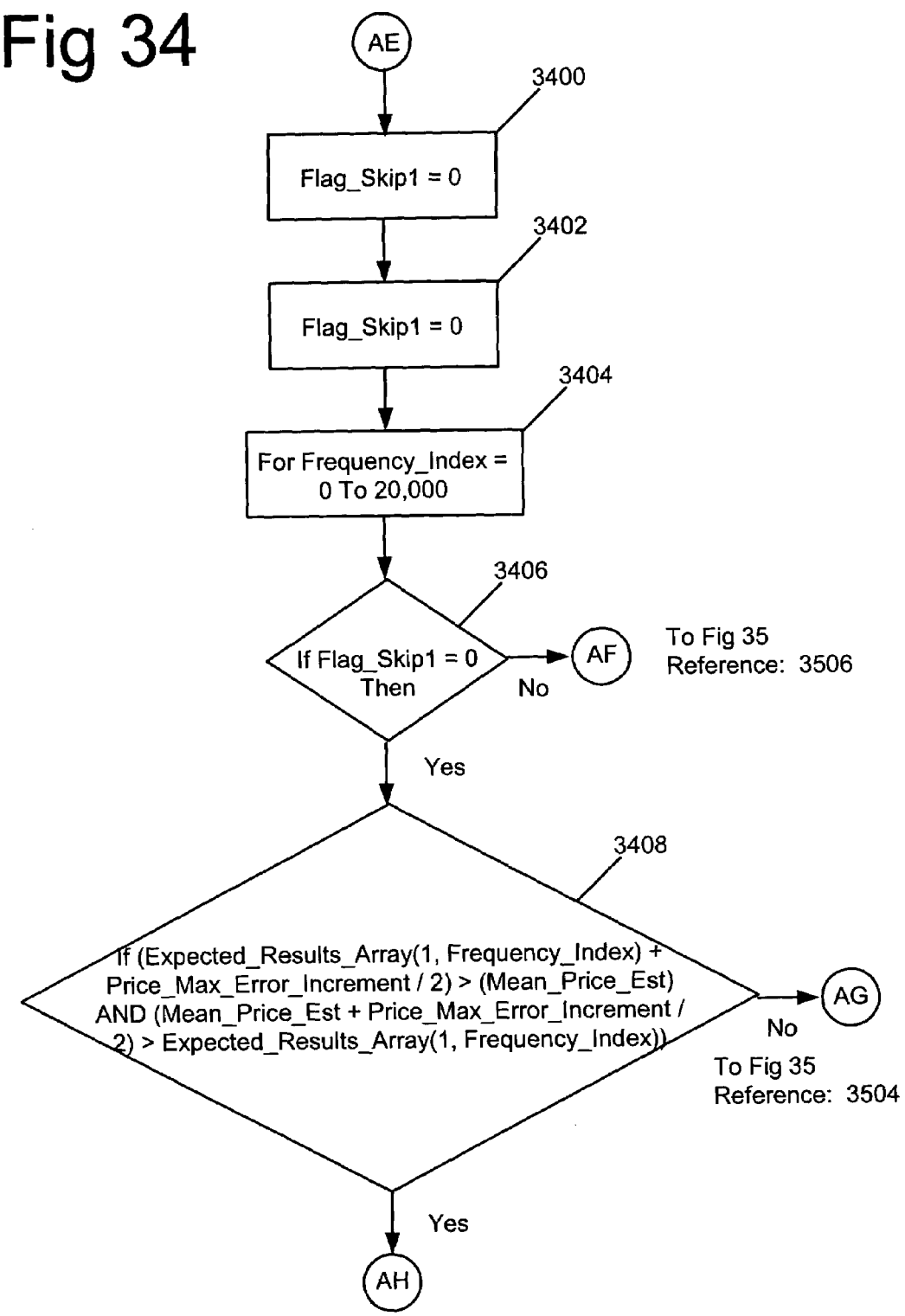
FIG. 34 is a flow chart illustrating the search for Mean Price Estimate plus and minus an uncertainty in the Expected Results Array.

FIG. 24 shows the continuation of the flow diagram that is part of the Expected Results Engine 122 referenced in FIG. 1. FIG. 34 initiates the steps associated with identifying the first and last indexes of values contained in Expected Results Array corresponding to the current value Mean_Price_Est. As a result of potential rounding error, an uncertainty for Mean_Price_Est must be incorporated into the search. Flag_Skip_1 3400 is set to zero indicating that the first value of interest in a subsequent search has not been found. Flag_Skip2 3402 is set to zero indicating that the second value of interest in a subsequent search has not been found. A programming loop defined by steps 3404 through 3700, is established to search the for the first index in the Expected Results Array where the value of Mean Price plus or minus a tolerance equals Mean_Price_Est. The For statement 3404 initiates the programming loop defined by 3404 through 3700. A determination of whether Flag_Skip1 3406 is equal to zero is made. If Flag_Skip1 3406 is not equal to zero, then step 3506 is executed. If Flag_Skip1 3406 is equal to zero, then the value of Mean Price contained in the Expected_Results_Array 3408 is checked starting with the index value corresponding to Frequency_Index 3408. If Flag_Skip1 3406 is not equal to zero, then the If statement 3406 terminates in an End If statement 3506. If the Mean Price value is equal to Mean_Price_Est 3408, the program proceeds to the steps shown in FIG. 35. If the Mean Price value is not equal to Mean_Price_Est 3408, then the If statement 3408 terminates in an End If statement 3504.

Figure 35:
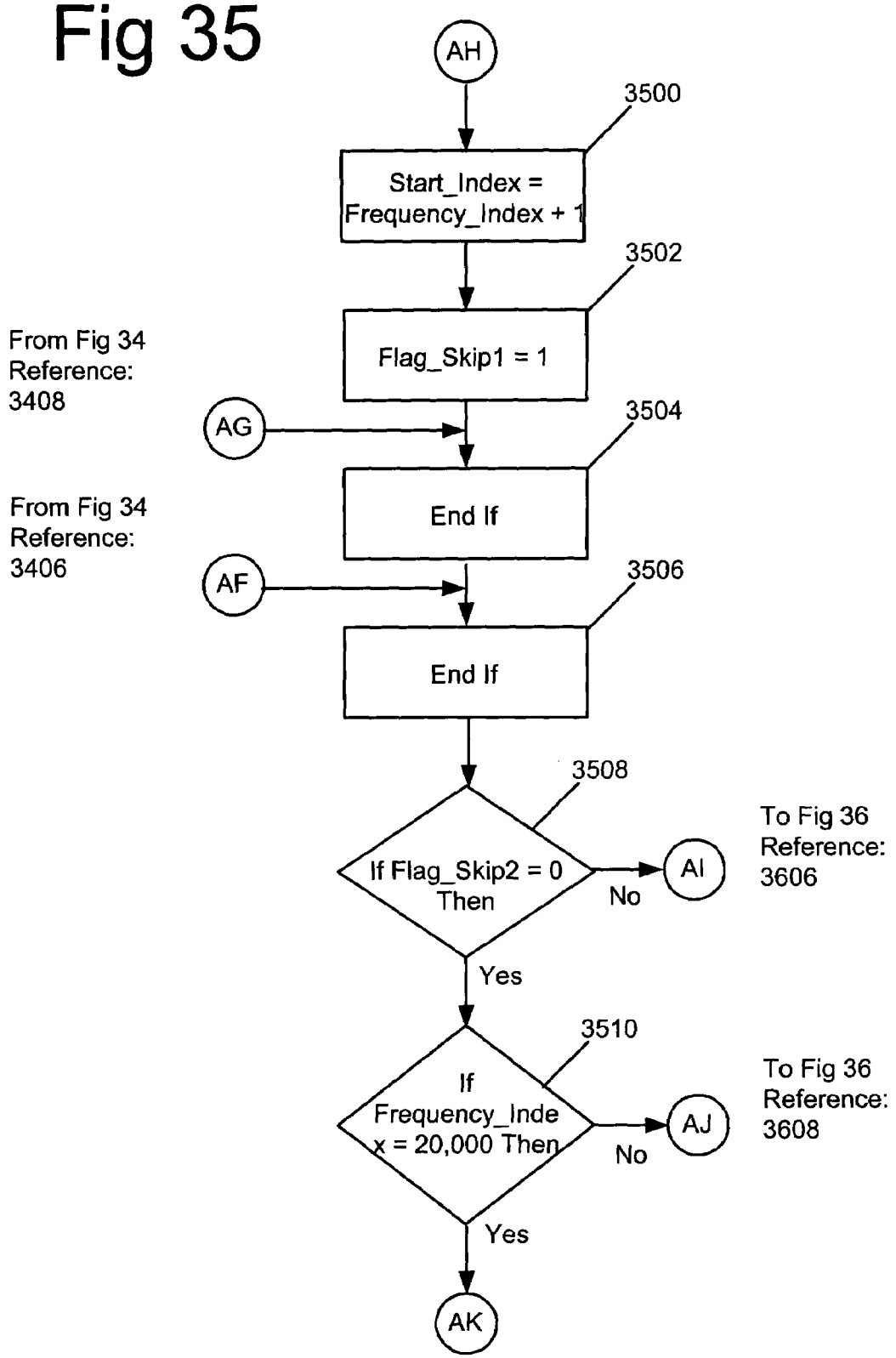
FIG. 35 is a flow chart illustrating the continued search for Mean Price Estimate plus and minus an uncertainty in the Expected Results Array.

FIG. 35 shows the continuation of the flow diagram that is part of the Expected Results Engine 122 referenced in FIG. 1. FIG. 35 illustrates the continued search in the Expected Results Array corresponding to the first index value of the array element Mean Price corresponding to the value stored in the variable Mean_Price_Est. If the value corresponding to Mean Price contained in the Expected_Results_Array is equal to Mean_Price_Est, then the value of Start_Index 3500 is set to Frequency_Index 3500 plus one. Flag_Skip1 3502 is set to one indicating that the index of the first Mean Price in Expected_Results_Array has been identified. A determination is made as to whether Flag_Skip2 3508 is equal to zero. If Flag_Skip2 3508 is not equal to zero, the last instance of the Mean Price in Expected_Results_Array has not been identified, and the program proceeds to step 3606 listed in FIG. 36. If Flag_Skip2 3508 is equal to zero, then a determination is made as to whether Frequency_Index 3510 is equal to 20,000, and then the steps shown in FIG. 36 executed.

Figure 36:
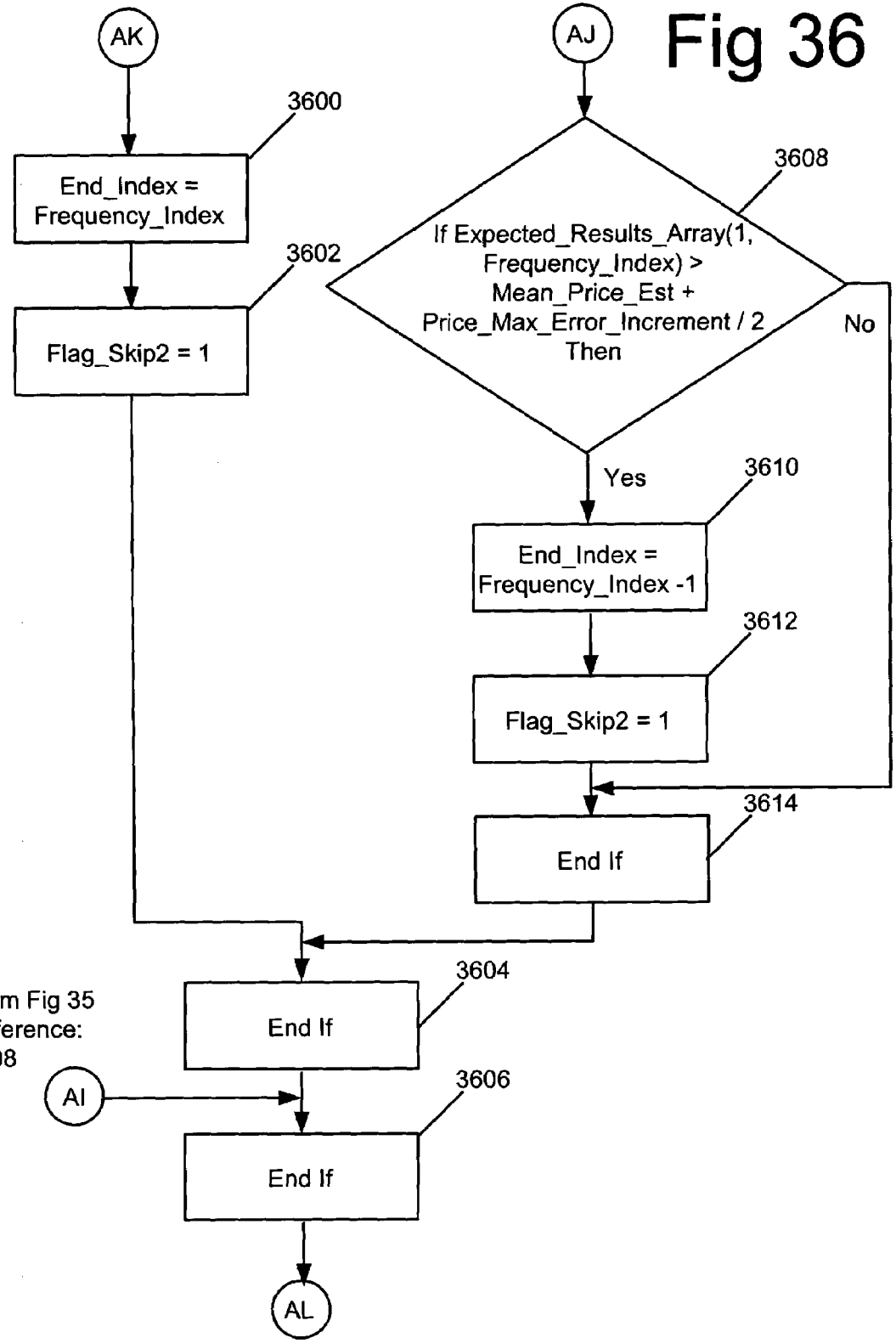
FIG. 36 is a flow chart illustrating the continued search for Mean Price Estimate plus and minus an uncertainty in the Expected Results Array.

FIG. 36 shows the continuation of the flow diagram that is part of the Expected Results Engine 122 referenced in FIG. 1. FIG. 36 illustrates the continued search in the Expected Results Array corresponding to the first and last index value of the array element Mean Price corresponding to the value stored in the variable Mean_Price_Est. If the determination of Flag_Skip2 3508 equal to zero is not true, then the If 1808 statement is terminated in step 3606. If the determination of Flag_Skip 1808 equal to zero is true, then the determination of Frequency_Index 1810 equal to 20,000 is made. If Frequency_Index 1810 is equal to 20,000, then true, then the value of Frequency_Index is assigned to the variable End_Index 3600. Flag_Skip2 3602 is set to one and the If 3510 statement is terminated in 3604. If the determination that Frequency_Index is equal to 20,000 is true, then and value of Mean Price contained in the Expected_Results_Array 3608 is checked starting with the index value corresponding to Frequency_Index 3608. If the Mean Price value is equal to Mean_Price_Est 3608, the program proceeds to store the value of Frequency_Index less one in the variable End_Index 3610. The variable Flag_Skip2 3612 is set to one indicating that no further checking is necessary. If the Mean Price value is not equal to Mean_Price_Est 3508, the program proceeds to the End If 3614 statement.

Figure 37:
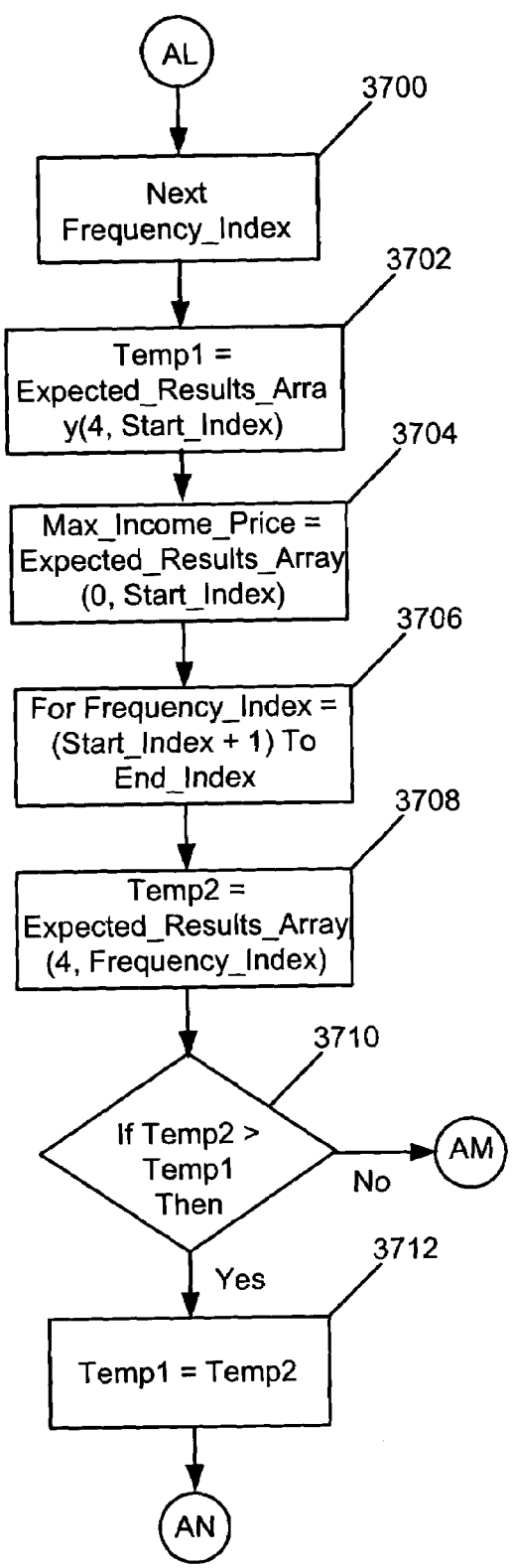
FIG. 37 is a flow chart illustrating the search in the Expected Results Array for the price that yields the maximum income.

FIG. 37 shows the continuation of the flow diagram that is part of the Expected Results Engine 122 referenced in FIG. 1. FIG. 37 illustrates the search in the Expected Results Array for the price and corresponding index that yields the maximum income. The Next 3700 statement completes the programming loop defined by steps 3404 to 3700 associated with the search for the first and last index values of the array elements Mean Price corresponding to the value stored in the variable Mean_price_Est. Temp1 3702 is assigned the first value of income in the Expected_Results_Array 3702 corresponding to the element point to by Start_Index 3702. The corresponding price to the first value of income in the Expected_Results_Array 3704 is assigned to the variable Max_Income_Price 3704. A programming loop defined by steps 3706 through 3806 is established. The For 3706 statement will increment Frequency_Index 3706 from Start_Index+1 1706 to End_Index 3706. Temp2 3708 stores the next array element in Expected_Results_Array depicting the projected income. A determination is made as to whether Temp2 3710 is larger than Temp1 3710, and if true, then Temp2 3712 is assigned to Temp 1 3712 and the program proceeds to the steps shown in FIG. 38. If the determination of whether Temp2 3710 is larger than Temp1 3710 is false, then the program proceeds to the steps shown in FIG. 21.

Figure 38:
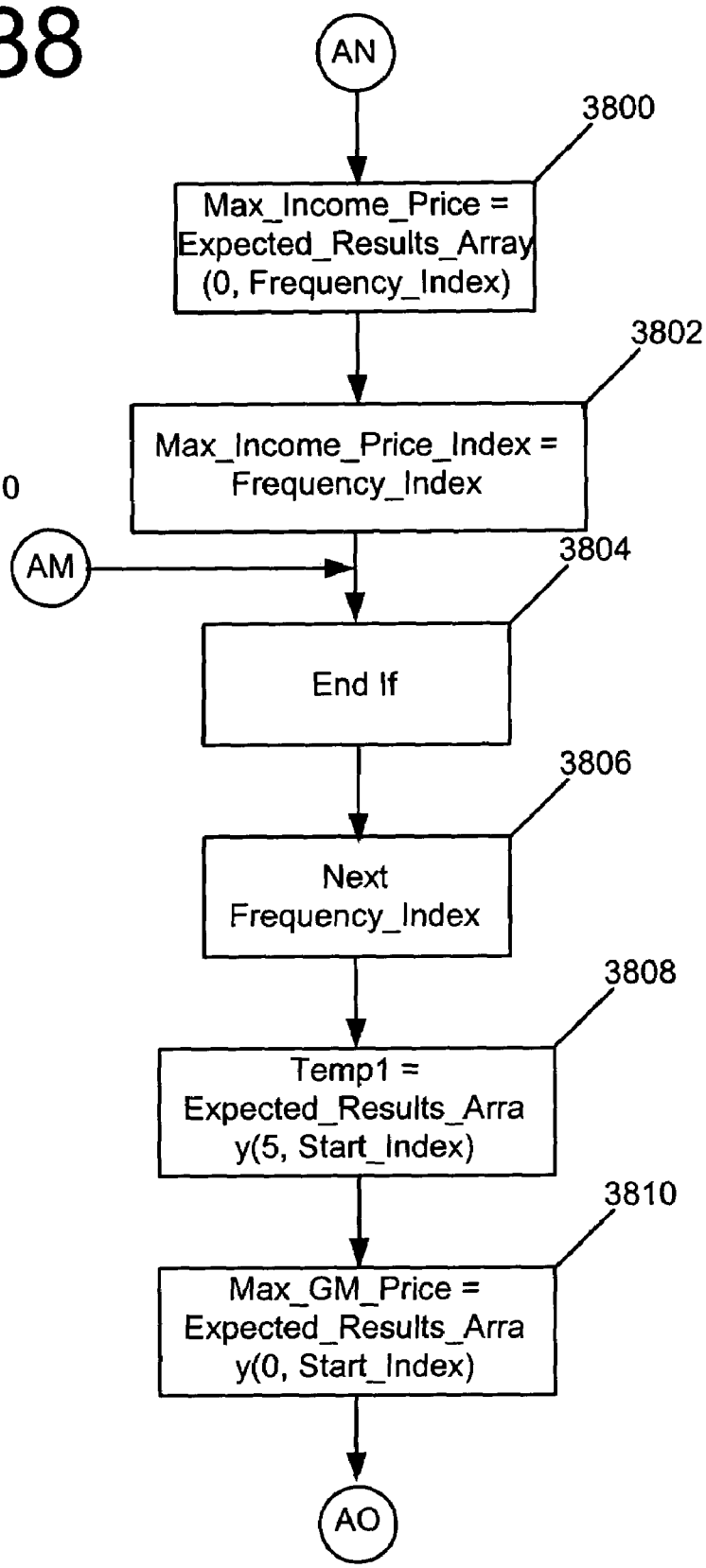
FIG. 38 is a flow chart illustrating the search in the Expected Results Array for the price and corresponding index that yields the maximum income and the search in the Expected Results Array for the price that yields the maximum profit.

FIG. 38 shows the continuation of the flow diagram that is part of the Expected Results Engine 122 referenced in FIG. 1. FIG. 38 illustrates the continued search in the Expected Results Array for the price and corresponding index that yields the maximum income. Max_Income_Price 3800 is set based on the first price entry in the Expected_Results_Array 3800. The Max_Income_Price_Index 3802 is set to the current Frequency_Index 3802. The End If 3804 statement terminates the If 3710 statement. The Frequency_Index 3806 is incremented and the programming loop defined by steps 3706 through 3806 repeated until Frequency_Inex 3706 exceeds End_Index 3706 by one.

Figure 39:
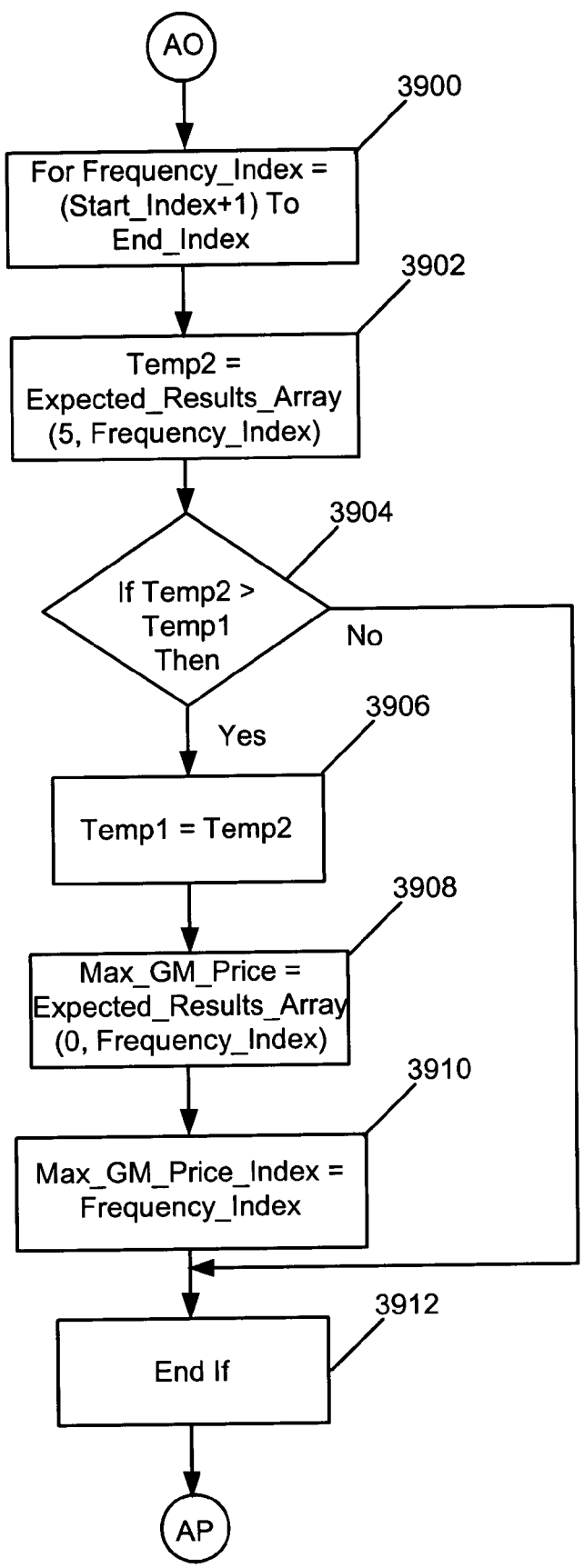
FIG. 39 is a flow chart illustrating the continued search in the Expected Results Array for the price and index that yields the maximum profit.

After the programming loop defined by steps 3706 through 3806 is completed, the program begins the process of identifying the price representing the highest gross profit. Temp1 3808 is assigned the gross profit value in the Expected_Results_Array 3808 based on Start_Index 3808. The price stored in the Expected_Results_Array corresponding to Temp1 3808 is stored in Max_GM_Profit 3810. FIG. 39 shows the continuation of the flow diagram that is part of the Expected Results Engine 122 referenced in FIG. 1. FIG. 39 illustrates the continued search in the Expected Results Array for the price and index that yields the maximum profit. A programming loop defined by steps 3900 through 4000 is initiated by the For 3900 statement. Frequency_Index 3900 is stepped in increments of one starting with the value (Start_Index1) 3900 to End_Index 3900. Temp2 3902 is assigned the value in Expected_Results_Array 3902 corresponding to profit pointed to by Frequency_Index 3902. A determination is made in as to whether Temp2 3904 is larger than Temp1 3904. If the determination is not true, then the If statement is terminated in the End If 3912 statement. If the determination is true, then Temp2 3906 is assigned to Temp1 3906. Max_GM_Price 3908 is assigned the value corresponding to price stored in the Expected_Results_Array 3908 pointed to by Frequency_Index 3908. Max_GM_Price_Index 3910 is assigned the current value of Frequency_Index 3910. The Frequency_Index 4000 is incremented by one and the programming loop defined by steps 3900 through 4000 repeated until the value of End_Index 3900 is exceeded by one.

Figure 40:
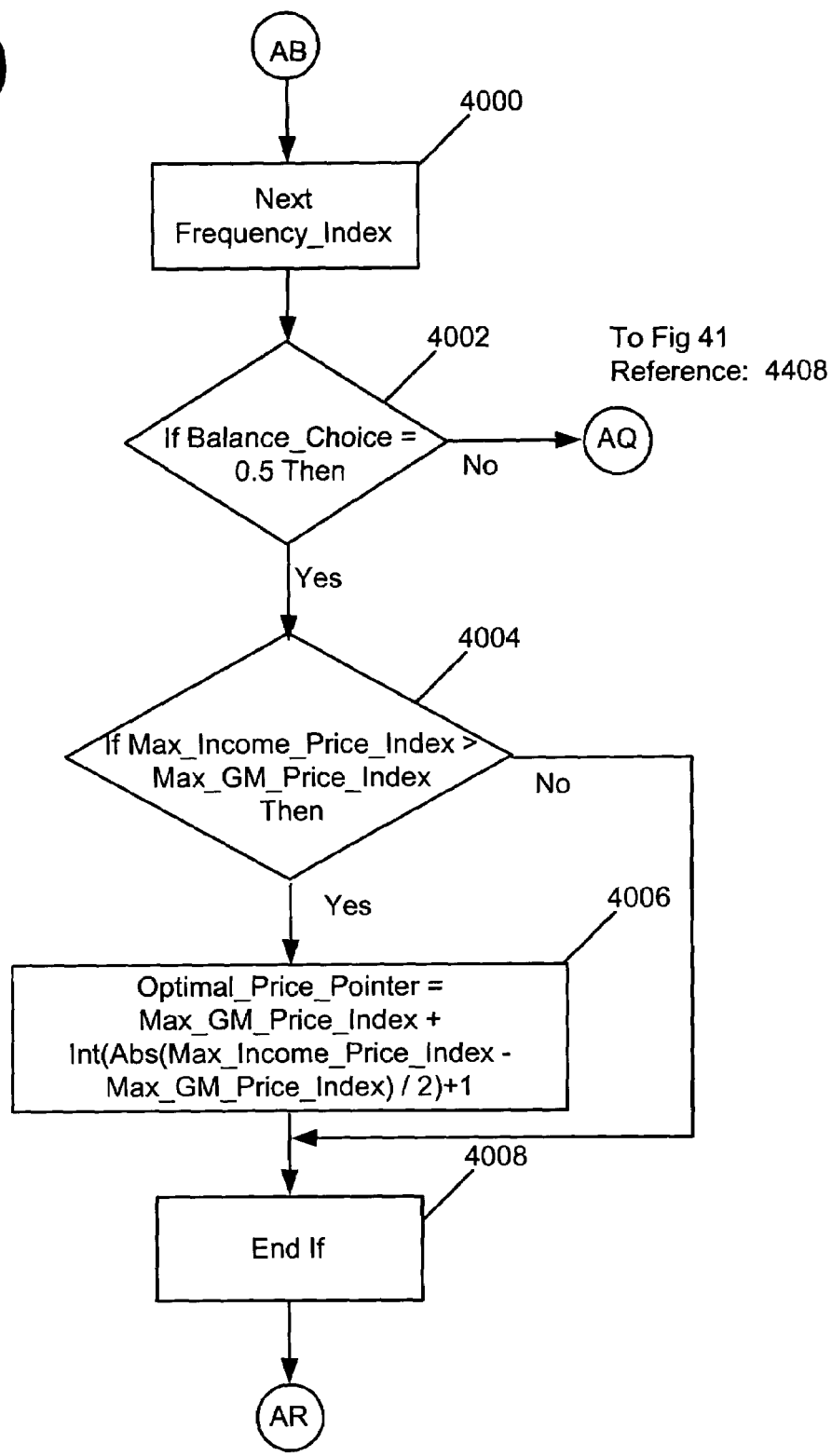
FIG. 40 is a flow chart illustrating the determination of price so that the objectives of maximum income and profit are balanced.

FIG. 40 shows the continuation of the flow diagram that is part of the Expected Results Engine 122 referenced in FIG. 1. FIG. 40 illustrates the determination of price so that the objectives of maximum income and profit are balanced. A determination of whether the variable Balance_Choice 4002 equal to 0.5 is made. If the determination is not true, the program proceeds to the End If 4108 statement. If the determination is true, then the user has specified the program optimize the selection of price by balancing the objectives of profit and income, and the program proceeds to step 4004.

A determination is made as to whether Max_Income_Price_Index 4004 is greater than Max_GM_Price_Index 4004. If the determination is not true, then the program proceeds to the End If 4008 statement. If the determination is true, then the program assigns Optimal_Price_Pointer 4006 with the value calculated by averaging the difference of index pointers Max_GM_Price_Index 4006 and Max_Income_Price_Index 4006 and summing Max_GM_Price_Index 4006.

Figure 41:
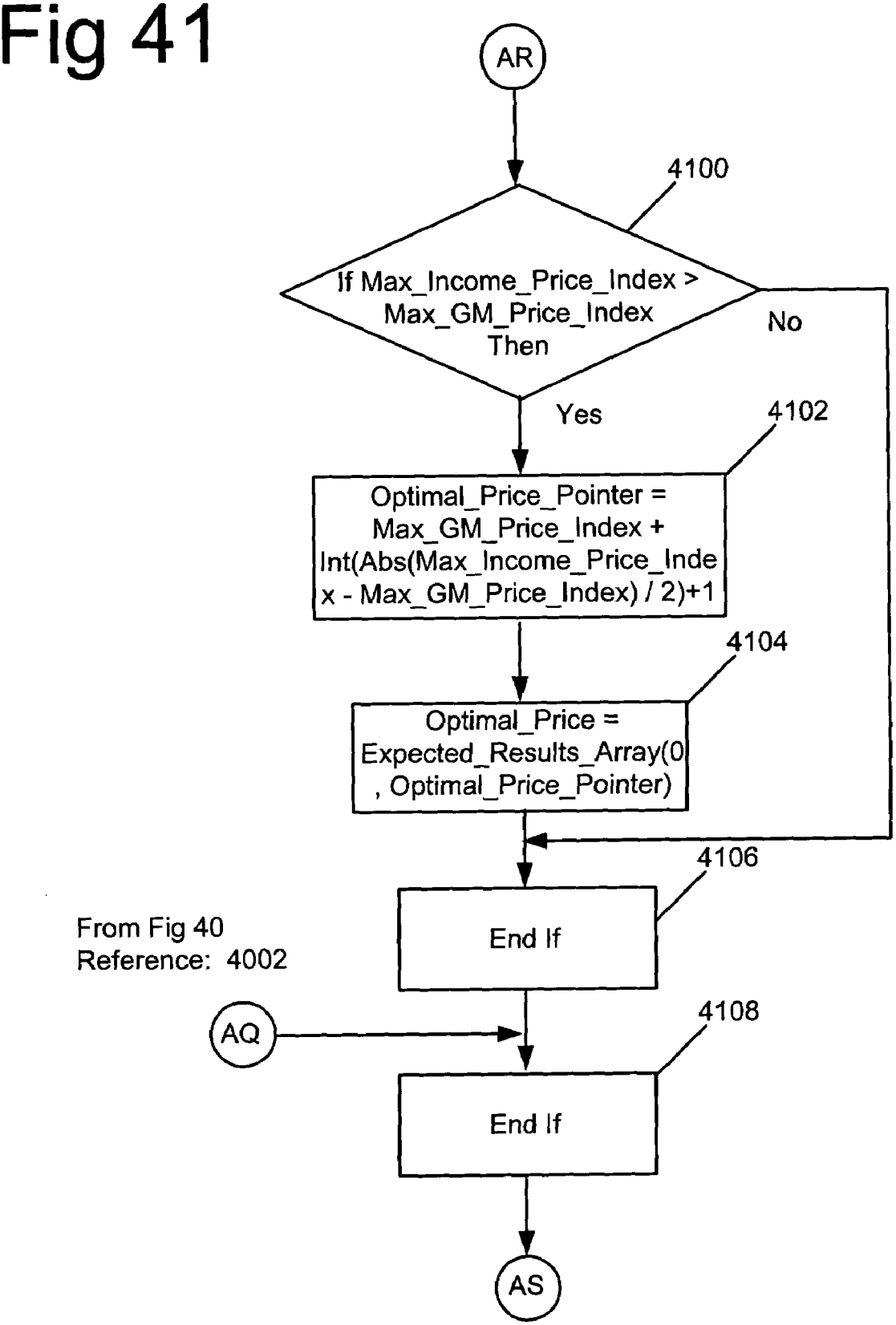
FIG. 41 is a flow chart illustrating the continued determination of price so that the objectives of maximum income and profit are balanced.

FIG. 41 shows the continuation of the flow diagram that is part of the Expected Results Engine 122 referenced in FIG. 1. FIG. 41 illustrates the continued determination of price so that the objectives of maximum income and profit are balanced. A determination of whether Max_Income_Price_Index 4100 is greater than Max_GM_Price_Index 4100 is made. If the determination is not true, then the program proceeds to the End If 4106 statement. If the determination is true, then the program assigns Optimal_Price_Pointer 4102 with the value calculated by averaging the difference of index pointers Max_Income_Price_Index 4102 and Max_GM_Price_Index 4102 and summing Max_GM_Price_Index 4102. Optimal_Price 4104 is assigned the value of price stored in Expected_Results_Array 4104 pointed to by the value stored in Optimal_Price_Pointer.

Figure 42:
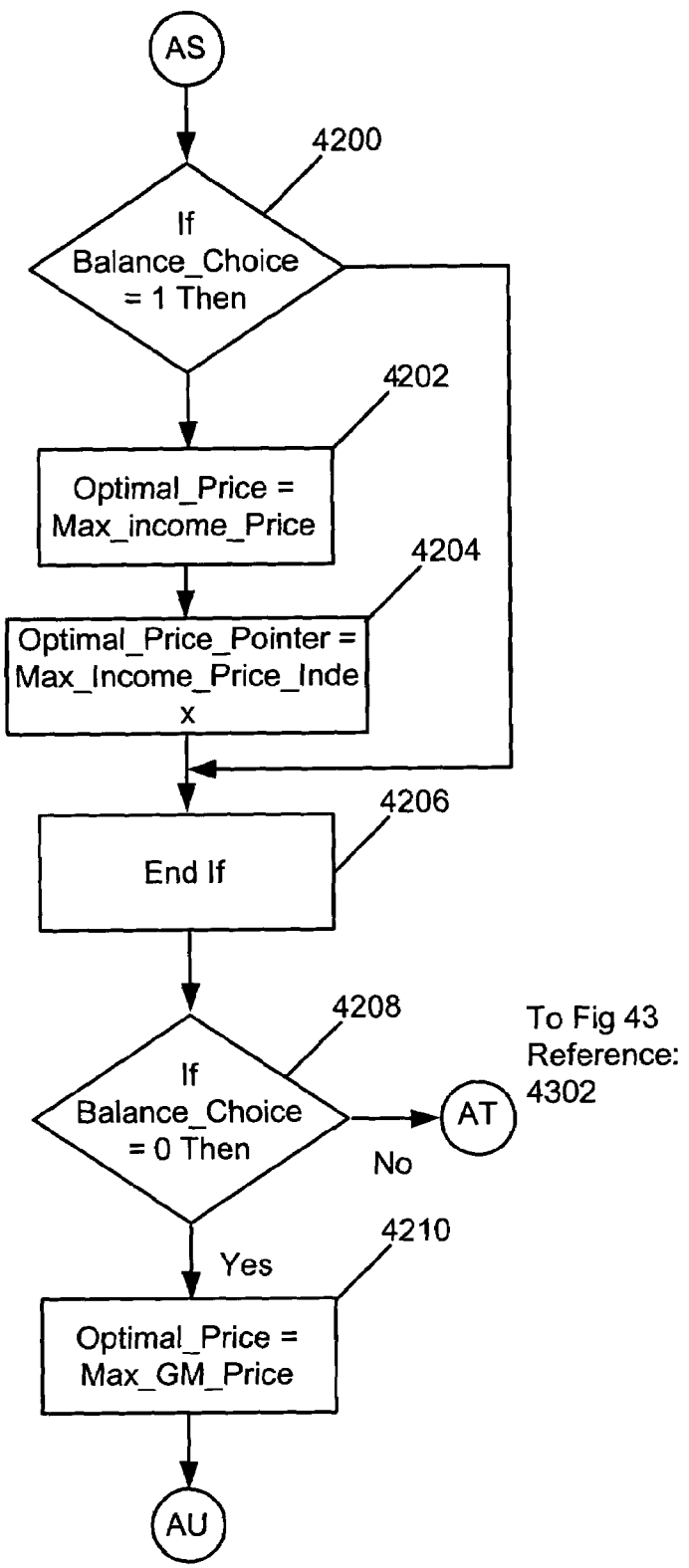
FIG. 42 is a flow chart illustrating the assignment of variables if the objective is to maximize income.

FIG. 42 shows the continuation of the flow diagram that is part of the Expected Results Engine 122 referenced in FIG. 1. FIG. 42 illustrates the assignment of variables if the objective is to maximize income. A determination is made as to whether Balance_Choice 4200 is equal to one. If the determination is not true, then the If 4200 statement terminates in the End If 4206 statement. If the determination is true, then the variable Optimal_Price 4202 is assigned Max_Income_Price 4202. Optimal_Price_Pointer 4204 is assigned the value of Max_Income_Price_Index 4204.

A determination is made as to whether Balance_Choice 4208 equals zero. If the determination is not true, then the If 4208 statement terminates in the End If 4302 statement. If the determination is true, then the variable Optimal_Price 4210 is assigned the value stored in Max_GM_Price 4210. Optimal_Price_Pointer 4300 is assigned the value of Max_GM_Price_Index 4300.

Figure 43:
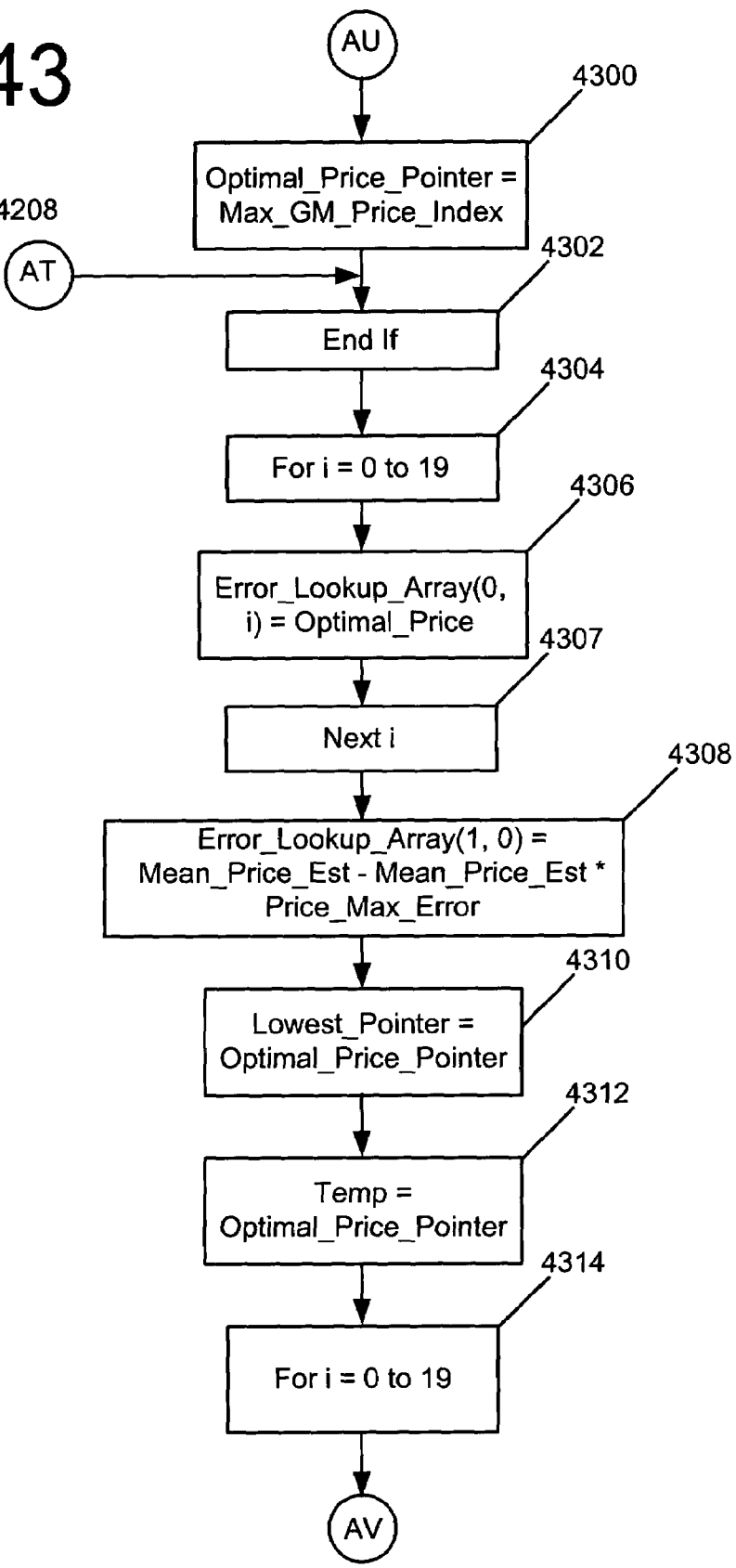
FIG. 43 is a flow chart illustrating the assignment of variables if the objective is to maximize profit and store the optimal price in the Expected Results Array.

FIG. 43 shows the continuation of the flow diagram that is part of the Expected Results Engine 122 referenced in FIG. 1. If the percentage difference in expected and actual win rates are outside a predefined window, a table that defines a relationship between the actual win rate, the current optimized price, and new mean price is used to update the optimization. FIG. 43 illustrates the steps used to determine the contents of the Error Lookup Array. A programming loop defined by steps 4304 through 4308 is initiated with the For 4304 statement, with i 4304 set to zero and stepped in increments of one to 19. The elements of Error_Lookup_Array(0,i) 4306 are populated with the value of Optimal_Price 4306 based on index i. i 4307 is incremented and the programming loop defined by steps 3404 through 4307 repeated. Error_Lookup_Array(1,0) 4308 is assigned the lowest Mean_Price_Est 4308 given the largest error as defined by Price_Max_Error 4308. The value of Optimal_Price_pointer is assigned to Lowest_Pointer 4310 and to Temp 4312. A programming loop defined by steps 4314 through 4408 is established with the For 4316 statement, where i is set to zero and incremented by one to a value of 19.

Figure 44:
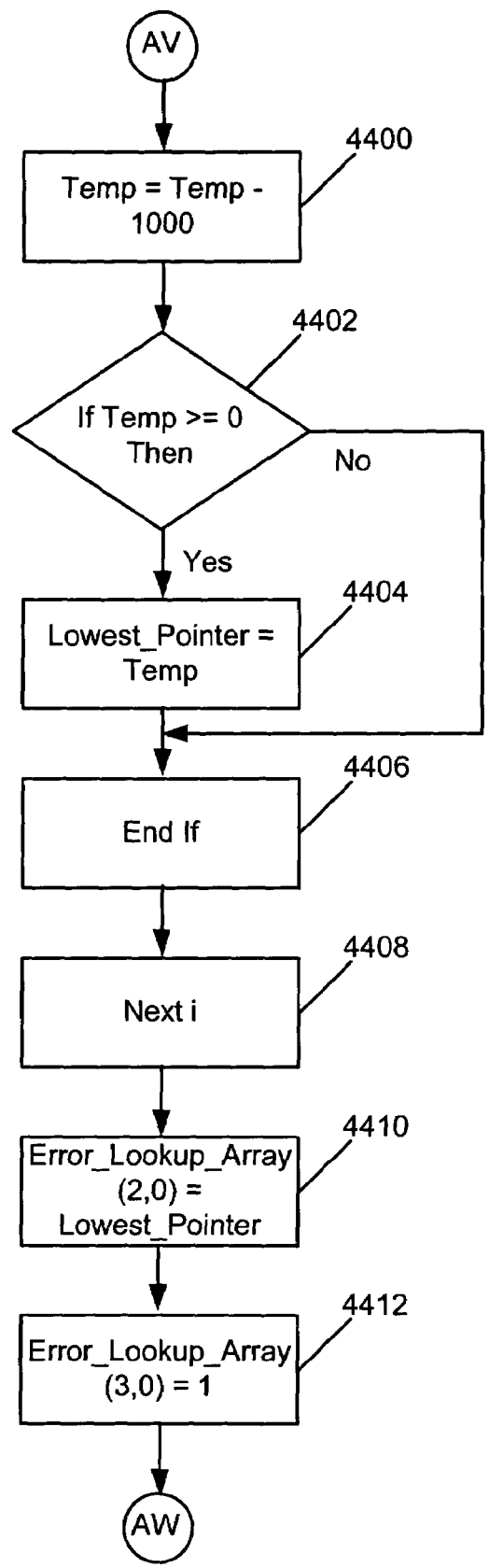
FIG. 44 is a flow chart illustrating the determination of the Error Lookup Array contents.

FIG. 44 shows the continuation of the flow diagram that is part of the Expected Results Engine 122 referenced in FIG. 1. Steps 4400 through 4410 find the lowest index to the optimal price for a given Mean Price. Temp 4400 is assigned a new value determined by subtracting 1000 from the original value of Temp 4400. A determination of whether Temp 4402 is equal to, or greater than zero is made. If the determination is not true, then the If 4402 statement is terminated in the End If 4406 statement If the determination 4402 is true, then Lowest_Pointer 4404 is set equal to Temp 4404. i 4408 is incremented and the programming loop defined by steps 4316 to 4408 repeated. Error_Lookup_Array(2,0) 4410 is set equal to the value stored in Lowest_Pointer 4410. The first index of the first Mean_Price set is stored in Error_Lookup_Array(3,0) 4412 by setting it equal to one.

Figure 45:
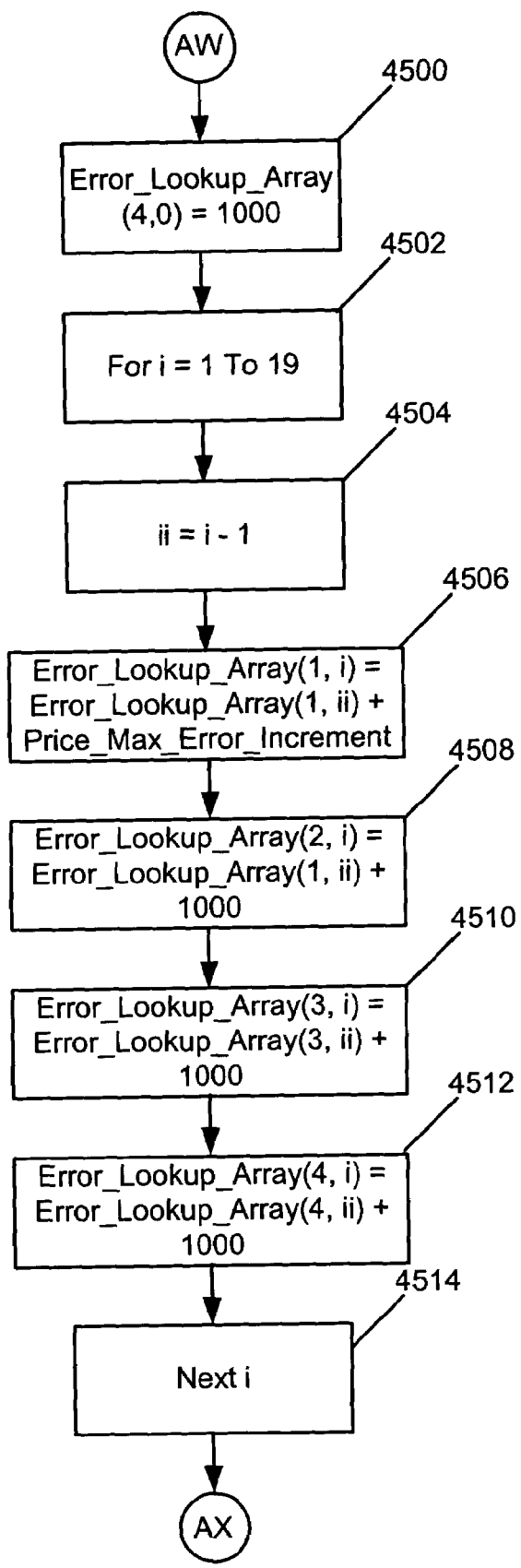
FIG. 45 is a flow chart illustrating the continued determination of the Error Lookup Array contents.

FIG. 45 shows the continuation of the flow diagram that is part of the Expected Results Engine 122 referenced in FIG. 1. The last index of the first Mean_Price set is stored by setting the Expected_Results_Array(4,0) 4500 equal to 1000. A programming loop defined by steps 4502 to 5414 is initiated by the For 4502 statement, and populates the Error_Lookup_Array. The programming loop increments i 4502 from 1 to 19 in steps of one. The variable ii 4504 is calculated by subtracting one from i 4504. The value of Error_Lookup_Array(1,i) 4506 is calculated by adding the Price_Max_Error_Increment 4506 to Error_Lookup_Array(1,ii) 4506. The value of Error_Lookup_Array(2,i) 4508 is calculated by adding 1000 to Error_Lookup_Array(2,ii). The value of Error_Lookup_Array(3,i) 4510 is calculated by adding 1000 to Error_Lookup_Array(3,ii) 4510. Error_Lookup_Array(4,i) 4512 is calculated by adding 1000 to Error_Lookup_Array(4,ii) 4512. i is incremented by one and the programming loop defined by steps 4502 through 4514 repeated.

Figure 46:
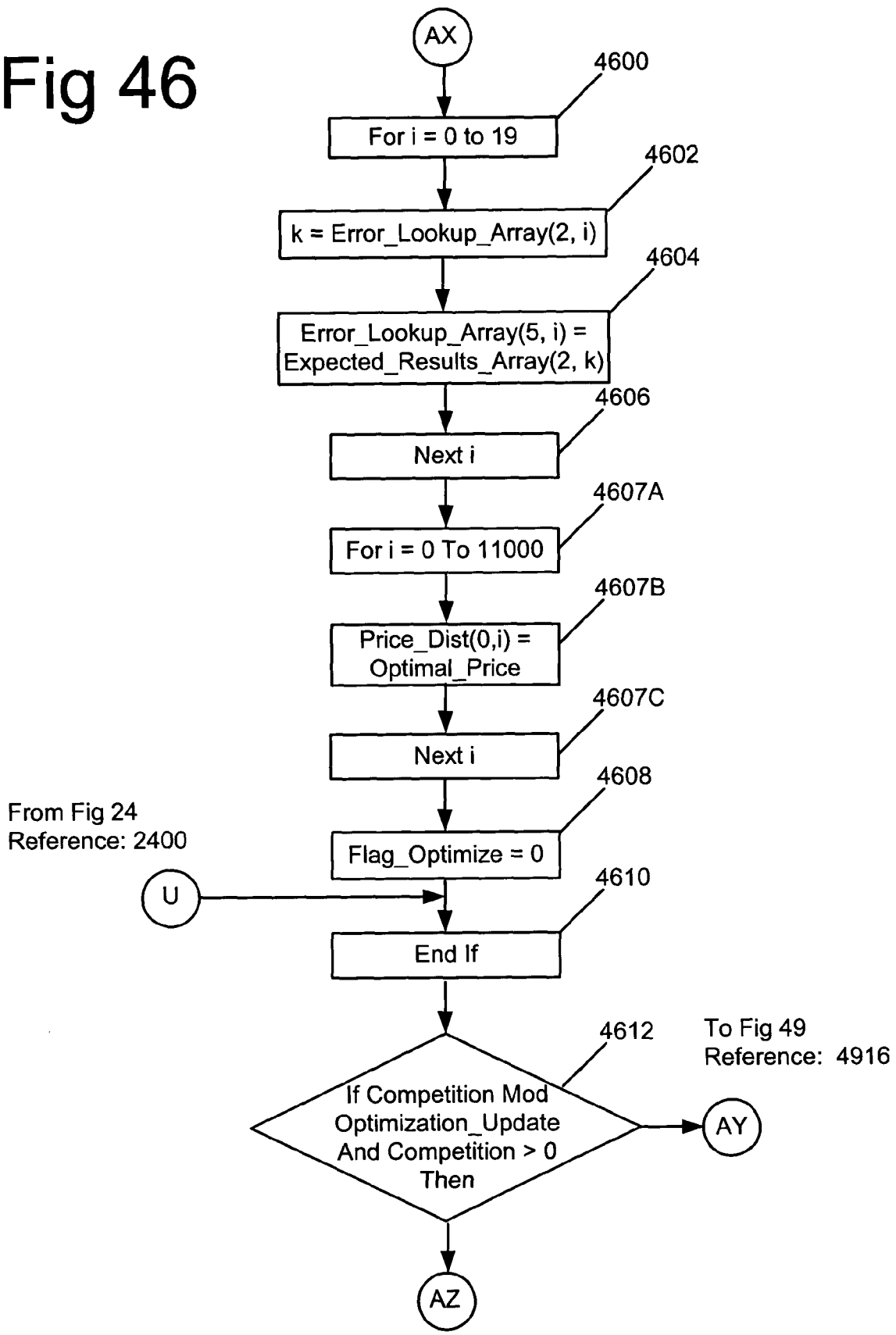
FIG. 46 is a flow chart illustrating the continued determination of the Error Lookup Array contents, completion of the optimization loop, and test to determine if price optimization should be updated.

FIG. 46 steps 4600 through 4610 shows the continuation of the flow diagram that is part of the Expected Results Engine 122 referenced in FIG. 1. A programming loop defined by 4600 through 4606 is established by the For 4600 statement. i 4600 is set to zero and incremented in steps of one to 19. k 4602 is set equal to the value stored in Error_Lookup_Array(2,i). Error_Lookup_Array(5,i) 4604 is set equal to the value in Expected_Results_Array(2,k) 4604. i is incremented by one and the programming loop defined by steps 4600 through 4606 repeated. A programming loop is established with steps 4607A through 4607C and is initiated by the For statement 4607A. i 4607A is set to zero and stepped in increments of one to 11000 plus one. The indexed array of Price_Dist 4607B is set equal to Optimal_Price 4607B. The programming loop 4607A through 4607A is repeated until 1000 plus one is reached. The value of Flag_Optimization 4608 is set to zero indicating that the optimization is complete.

Step 4612 begins the flow diagram of the Optimization Update Engine 124 shown in FIG. 1. The decision whether to re-optimize pricing is based on a pre-determined number of offer opportunities and an evaluation of whether the percentage difference between the actual and expected win rates fall outside a predefined window. A determination of whether the arithmetic/logic expression (Competition MOD Optimization_Update AND Competition) 4612 is greater than zero. If the determination 4612 is not true, then the If 4612 statement is terminated in the End If 4916 statement. If the determination 4612 is true, then the program proceeds to step 4700 indicating the actual results of the optimization should be checked.

Figure 47:
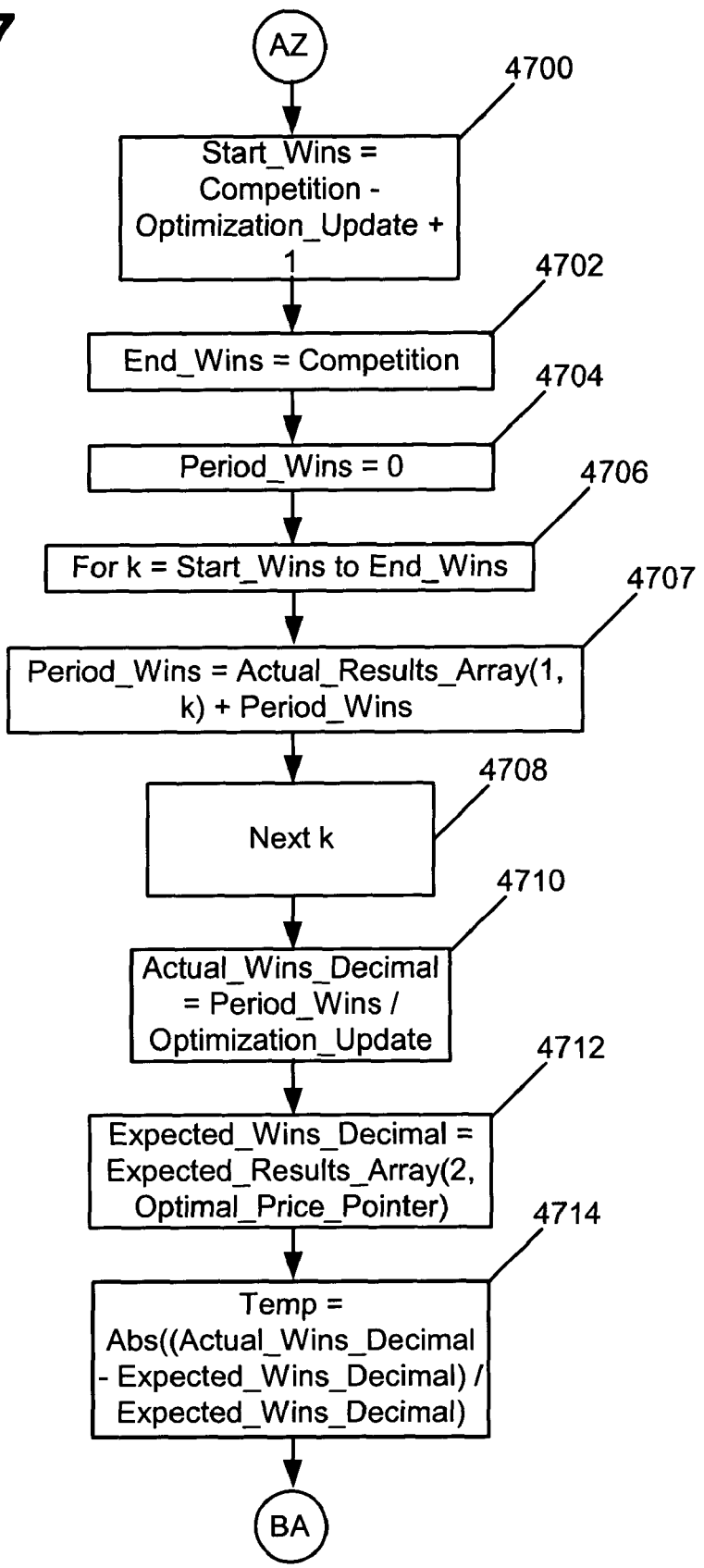
FIG. 47 is a flow chart illustrating the calculation of Actual Wins for a given period.

FIG. 47 shows the continued flow diagram of the Optimization Update Engine referenced in FIG. 1. Start_Wins 4700 is set equal to Competition 4700 less Optimization_Update 4700 plus one. End_Wins 4702 is set equal to Competition 4702. Period_Wins 4704 is set to zero. A programming loop defined by the steps 4706 through 4708 is initiated by the For 4706 statement. k 4706 is set equal to Start_Wins 4706 and incremented in steps of one to a value equal to End_Wins 4706. Period_Wins 4707 is calculated by adding Actual_Results_Array(1,k) 4704+Period_Wins 4707. k is incremented by one and the programming loop defined by steps 4706 through 4708 repeated. Actual_Wins_Decimal 4710 is calculated by dividing the Period_Wins 4710 by Optimization_Update 4710. Expected_Wins_Decimal 4712 is set equal to Expected_Results_Array(2, Optimal_Price_Pointer) 4712. Temp 4714 is calculated by taking the absolute value of the difference between Actual_Wins_

Decimal 4714 and Expected_Wins_Decimal 4714, and then dividing the difference by Expected_Wins_Decimal 4714.

Figure 48:
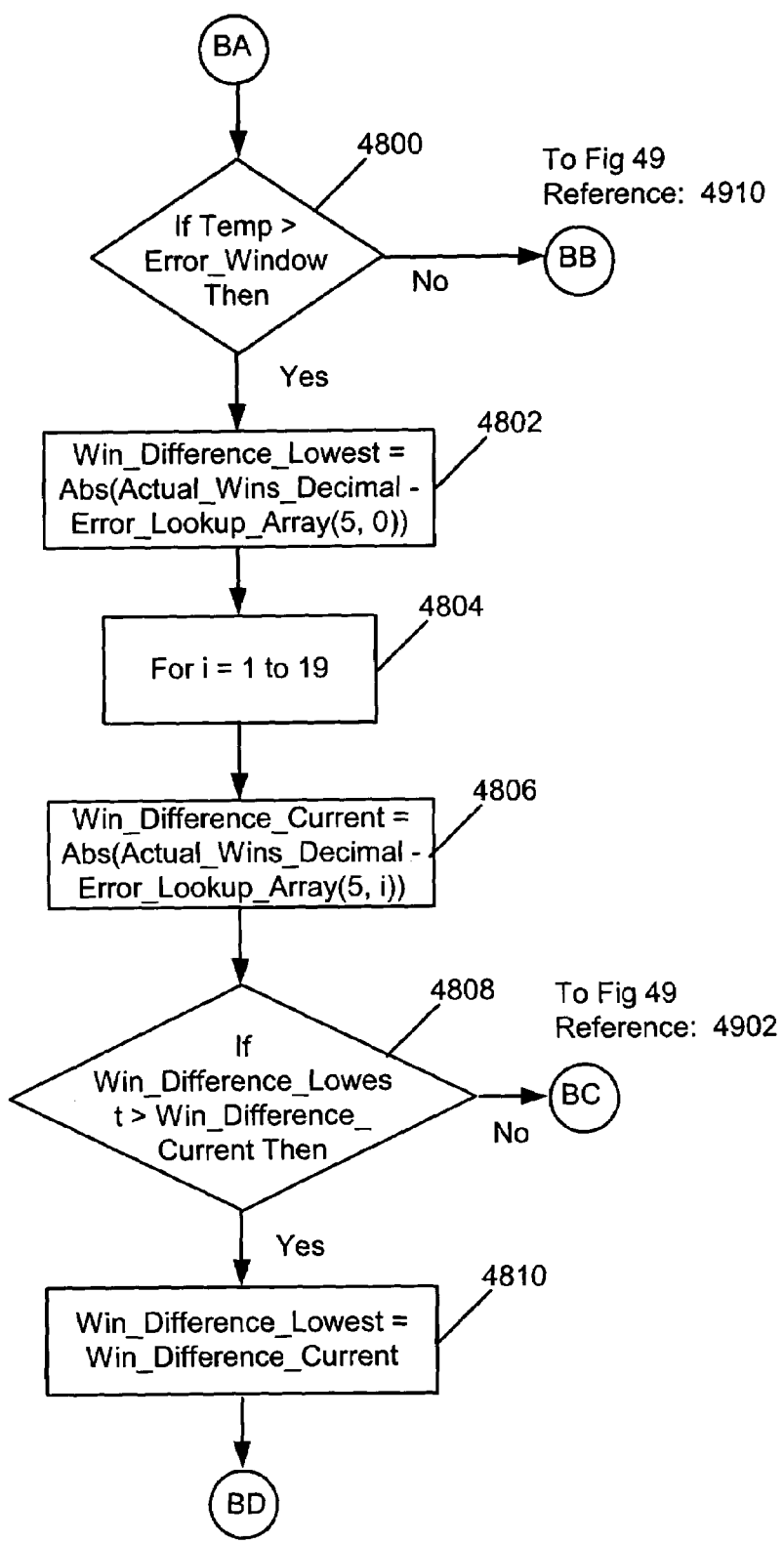
FIG. 48 is a flow chart illustrating the determination of whether Actual Wins is within a tolerable limit.

FIG. 48 shows the continued flow diagram of the Optimization Update Engine 124 referenced in FIG. 1. FIG. 48 illustrates the determination of whether the actual results are within a tolerable limit. A determination of whether Temp 4800 is greater than Error_Window 4800 is made. If the determination 4800 is not true, then the if 4800 statement is terminated in an End If 4910 statement. If the determination 4800 is true, then Win_Difference_Current 4802 is calculated by taking the absolute value of the difference between the Actual_Wins_Decimal 4802 and the Error_Lookup_Array(5,0) 4802. A programming loop defined by steps 4804 and 4904 is initiated with the For 4804 statement. i 4804 is incremented from on to 19 in steps of one. Win_Difference_Current 4806 is calculated by taking the absolute value of the difference between the Acutal_Wins_Decimal 4806 and Error_Lookup_Array(5,i) 4806. A determination of whether Win_Difference_Lowest 4808 is greater than Win_Difference_Current 4808 is made. If the determination 4808 is not true, then the If 4808 statement is terminated in and End If 4902 statement. If the determination 4810 is true, then Win_Difference_Lowest is set equal to Win_Difference_Current 4810.

Figure 49:
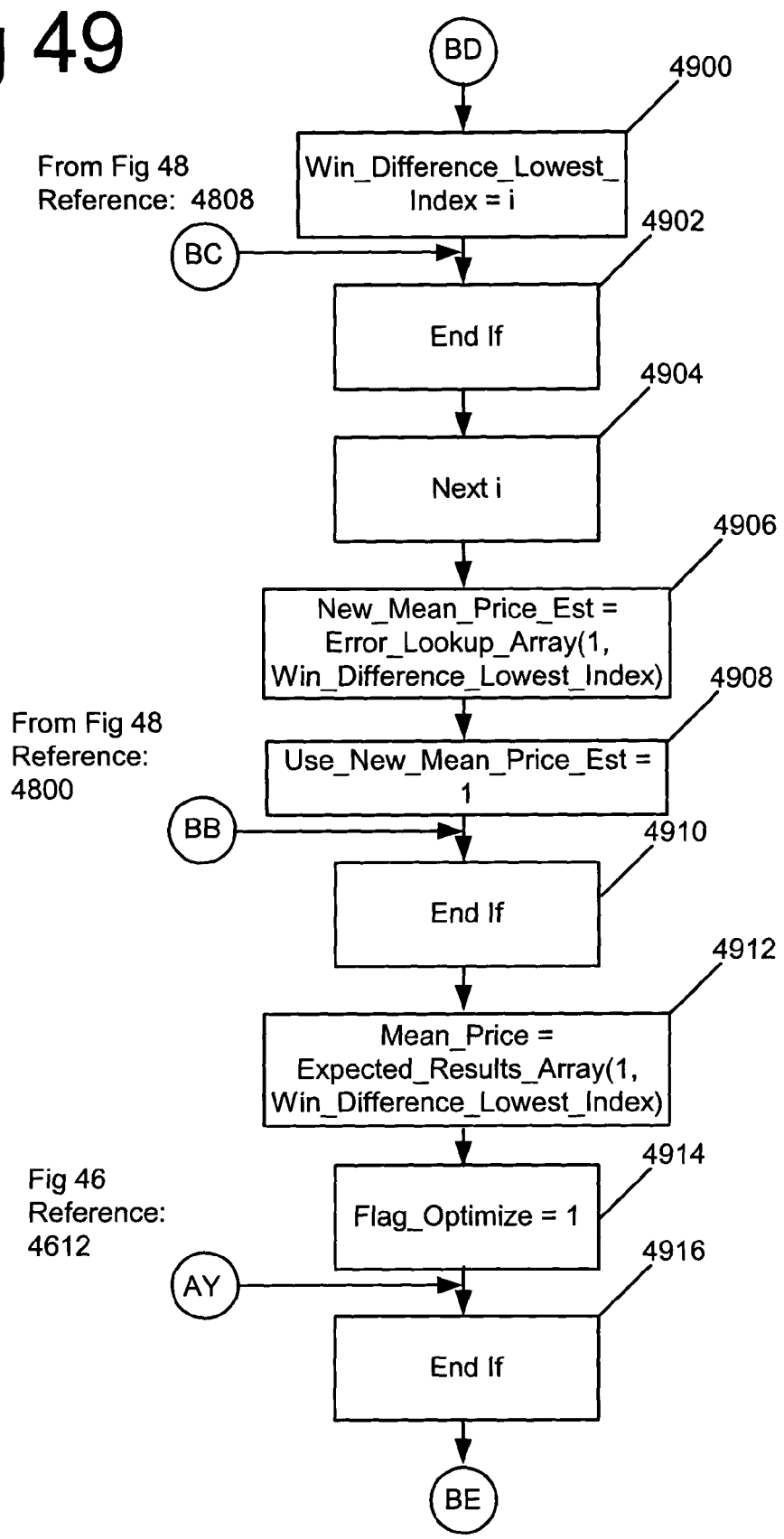
FIG. 49 is a flow chart illustrating the selection of a New Mean Price.

FIG. 49 shows the continued flow diagram of the Optimization Update Engine referenced in FIG. 1. FIG. 49 illustrates the selection of a new mean price. Win_Difference_Lowest_Index 4900 is set equal to i. i 4900 is incremented by one and the programming loop defined by steps 4804 through 4904 is repeated. New_Mean_Price_Est 4906 is set equal to Error_Lookup_Array(1, Win_Difference_Lowest_Index) 4906. The value for variable Use_New_Mean_Price_Est 4908 is set equal to one. The variable Use_New_Mean_Price_Est is set equal to one. Mean_Price 4912 is set equal to Expected_Results_Array(1, Win_Difference_Lowest_Index) 4912. The variable Flag_Optimize 4914 is set equal to one.

Figure 50:
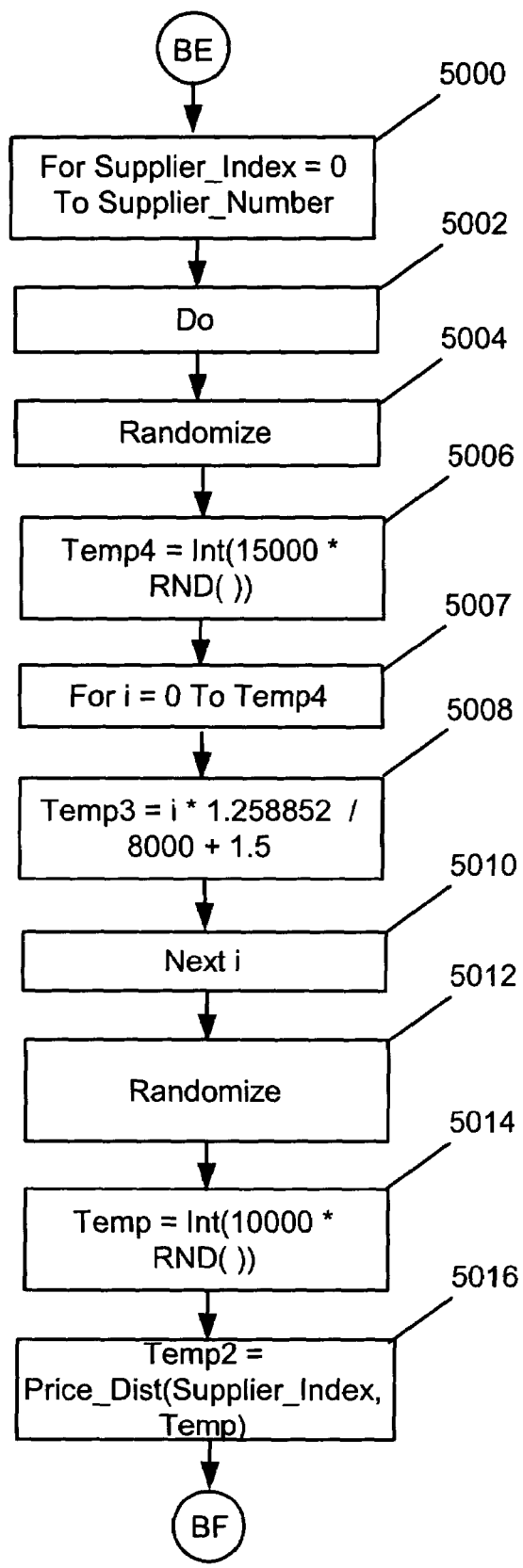
FIG. 50 is a flow chart illustrating the random drawing of bids from the Price Distribution Array.

FIG. 50 is a flow chart illustrating the random drawing of bids by the Market Place Engine 128 reference in FIG. 1 from the Price Distribution Array. A programming loop defined by steps 5000 through 5104 is initiated by the For statement 5000. Supplier_Index 5000 is set to zero and incremented in steps of one to the value of Supplier_Number 5000 plus one. A Do Loop defined by steps 5002 to 5102 is initiated by the Do statement 5002. The Randomize statement 5004 causes the operating system to extract a pseudo random number to serve as a "seed" for a random number generator. Steps 5006 and 5010 create a variable programming delay. A programming loop defined by steps 5007 through 5010 is initiated by the For statement 5007. i 5007 is set to zero and incremented in steps of one until Temp4 5007 plus one is reached. Temp3 5008 is calculated simply as a programming delay. The Next i statement 5010 increments i and the programming loop 5007 through 5010 repeated. The Randomize statement 5012 causes the operating system to create a seed for the random number generator. Temp 5014 is calculated by multiplying 10000 by a random number. Temp2 5016 is calculated by using Temp 5014 to randomly draw a price from the Price_Dist Array 5016.

Figure 51:
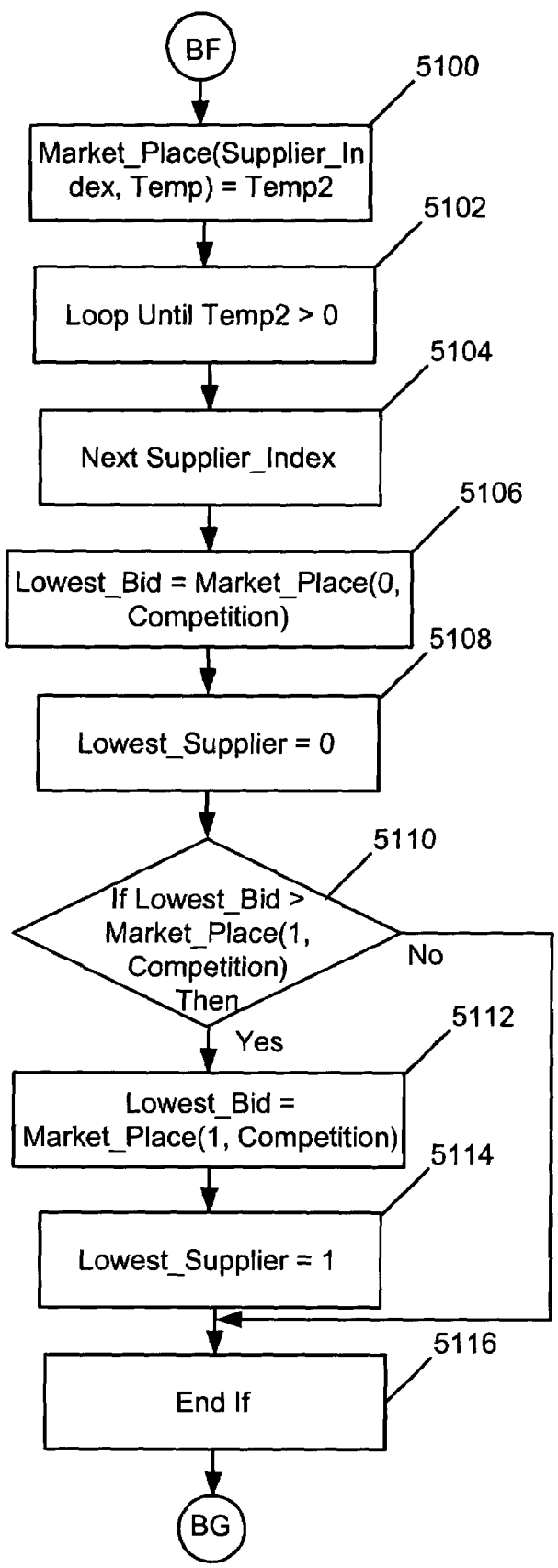
FIG. 51 is a flow chart illustrating the population of the Market Price Array and the identification of the lowest bidder.

FIG. 51 is a flow chart illustrating the populations of the Market Place Array and the identification of the lowest bidder. The Market_Place Array 5100 is assigned the bid, or price, stored in Temp2 5100. The Do Loop defined by steps 5002 to 5102 is repeated until Temp2 5102 is greater than zero. The programming loop defined by steps 5000 through 5104 is repeated until Supplier_Index 5104 equals Supplier_Number 5000 plus one. Lowest_Bid 5106 is assigned a value associated with Supplier1 from the Market_Place Array 5106. The Lowest_Supplier 5108 is set to zero. A determination as to whether the Lowest_Bid 5110 is less than the next bid contained in the Market_Place Array 5110 depicting the bid from Supplier2. If the determination 5110 is true, then the bid contained in the Market_Place Array 5110 for Supplier2 is stored in Lowest_Bid 5112. Lowest_Supplier 5114 is set to one. If the determination 5110 is not true, the If statement 5110 is terminated in the End If 5116 statement.

Figure 52:
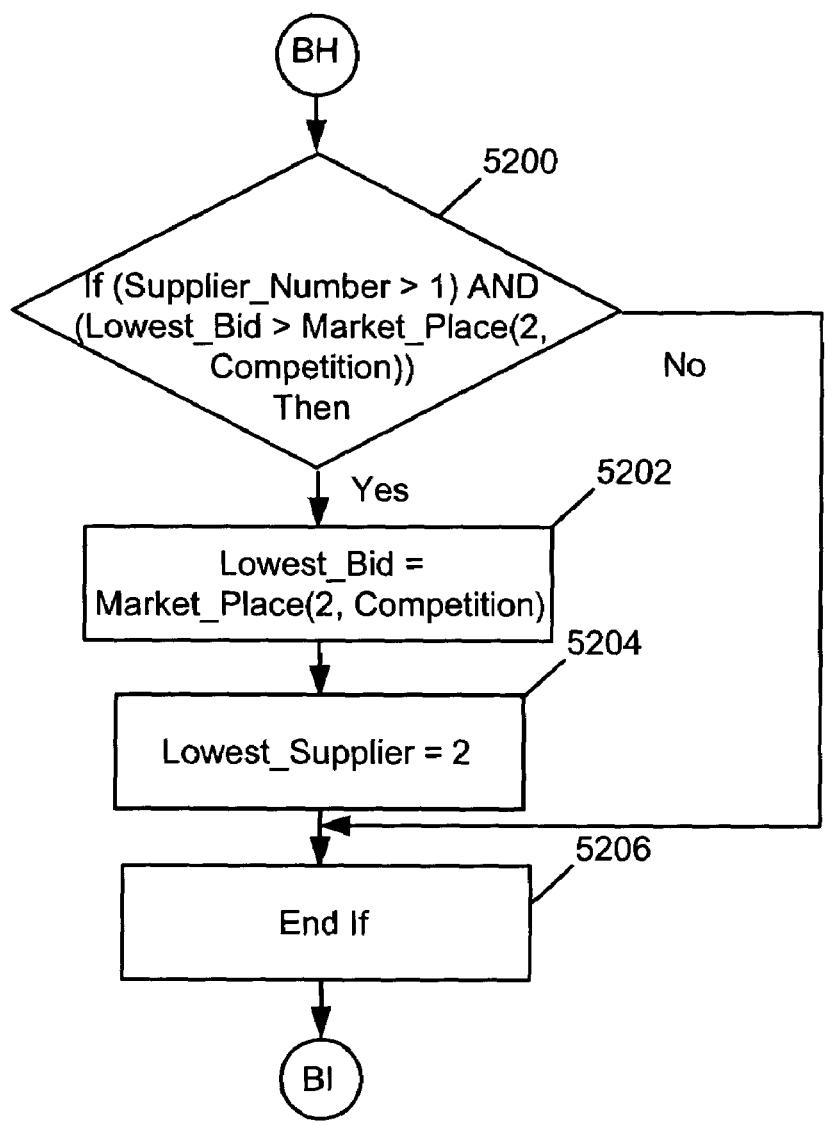
FIG. 52 is a flow chart illustrating the continued identification of the lowest bidder.

FIG. 52 is a flow chart illustrating the continued identification of the lowest bidder. A determination as to whether Supplier_Number 5200 is greater than one AND Lowest_Bid 5200 is greater than the indexed element of Market_Place Array 5200. If true, then Lowest_Bid 5202 is set equal to the indexed value in the Market_Place Array 5202. Lowest_Supplier 5204 is set equal to two. If the determination 5200 is false, then the If statement 5200 is terminated in the End If statement 5206.

Figure 53:
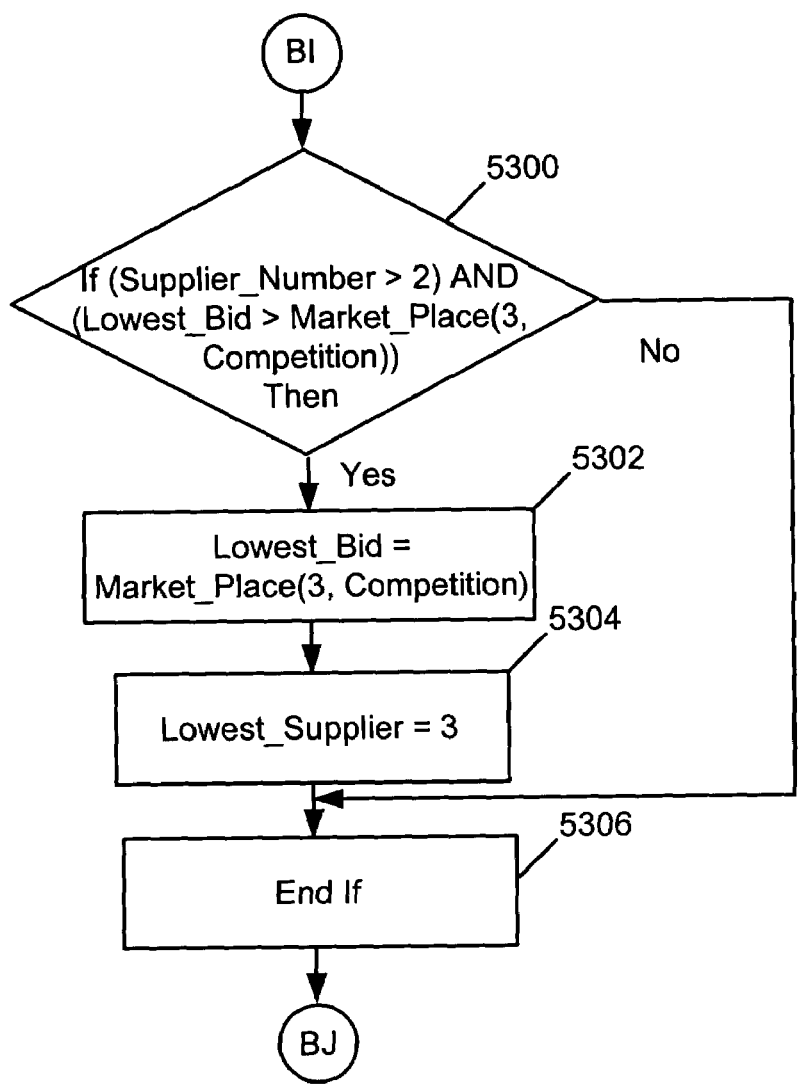
FIG. 53 is a flow chart illustrating the continued identification of the lowest bidder.

FIG. 53 is a flow chart illustrating the continued identification of the lowest bidder. A determination as to whether Supplier_Number 5300 is greater than two AND Lowest_Bid 5300 is greater than the indexed element of Market_Place Array 5300. If true, then Lowest_Bid 5302 is set equal to the indexed value in the Market_Place Array 5302. Lowest_Supplier 5304 is set equal to three. If the determination 5300 is false, then the If statement 5300 is terminated in the End If statement 5306.

Figure 54:
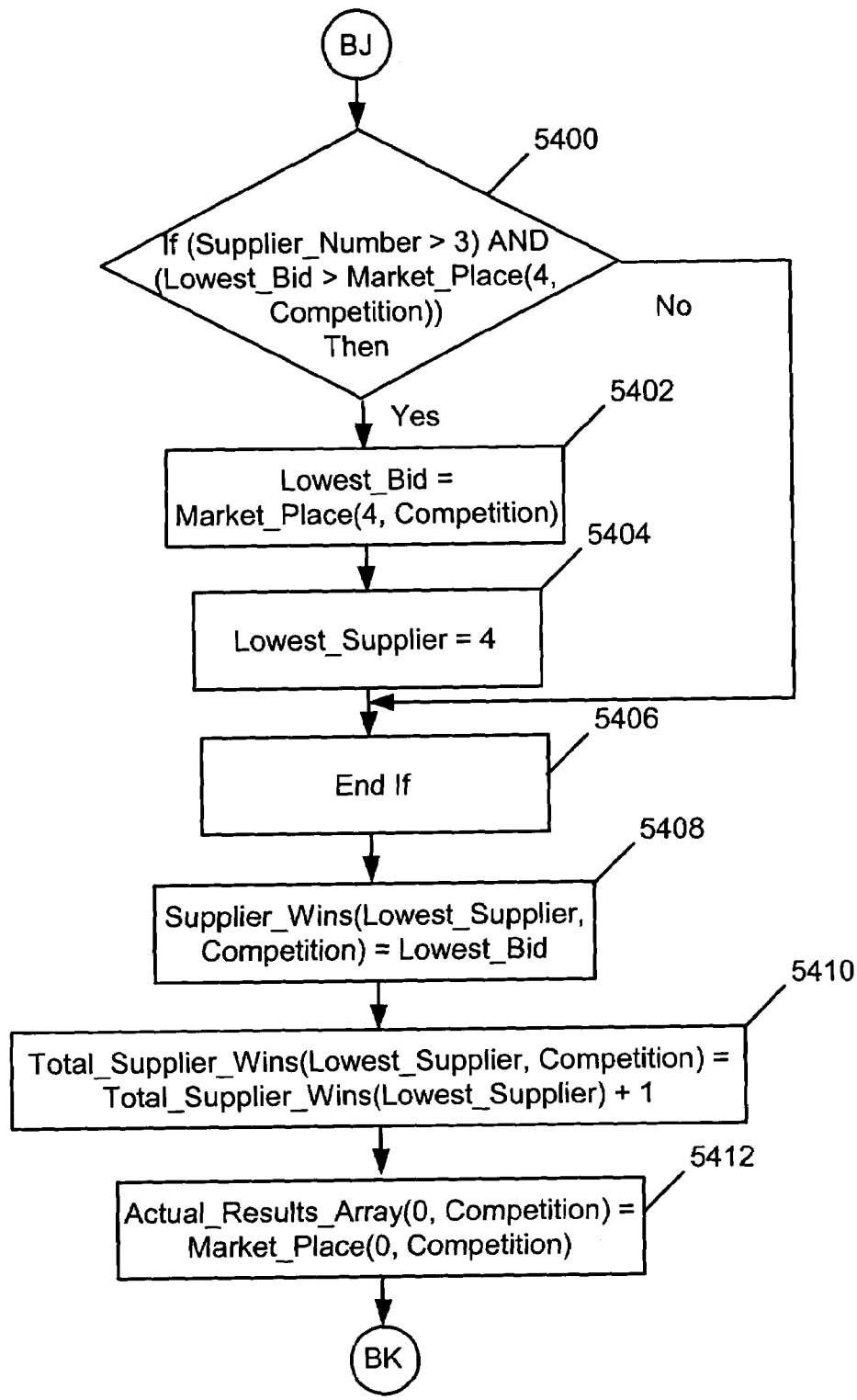
FIG. 54 is a flow chart illustrating the continued identification of the lowest bidder and the accumulation of supplier wins and actual results.

FIG. 54 is a flow chart illustrating the continued identification of the lowest bidder and the accumulation of supplier wins and actual results. A determination as to whether Supplier_Number 5400 is greater than three AND Lowest_Bid 5400 is greater than the indexed element of Market_Place Array 5400. If true, then Lowest_Bid 5402 is set equal to the indexed value in the Market_Place Array 5402. Lowest_Supplier 5404 is set equal to four. If the determination 5400 is false, then the If statement 5400 is terminated in the End If statement 5406. The indexed element of Supplier_Wins array 5408 is set to the value stored in Lowest_Bid 5408. The Lowest_Bid 5410 is stored in the Supplier_Wins Array 5410. The total wins for the supplier is incremented by one 5410 and stored in the array Total_Supplier_Wins 5410. The value of the optimized supplier's bid is stored in the index array element for Actual_Results_Array 5412.

Figure 55:
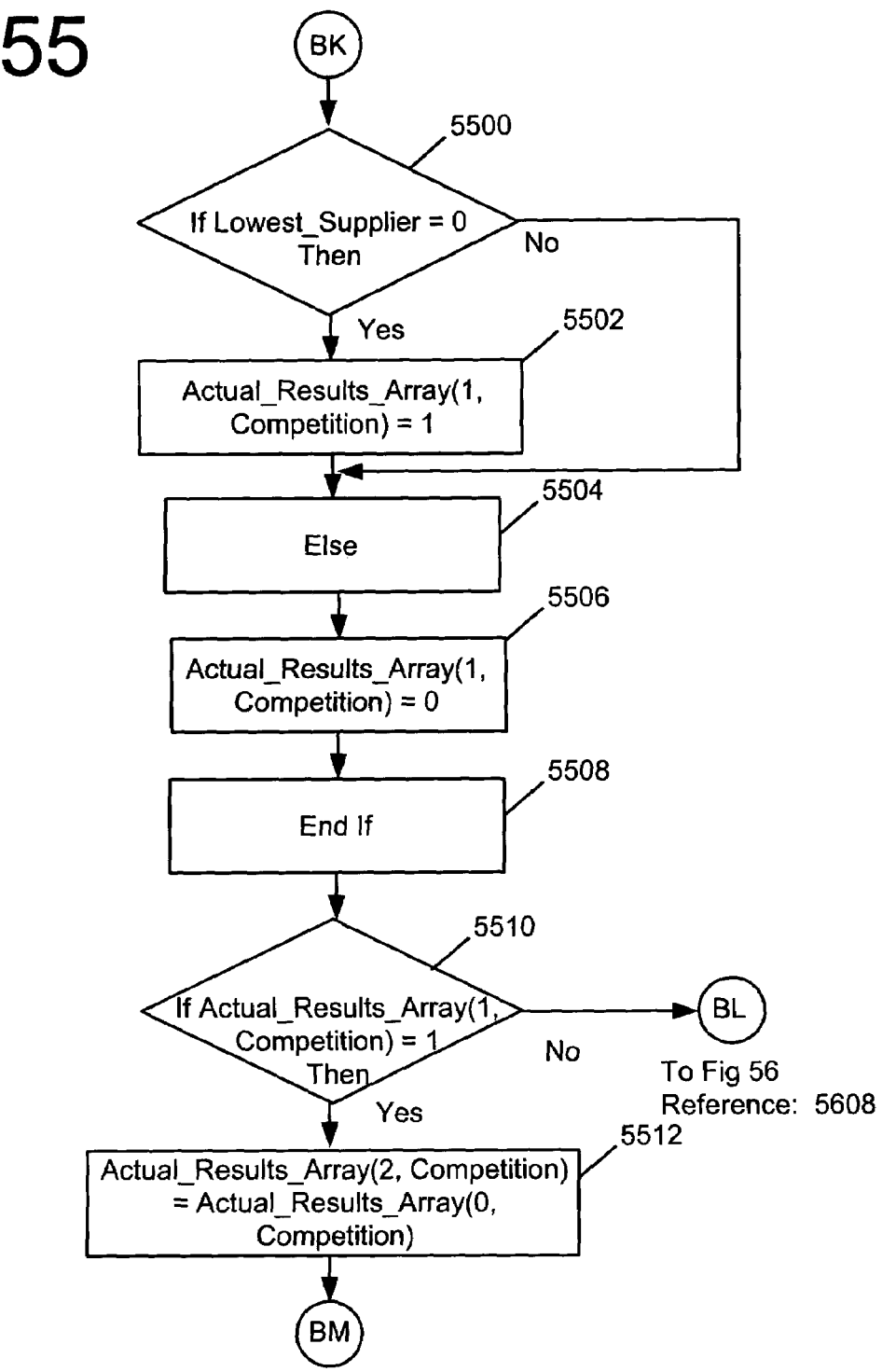
FIG. 55 is a flow chart illustrating the continued accumulation of actual results.

FIG. 55 is a flow chart illustrating the continued accumulation of actual results. A determination 5500 as to whether Lowest_Supplier 5500 is equal to zero. If the determination 5500 is true, then the indexed array element of Actual_Results_Array 5502 is set to one indicating that the Optimized supplier won the current competition. If the determination 5500 is not true, then the Else statement 5504 is executed and a zero is stored in the indexed array element Actual_Results_Array 5506. The If statement 5500 is terminated in the End If statement 5508. A determination 5510 as to whether the indexed element of Actual_Results_Array 5510 is equal to one. If the determination 5500 is false, then the If statement 5500 terminates in the End If statement 5608. If determination 5510 is true, then the indexed element of Actual_Results_Array 5512 containing the bid price is stored in another indexed element of Actual_Results_Array 5512 for income.

Figure 56:
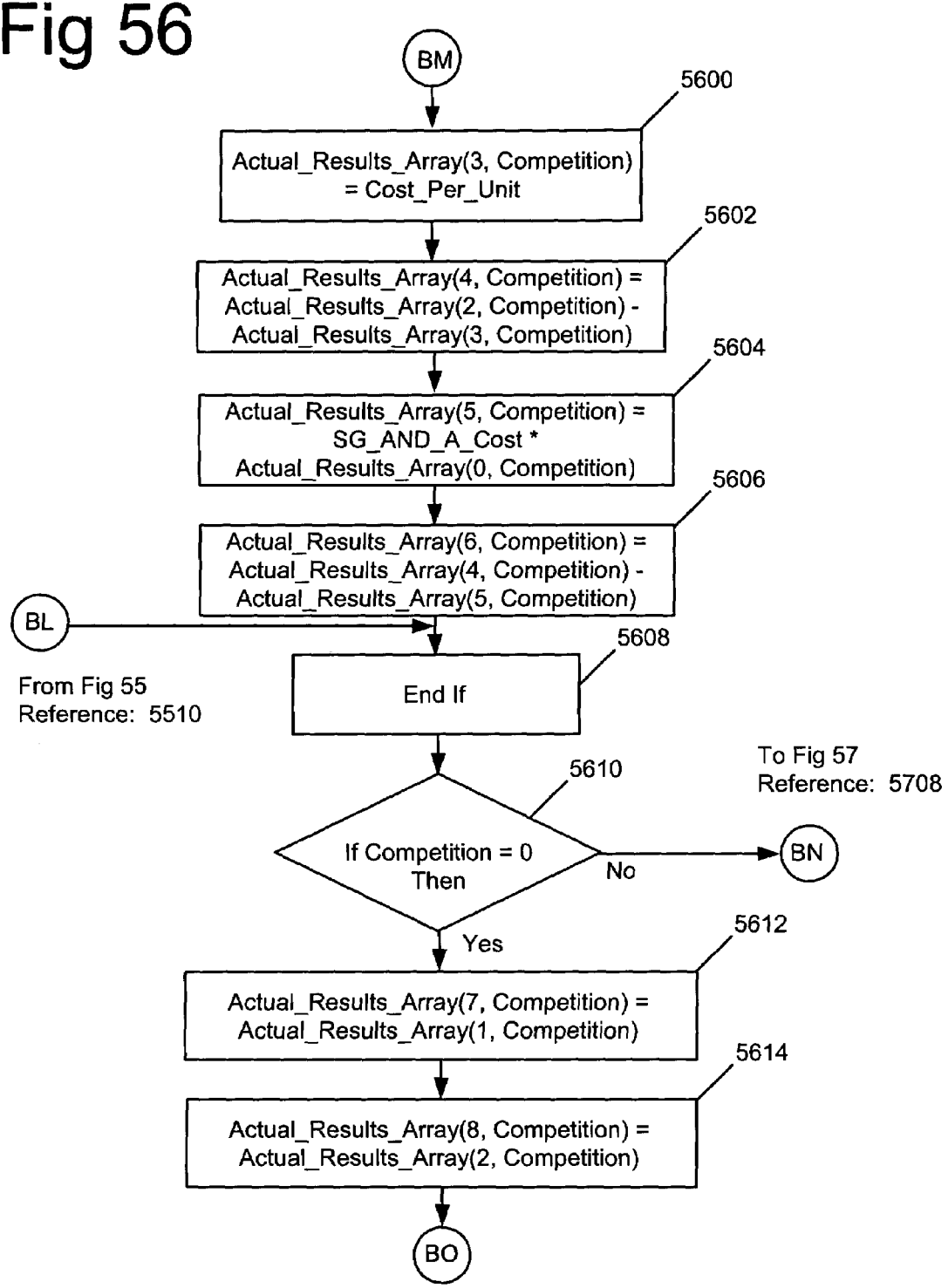
FIG. 56 is a flow chart of the continued accumulation of actual results.

FIG. 56 is a flow chart of the continued accumulation of actual results. The indexed element of Actual_Results_Array 5600 contains the cost-of-goods and stores the value of Cost_Per_Unit 5600. The gross profit is stored in the indexed element of Actual_Results_Array 5502 after the subtraction of the cost-of-goods, an indexed array element of Actual_Results_Array 5502, from income, an indexed array element of Actual_Results_Array 5502. The indexed element of the array Acutal_Results_Array 5604 stores the sale-general-and-administration expense, which is a percentage of income. The indexed array element of Actual_Results_Array 5606 stores earnings before income tax. A determination 5610 is made as to whether Competition 5610 is equal to zero. If the determination 5610 is not true, then the Else statement 5708 is executed. If the determination 5610 is true, then the indexed array element of Acutal_Results_Array 5612 stores the cumulative wins. The indexed array element of Actual_Results_Array 5614 stores the cumulative income.

Figure 57:
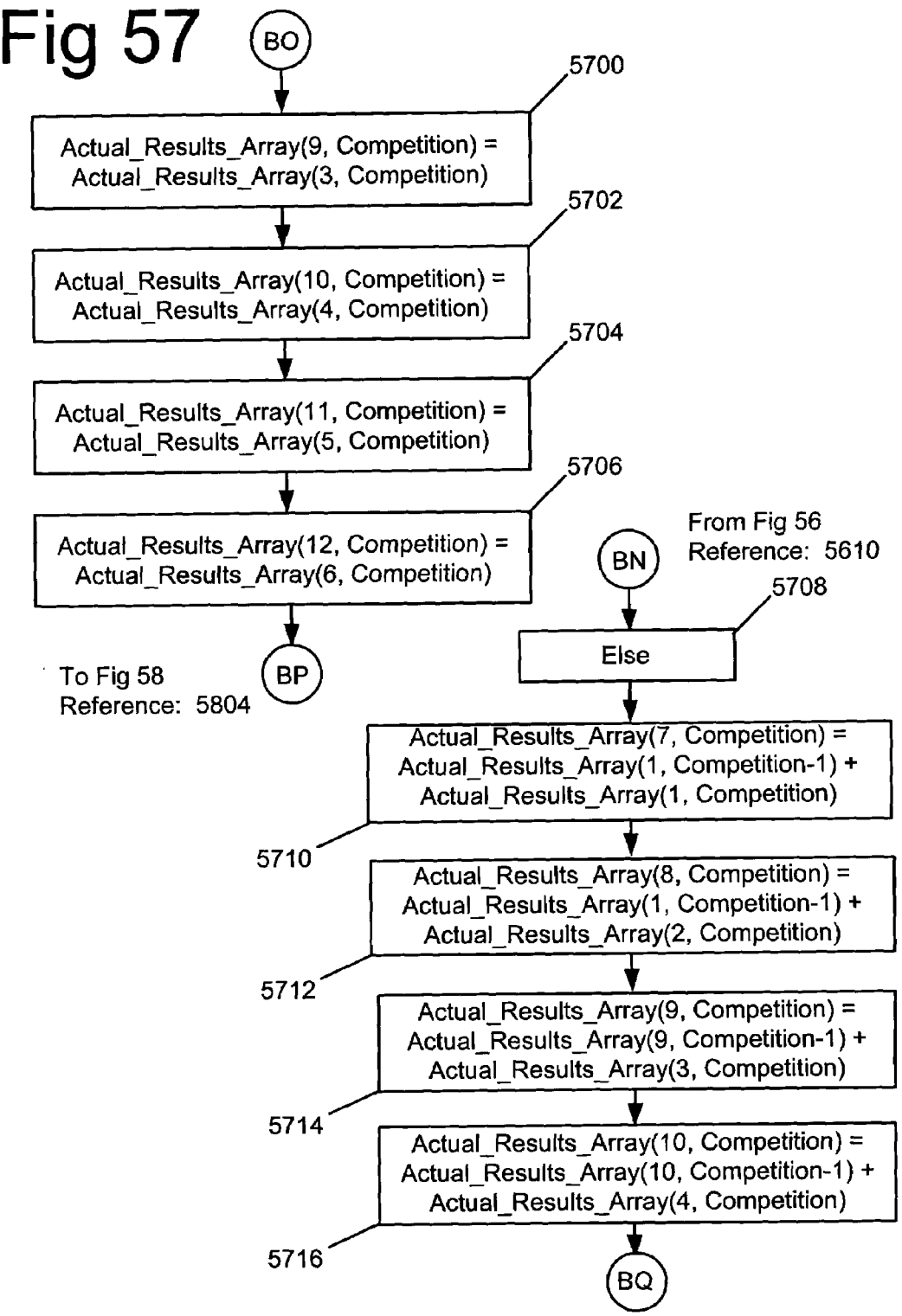
FIG. 57 is a flow chart of the continued accumulation of actual results.

FIG. 57 is a flow chart of the continued accumulation of actual results. The indexed array element of Actual_Results_Array 5700 stores the cumulative cost-of-goods. The indexed array element of Actual_Results_Array 5702 stores the cumulative gross profit. The indexed array element of Actual_Results_Array 5704 stores the cumulative sales-general-and-administration expense. The indexed array element of Actual_Results_Array 5706 stores the cumulative earnings before income tax. The If statement 5610 terminates in the End If statement 5804. If determination 5610 is not true, then the array element Acutal_Results_Array 5710 stores the cumulative wins. The array element Actual_Results_Array 5712 stores the cumulative income. The array element Acutal_Results_Array 5714 stores the cumulative cost-of-goods. The array element Actual_Results_Array 5716 stores the cumulative gross profit.

Figure 58:
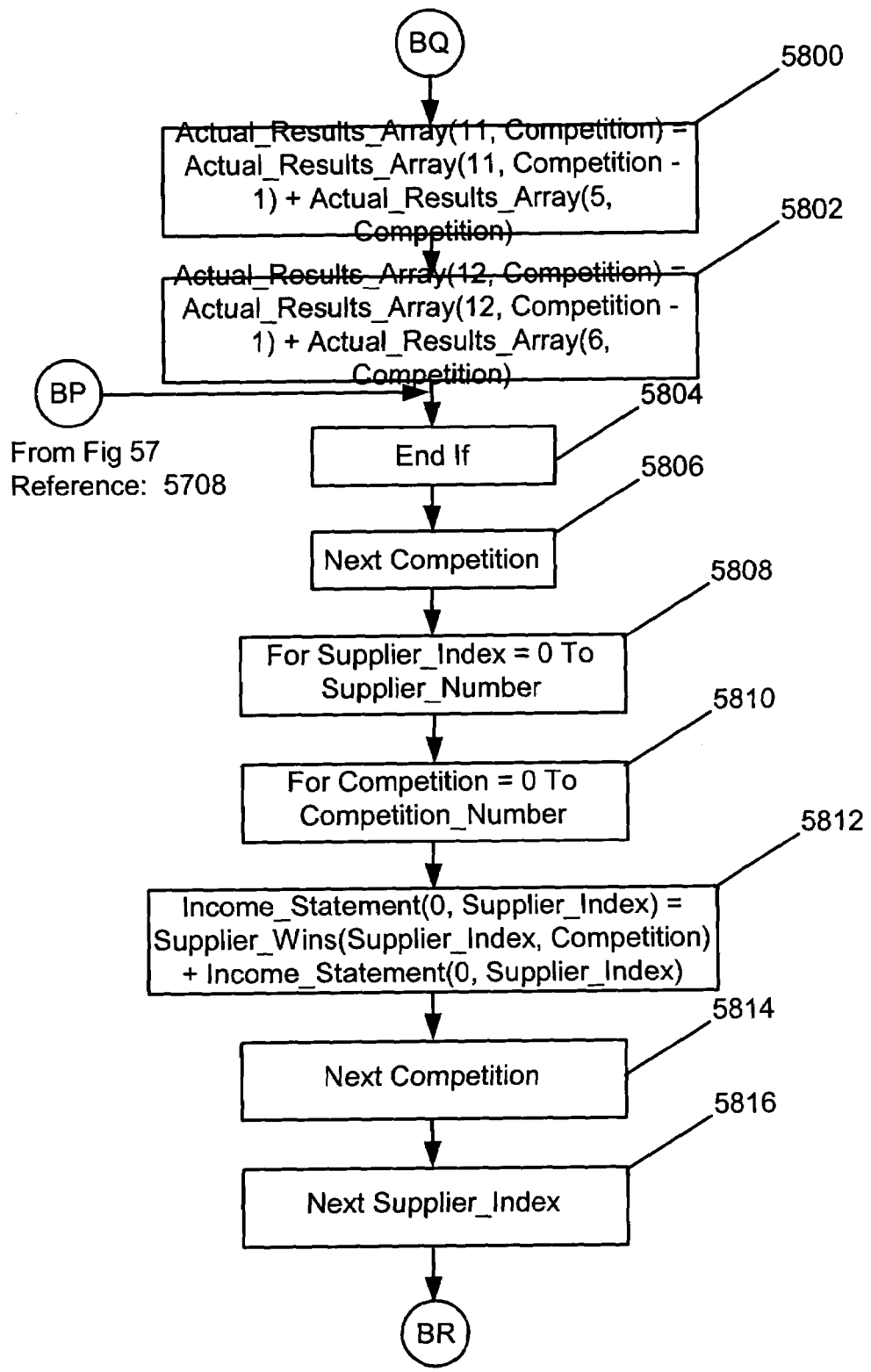
FIG. 58 is a flow chart of the continued accumulation of actual results and the formation of the income statement.

FIG. 58 is a flow chart of the continued accumulation of actual results and the formation of the income statement. The array element Actual_Results_Array 5800 stores the cumulative sales-general-and-administrative expense. The array element Actual_Results_Array 5802 stores the cumulative earnings before income tax. The Next Competition statement 5806 causes the variable Competition 5806 to be incremented and the programming loop defined by steps 2305 through 3506 repeated. A programming loop defined by steps 5808 through 5816 with the For statement 5808. Supplier_Index 5808 is set to zero and incremented in steps of one to a value of stored in the variable Supplier_Number 5808 plus one. A programming loop defined by steps 5810 through 5814 is established with the For statement 5810. Competition 5810 is set equal to zero and steps in increments of one to the value stored in Competition_Number 5810 plus one. The values representing winning prices in the array Supplier_Wins 5812 are aggragated in the array Income_Statement 5812. The statement Next Competition 5814 causes the programming loop defined by steps 5810 through 5814 to repeat. The statement Next Supplier_Index 5816 causes the programming loop 5808 through 5816 to repeat.

Figure 59:
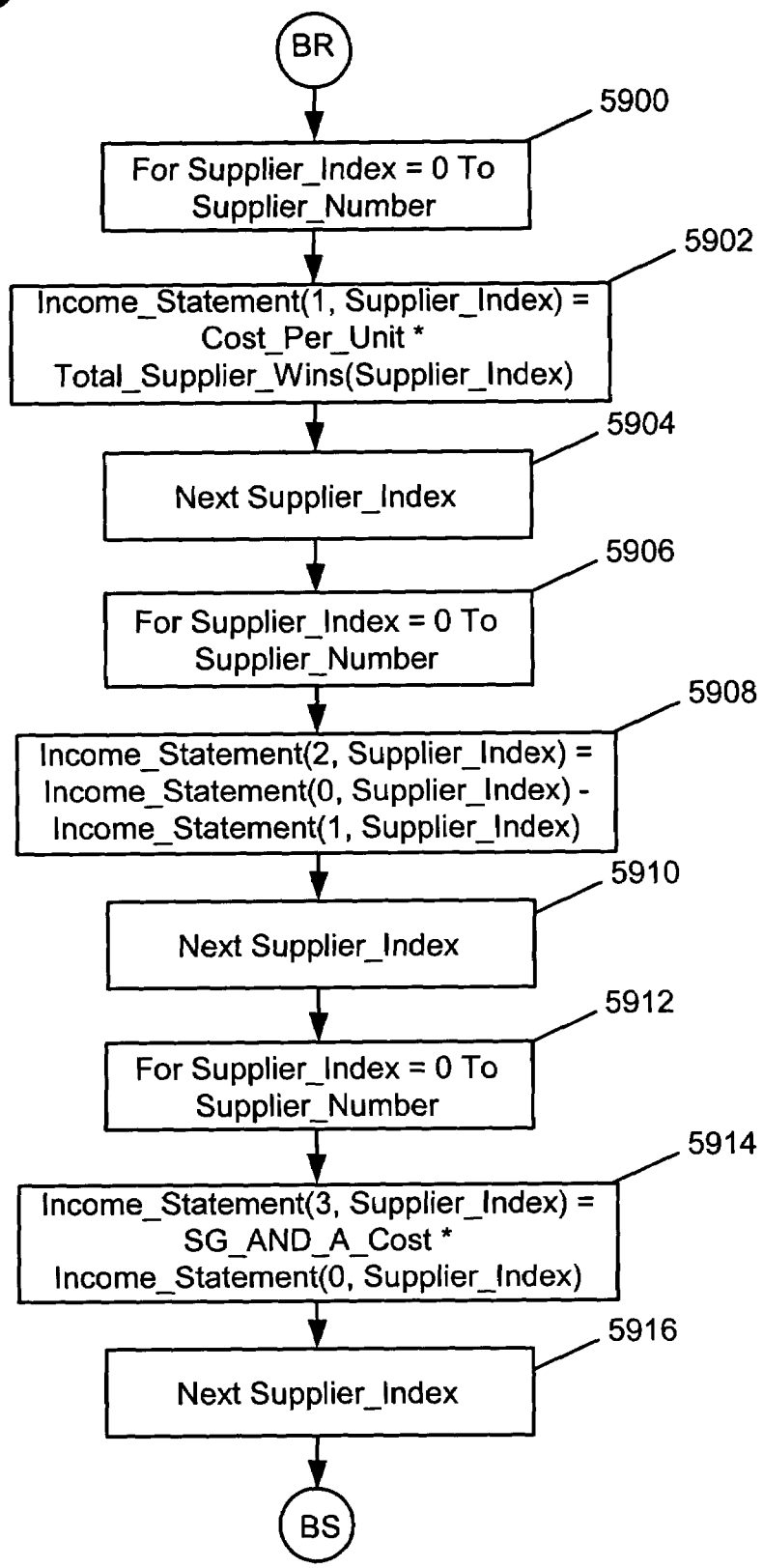
FIG. 59 is a flow chart of the continued formation of the income statement.

FIG. 59 is a flow chart of the continued formation of the income statement. A programming loop defined by steps 5900 through 5904 is initiated with the For statement 5900. Supplier_Index 5900 is set to zero and incremented in steps of one to a value of stored in Supplier_Number 5900 plus one. Cost-of-goods are aggregated in the indexed array element of the Income_Statement 5902 through the multiplication of Cost_Per_Unit 5902 with the indexed array element Total_Supplier_Wins 5902. The Next Supplier_Index 5904 causes the programming loop defined by steps 5900 through 5904 to repeat. A programming loop defined by steps 5906 and 5910 and is initiated with the For statement 5906.

Supplier_Index 5906 is set equal to zero and incremented in steps of one to a value stored in Supplier_Number 5906 plus one. Gross profit is calculated by subtracting the indexed array element of Income_Statement 5908, cost-of-goods sold, from another indexed array element of Income_Statement 5908 depicting income. The Next Supplier_Index statement 5910 causes the programming loop defined by steps 5906 through 5910 to be repeated. A programming loop defined by steps 5912 through 5916 is initiated with the For statement 5912. Supplier_Index 5912 is set to zero and incremented in steps of one of a value of store in Supplier_Number 5912 plus one. Sales-general-and-administration expenses are aggregated in the indexed array element of the Income_Statement 5914 through the multiplication of SG_And_A_Cost 5914 with the indexed array element of Income_Statement 5914. The Next Supplier_Index 5916 causes the programming loop defined by steps 5912 through 5916 to repeat.

Figure 60:
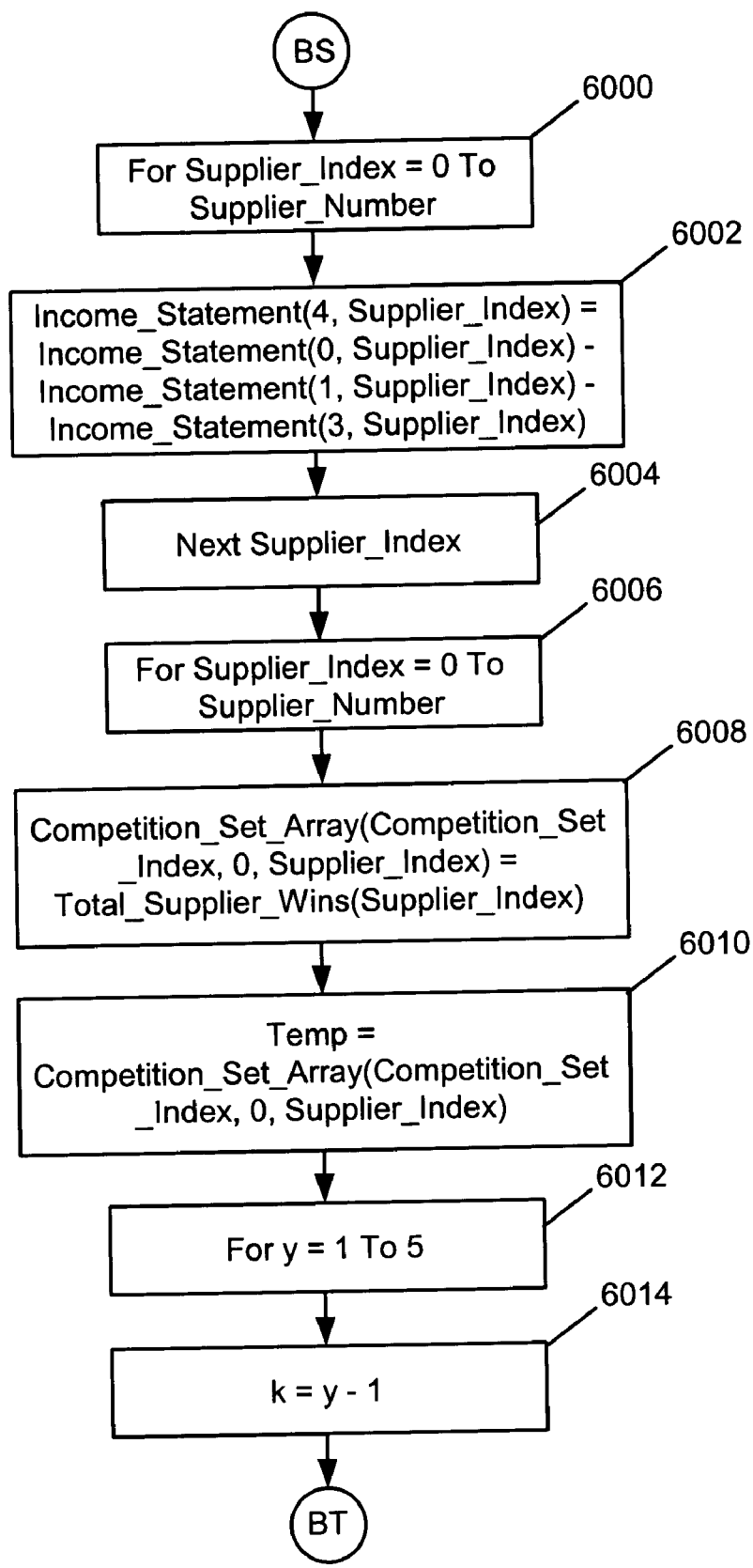
FIG. 60 is a flow chart of the continued formation of the income statement and Competition Set Array.

FIG. 60 is a flow chart of the continued formation of the income statement and the Competition Set Array. A programming loop defined by steps 6000 through 6004 is initiated with the For statement 6000. Supplier_Index 600 is set to zero and incremented in steps of one to a value of store in Supplier_Number 6000 plus one. Earnings before income tax are calculated and stored in an indexed array element of Income_Statement in step 6002 by subtracting the array elements of Income_Statement 6002 depicting cost-of-goods sold and sales-general-and-administration expenses from income, also depicting in Income_Statement 6002. The Next Supplier_Index 6004 causes the programming loop defined by steps 6000 through 6004 to repeat. A programming loop defined by steps 6006 through 6104 is initiated with the For statement 6006. Supplier_Index 6006 is set to zero and incremented in steps of one to a value of store in Supplier_Number 6006 plus one. The total wins for each supplier are stored in multiple indexed array elements of Competition_Set_Array 6008. The variable Temp 6010 stored the total supplier wins from the Competition_Set_Array 6008. A programming loop defined by steps 6012 through 6102 is initiated with the For statement 6012. y 6012 is set equal to one and incremented in steps of one to a value of five plus one. The variable k 6014 is calculated by subtracting one from the value of stored in y 6014.

Figure 61:
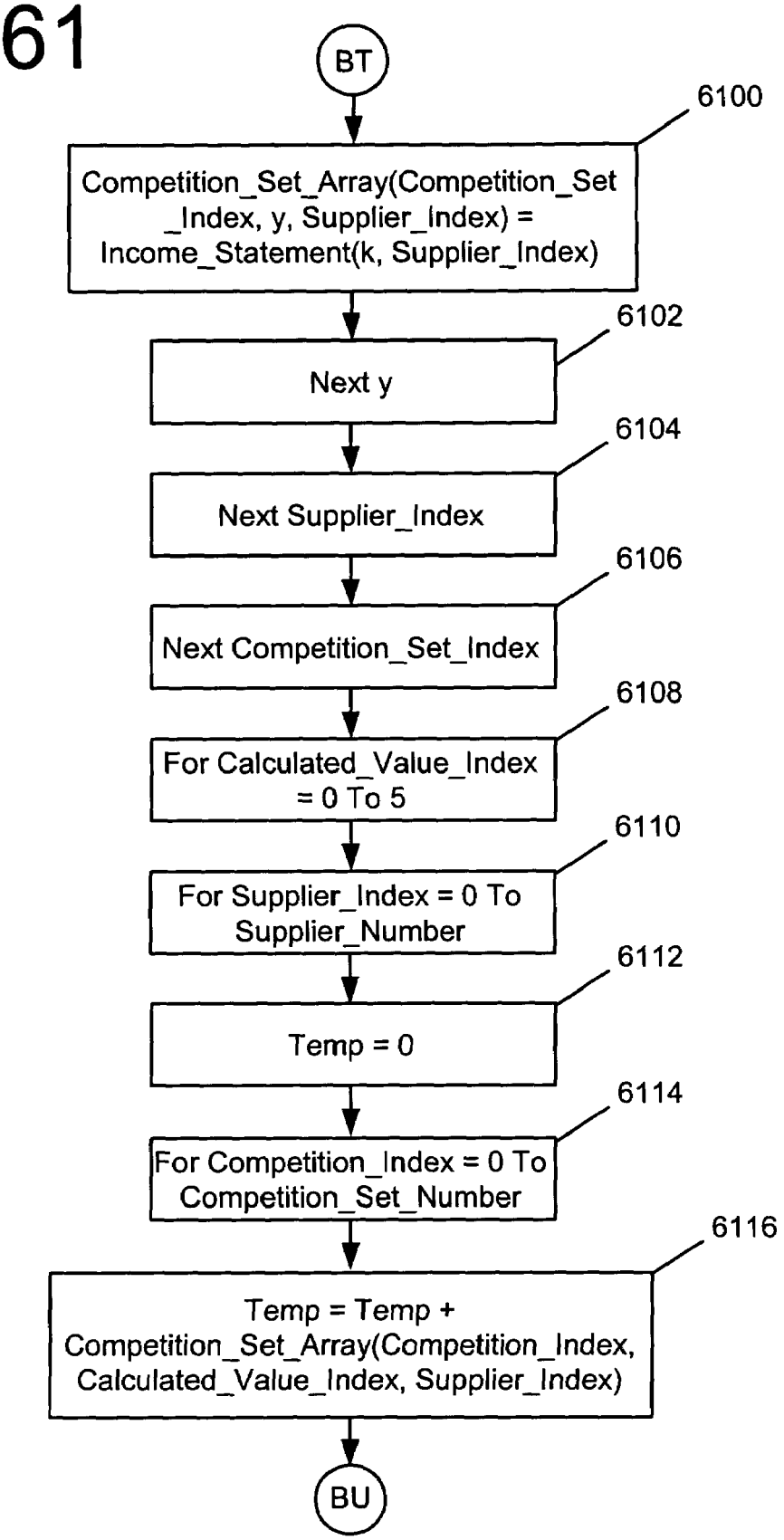
FIG. 61 is a flow chart of the continued formation of the Competition Set Array.

FIG. 61 is a flow chart of the continued formation of the Competition Set Array. The Competition_Set_Array 6100 stores the income statement for the current Competition_Set 6100. The Next y statement 6102 causes the programming loop defined by steps 6012 through 6102 to repeat. The Next Supplier_Index statement 6104 causes the programming loop defined by steps 6006 to 6104 to repeat. The Next Competition_Set_Index 6106 causes the programming loop 2212 through 6106 to repeat. A programming loop defined by steps 6108 through 6206 is initiated by the For statement 6108. The variable Calculated_Value_Index 6108 is set to zero and incremented in steps of one to a value of five plus one. A programming loop defined by steps 6110 through 6204 is initiated by the For statement 6110. The Supplier_Index 6110 is set equal to zero and incremented in steps of one to the value stored in Supplier_Number 6110 plus one. Zero is assigned to the variable Temp 6112. A programming loop defined by steps 6114 through 6200 is initiated by the For statement 6114. The variable Competition_Index 6114 is set to zero incremented in steps of one to the value stored in Competition_Set_Number 6114 plus one. The variable Temp 6116 is used to accumulate similar array elements in the Competition_Set_Array 6116 for the purposes of averaging.

Figure 62:
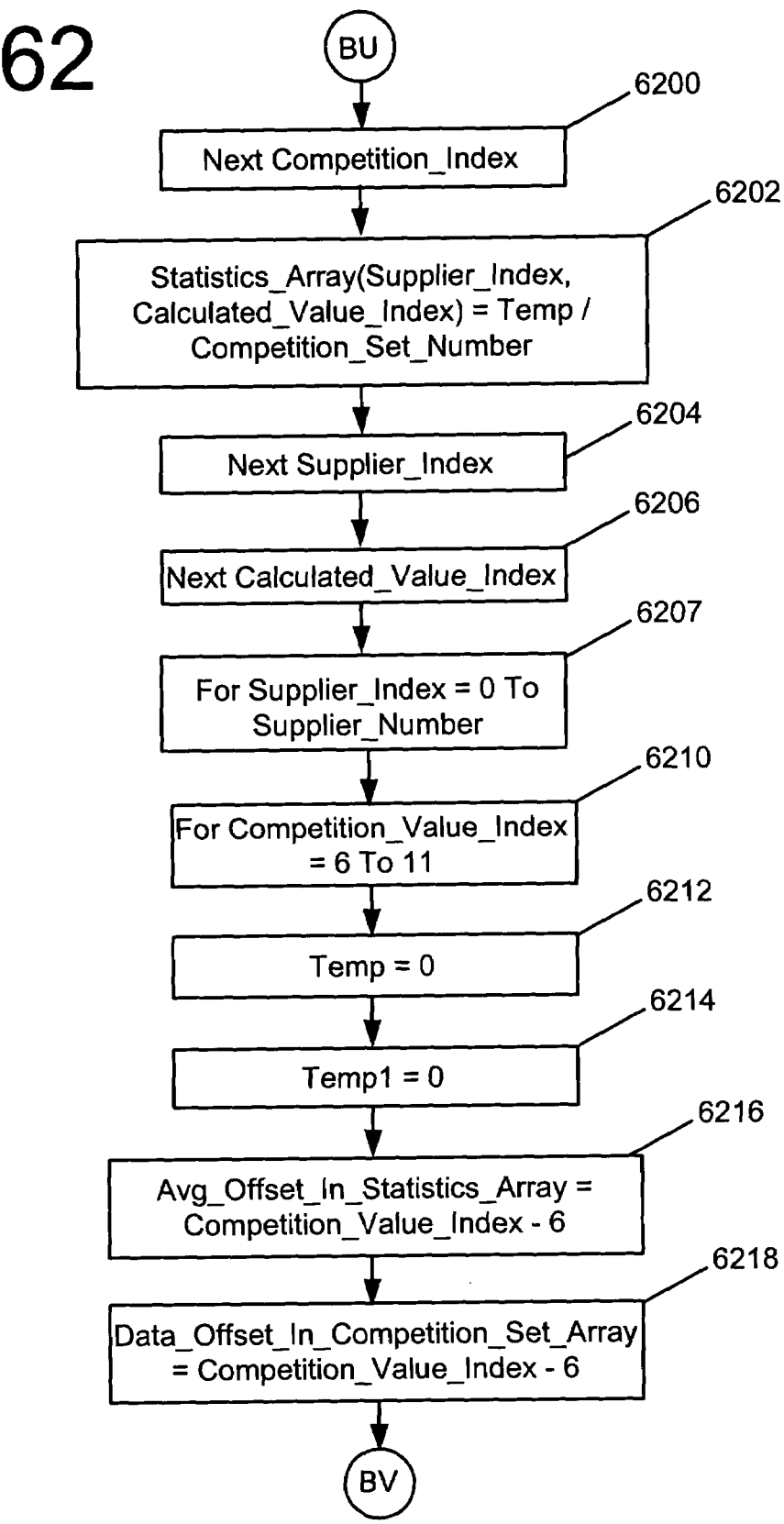
FIG. 62 is a flow chart of the formation of the Statistics Array.

FIG. 62 is a flow chart showing the formation of the Statistics Array. The Next Competition_Index 6200 statement cause the programming loop defined by steps 6114 through 6200. The average value is calculated for similar array elements of the Competition_Set_array 6116 by dividing Temp 6202 by the value stored in Competition_Set_Number 6202. The Next Supplier_Index statement 6204 cause the programming loop defined by 6110 through 6204 to repeat. The Next Calculated_Value_Index 6206 causes the programming loop defined by steps 6108 through 6206 to repeat. A programming loop defined by steps 6207 through 6312 is established and initiated by the For statement 6207. Supplier_Index 6207 is set to zero and incremented in steps of one to Supplier_Number 6207. A programming loop defined by steps 6210 through 6310 is initiated by the For statement 6210. The variable Competition_Value_Index 6210 is set to a value of six and incremented in steps of one to a value of eleven plus one. Temp 6212 is set to zero. Temp1 6214 is set to zero. The variable Avg_Offset_In_Statistics_Array 6216 is calculated by subtracting six from the value stored in Competition_Value_Index 6216. The variable Data_offset_In_Competition_Set_Array 6218 is calculated by subtracting six from the value stored in Competition_Value_Index 6218.

Figure 63:
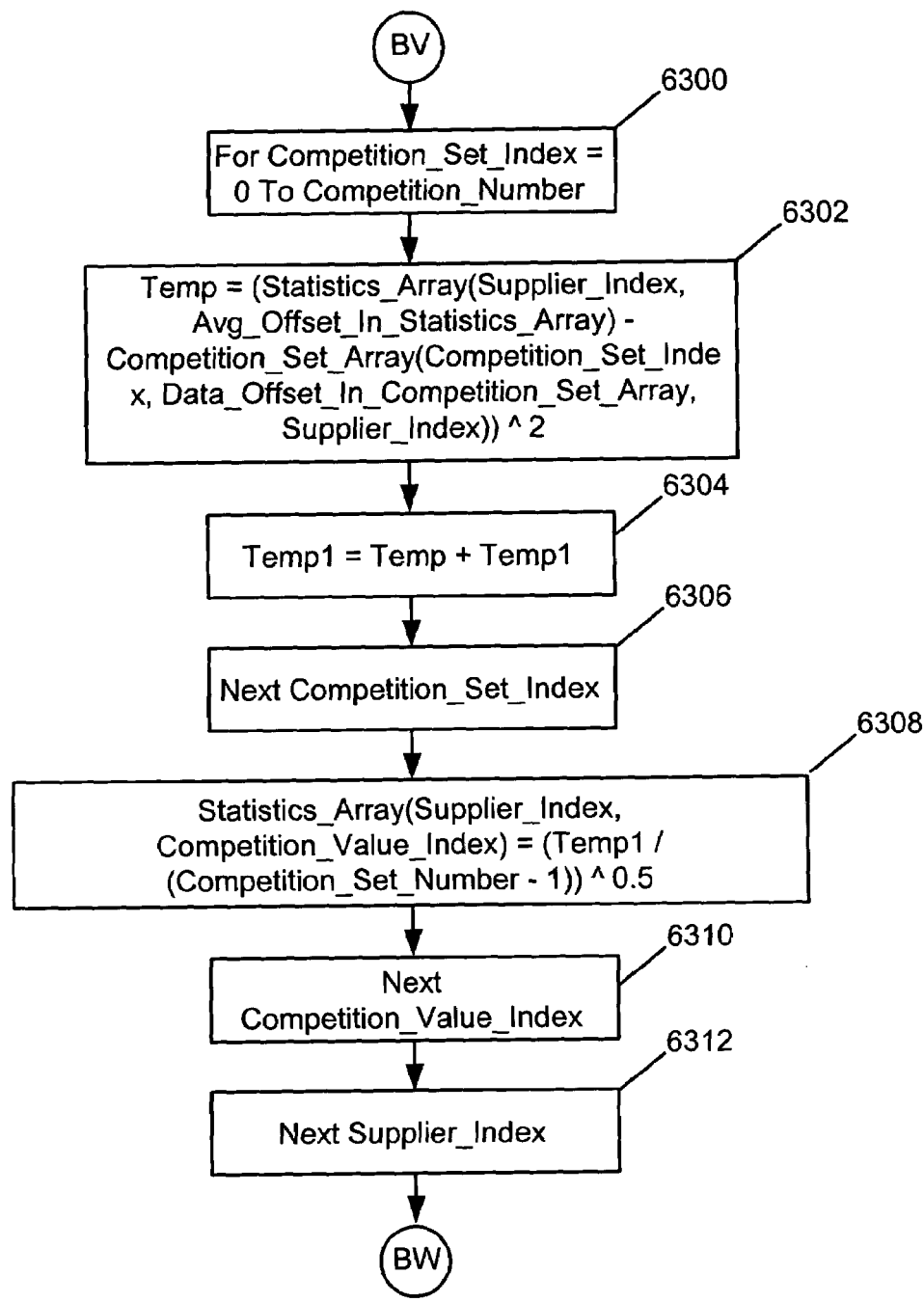
FIG. 63 is a flow chart of the continued formation of the Statistics Array.

FIG. 63 is a flow chart showing the continued formation of the Statistics Array. A programming loop defined by steps 6300 through 6306 and is initiated by the For statement 6300. Competition_Set_Index 6300 is set to zero and incremented in steps of one to a value stored in Competition_Number 6300 plus one. The variable Temp 6302 is calculated by squaring the difference between the average value stored in the array element of Statistics_Array 6302 and the stored array element value in Competition_Set_Array 6302. Temp1 6304 is calculated by summing Temp1 6304 with Temp 6304. The Next Competition_Set_Index statement 6306 causes the programming loop defined by steps 6300 through 6306 to repeat. The standard deviation is calculated and stored in the Statistics_Array 6308. The Next Competition_Value_Index statement 6310 causes the programming loop defined by steps 6210 through 6310 to repeat.

Figure 64:
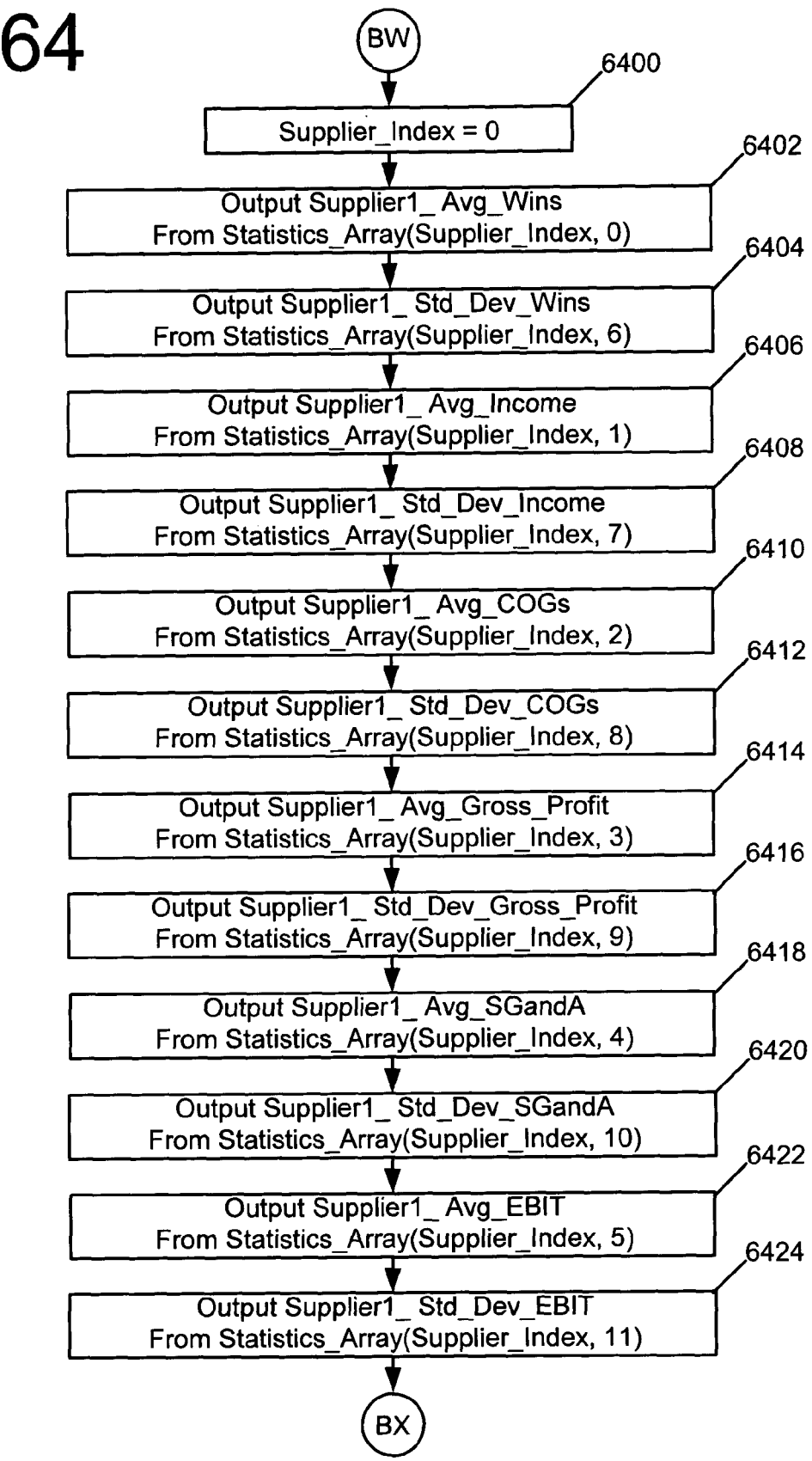
FIG. 64 is a flow chart showing the output of data to the display.

FIG. 64 is a flow chart showing the output of data to the display. Supplier_Index 6400 is set to zero. The value for Supplier1_Avg_Wins 6402 is extracted from the Statistics_Array 6402 and passed to the display. The value for Supplier1_Std_Dev_Wins 6404 is extracted from the Statistics_Array 6404 and passed to the display. The value for Supplier1_Avg_Income 6406 is extracted from the Statistics_Array 6406 and passed to the display. The value for Supplier1_Std_Dev_Income 6408 is extracted from the Statistics_Array 6408 and passed to the display. The value for Supplier1_Avg_COGs 6410 is extracted from the Statistics_Array 6410 and passed to the display. The value for Supplier1_Std_Dev_COGs 6412 is extracted from the Statistics_Array 6412 and passed to the display. The value for Supplier1_Avg_Gross_Profit 6414 is extracted from the Statistics_Array 6414 and passed to the display. The value for Supplier1_Std_Dev_Gross_Profit 6416 is extracted from the Statistics_Array 6416 and passed to the display. The value for Supplier1_Avg_SGandA 6418 is extracted from the Statistics_Array 6418 and passed to the display. The value for Supplier1_Std_Dev_SGandA 6420 is extracted from the Statistics_Array 6420 and passed to the display. The value for Supplier1_Avg_EBIT 6422 is extracted from the Statistics_Array 6422 and passed to the display. The value for Supplier1_Std_Dev_EBIT 6424 is extracted from the Statistics_Array 6424 and passed to the display.

Figure 65:
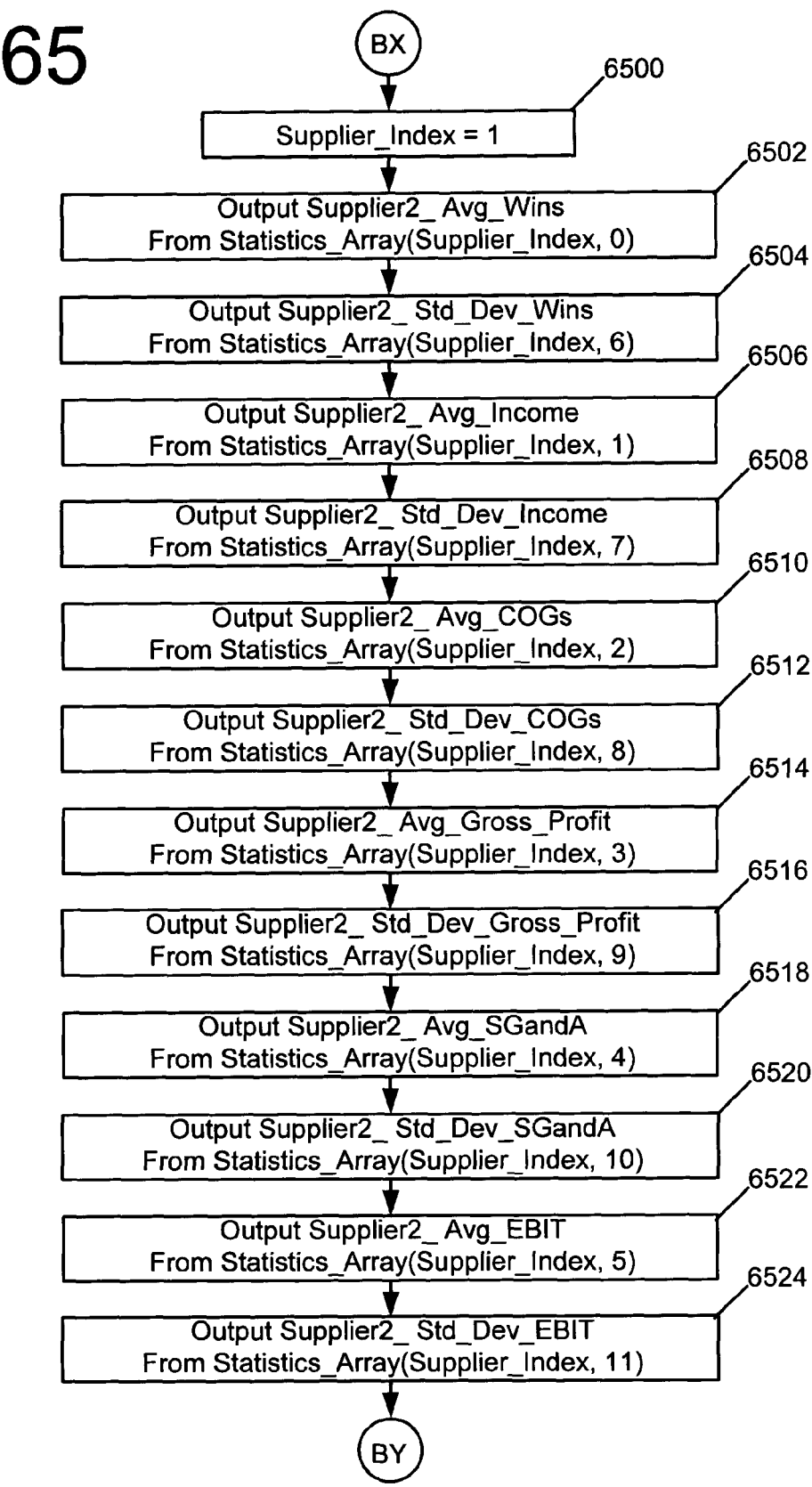
FIG. 65 is a flow chart showing the output of data to the display.

FIG. 65 is a flow chart showing the output of data to the display. Supplier_Index 6500 is set to one. The value for Supplier2_Avg_Wins 6502 is extracted from the Statistics_Array 6502 and passed to the display. The value for Supplier2_Std_Dev_Wins 6504 is extracted from the Statistics_Array 6504 and passed to the display. The value for Supplier2_Avg_Income 6506 is extracted from the Statistics_Array 6506 and passed to the display. The value for Supplier2_Std_Dev_Income 6508 is extracted from the Statistics_Array 6508 and passed to the display. The value for Supplier2_Avg_COGs 6510 is extracted from the Statistics_Array 6510 and passed to the display. The value for Supplier2_Std_Dev_COGs 6512 is extracted from the Statistics_Array 6512 and passed to the display. The value for Supplier2_Avg_Gross_Profit 6514 is extracted from the Statistics_Array 6514 and passed to the display. The value for Supplier2_Std_Dev_Gross_Profit 6516 is extracted from the Statistics_Array 6516 and passed to the display. The value for Supplier2_Avg_SGandA 6518 is extracted from the Statistics_Array 6518 and passed to the display. The value for Supplier2_Std_Dev_SGandA 6520 is extracted from the Statistics_Array 6520 and passed to the display. The value for Supplier2_Avg_EBIT 6522 is extracted from the Statistics_Array 6522 and passed to the display. The value for Supplier2_Std_Dev_EBIT 6524 is extracted from the Statistics_Array 6524 and passed to the display.

Figure 66:
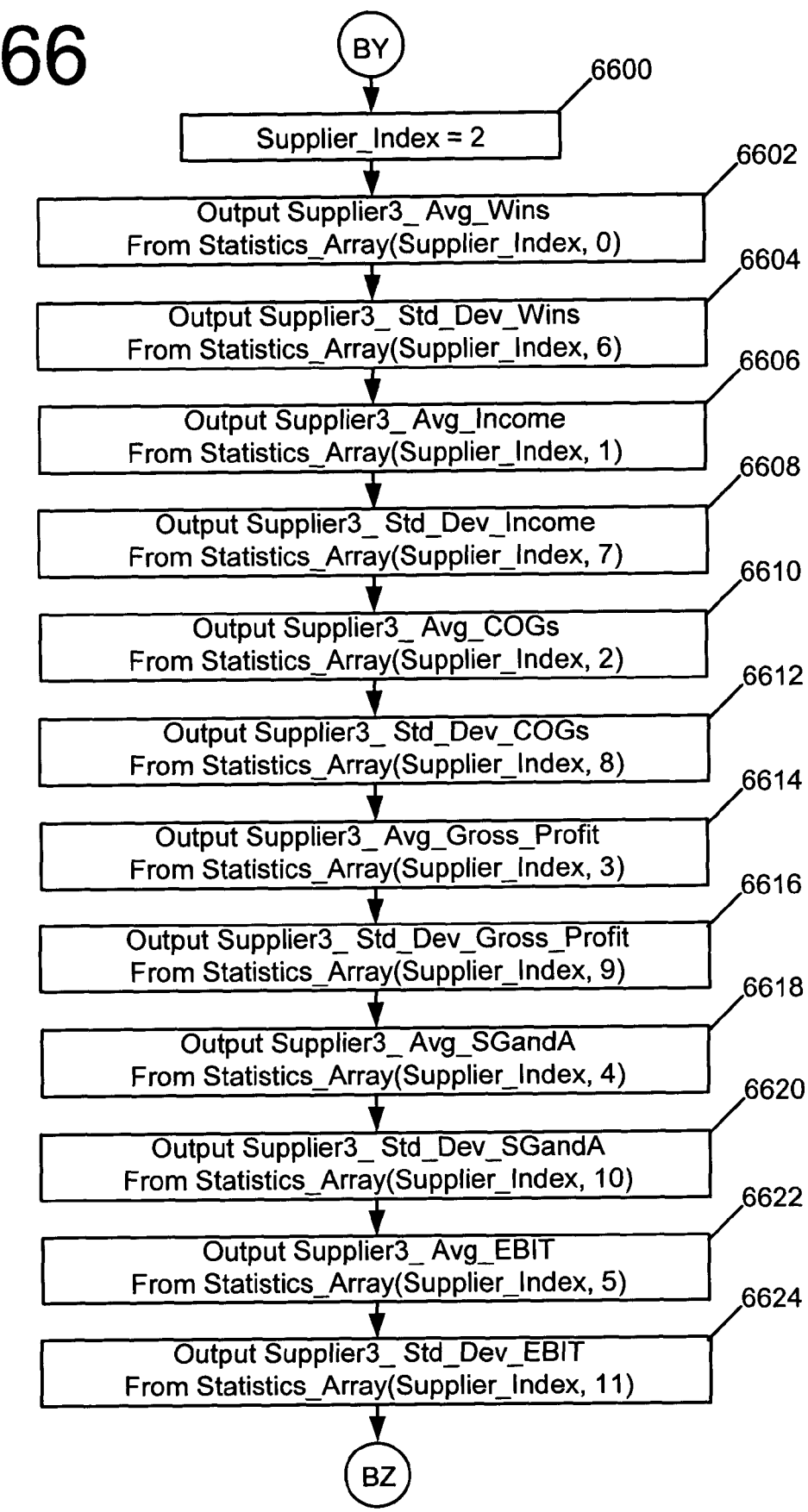
FIG. 66 is a flow chart showing the output of data to the display.

FIG. 66 is a flow chart showing the output of data to the display. Supplier_Index 6600 is set to two. The value for Supplier3_Avg_Wins 6602 is extracted from the Statistics_Array 6602 and passed to the display. The value for Supplier3_Std_Dev_Wins 6604 is extracted from the Statistics_Array 6604 and passed to the display. The value for Supplier3_Avg_Income 6606 is extracted from the Statistics_Array 6606 and passed to the display. The value for Supplier3_Std_Dev_Income 6608 is extracted from the Statistics_Array 6608 and passed to the display. The value for Supplier3_Avg_COGs 6610 is extracted from the Statistics_Array 6610 and passed to the display. The value for Supplier3_Std_Dev_COGs 6612 is extracted from the Statistics_Array 6612 and passed to the display. The value for Supplier3_Avg_Gross_Profit 6614 is extracted from the Statistics_Array 6614 and passed to the display. The value for Supplier3_Std_Dev_Gross_Profit 6616 is extracted from the Statistics_Array 6616 and passed to the display. The value for Supplier3_Avg_SGandA 6618 is extracted from the Statistics_Array 6618 and passed to the display. The value for Supplier3_Std_Dev_SGandA 6620 is extracted from the Statistics_Array 6620 and passed to the display. The value for Supplier3_Avg_EBIT 6622 is extracted from the Statistics_Array 6622 and passed to the display. The value for Supplier3_Std_Dev_EBIT 6624 is extracted from the Statistics_Array 6624 and passed to the display.

Figure 67:
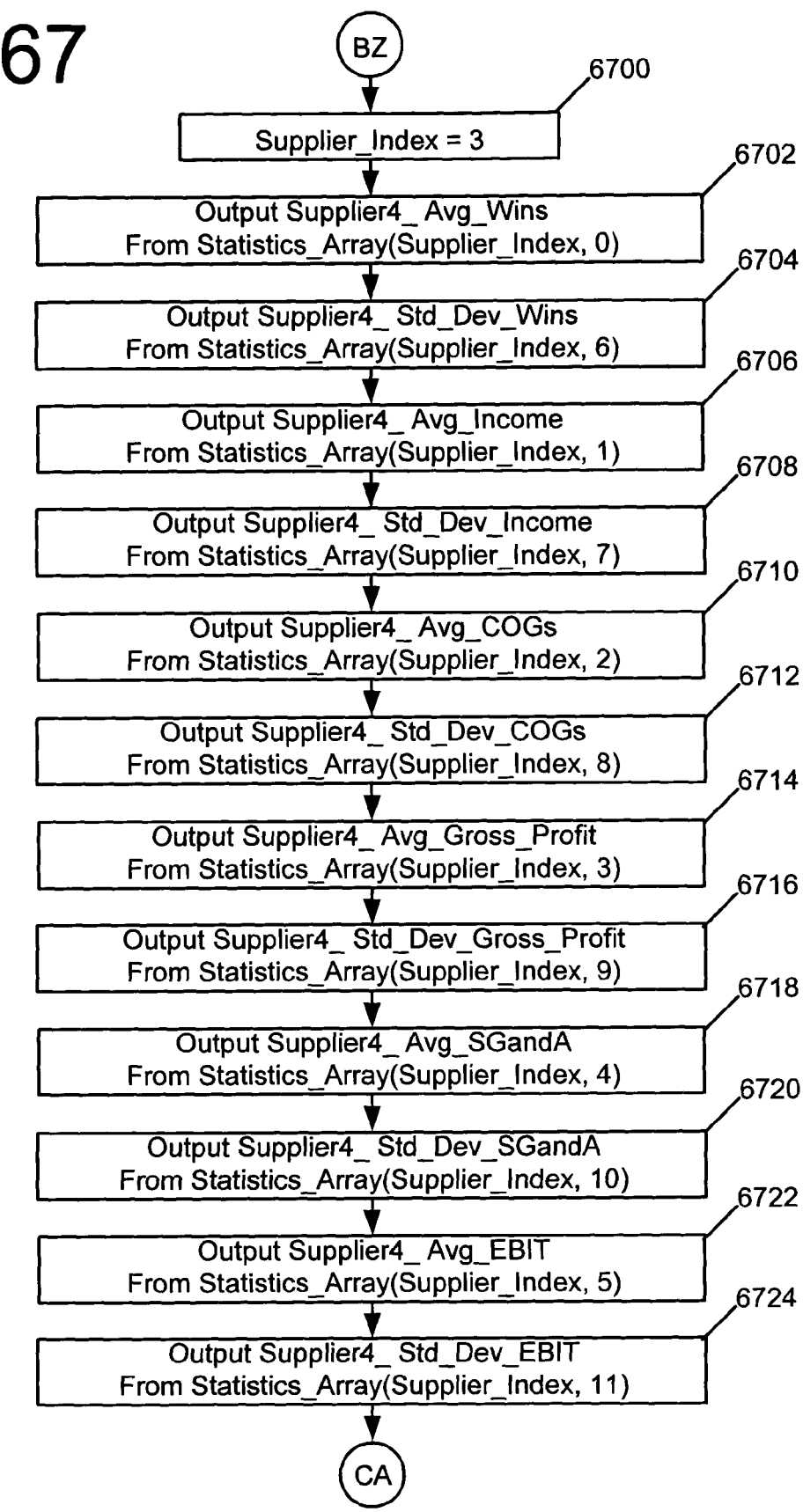
FIG. 67 is a flow chart showing the output of data to the display.

FIG. 67 is a flow chart showing the output of data to the display. Supplier_Index 6700 is set to three. The value for Supplier4_Avg_Wins 6702 is extracted from the Statistics_Array 6702 and passed to the display. The value for Supplier4_Std_Dev_Wins 6704 is extracted from the Statistics_Array 6704 and passed to the display. The value for Supplier4_Avg_Income 6706 is extracted from the Statistics_Array 6706 and passed to the display. The value for Supplier4_Std_Dev_Income 6708 is extracted from the Statistics_Array 6708 and passed to the display. The value for Supplier4_Avg_COGs 6710 is extracted from the Statistics_Array 6710 and passed to the display. The value for Supplier4_Std_Dev_COGs 6712 is extracted from the Statistics_Array 6712 and passed to the display. The value for Supplier4_Avg_Gross_Profit 6714 is extracted from the Statistics_Array 6714 and passed to the display. The value for Supplier4_Std_Dev_Gross_Profit 6716 is extracted from the Statistics_Array 6716 and passed to the display. The value for Supplier4_Avg_SGandA 6718 is extracted from the Statistics_array 6718 and passed to the display. The value for Supplier4_Std_Dev_SGandA 6720 is extracted from the Statistics_Array 6720 and passed to the display. The value for Supplier4_Avg_EBIT 6722 is extracted from the Statistics_Array 6722 and passed to the display. The value for Supplier4_Std_Dev_EBIT 6724 is extracted from the Statistics_Array 6724 and passed to the display.

Figure 68:
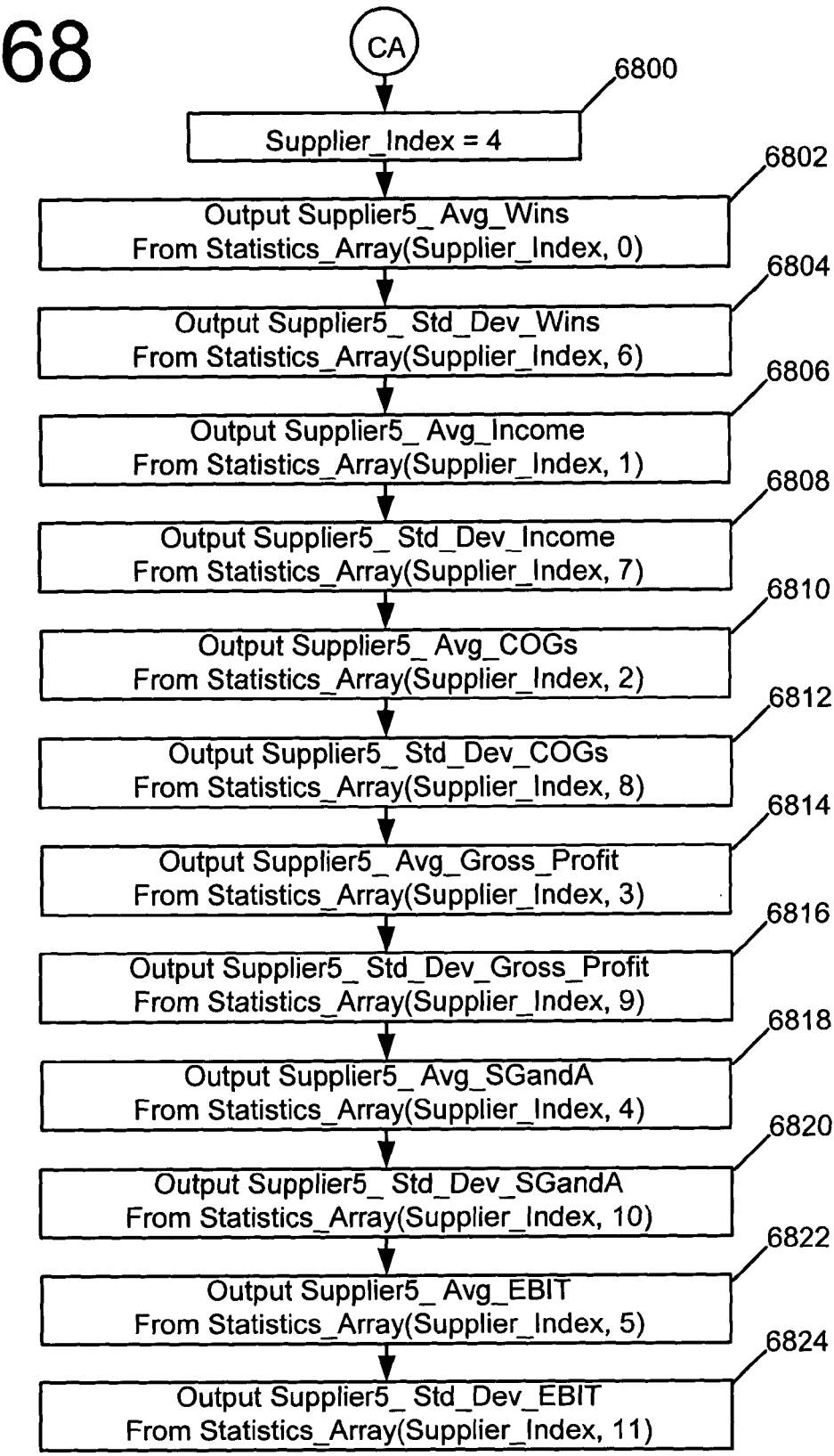
FIG. 68 is a flow chart showing the output of data to the display.

FIG. 68 is a flow chart showing the output of data to the display. Supplier5_Index 6800 is set to four. The value for Supplier5_Avg_Wins 6802 is extracted from the Statistics_Array 6802 and passed to the display. The value for Supplier5_Std_Dev_Wins 6804 is extracted from the Statistics_Array 6804 and passed to the display. The value for Supplier5_Avg_Income 6806 is extracted from the Statistics_Array 6806 and passed to the display. The value for Supplier5_Std_Dev_Income 6808 is extracted from the Statistics_Array 6808 and passed to the display. The value for Supplier5_Avg_COGs 6810 is extracted from the Statistics_Array 6810 and passed to the display. The value for Supplier5_Std_Dev_COGs 6812 is extracted from the Statistics_Array 6812 and passed to the display. The value for Supplier5_Avg_Gross_Profit 6814 is extracted from the Statistics_Array 6814 and passed to the display. The value for Supplier5_Std_Dev_Gross_Profit 6816 is extracted from the Statistics_Array 6816 and passed to the display. The value for Supplier5_Avg_SGandA 6818 is extracted from the Statistics_Array 6818 and passed to the display. The value for Supplier5_Std_Dev_SGandA 6820 is extracted from the Statistics_Array 6820 and passed to the display. The value for Supplier5_Avg_EBIT 6822 is extracted from the Statistics_Array 6822 and passed to the display. The value for Supplier5_Std_Dev_EBIT 6824 is extracted from the Statistics_Array 6824 and passed to the display.

Figure 69:
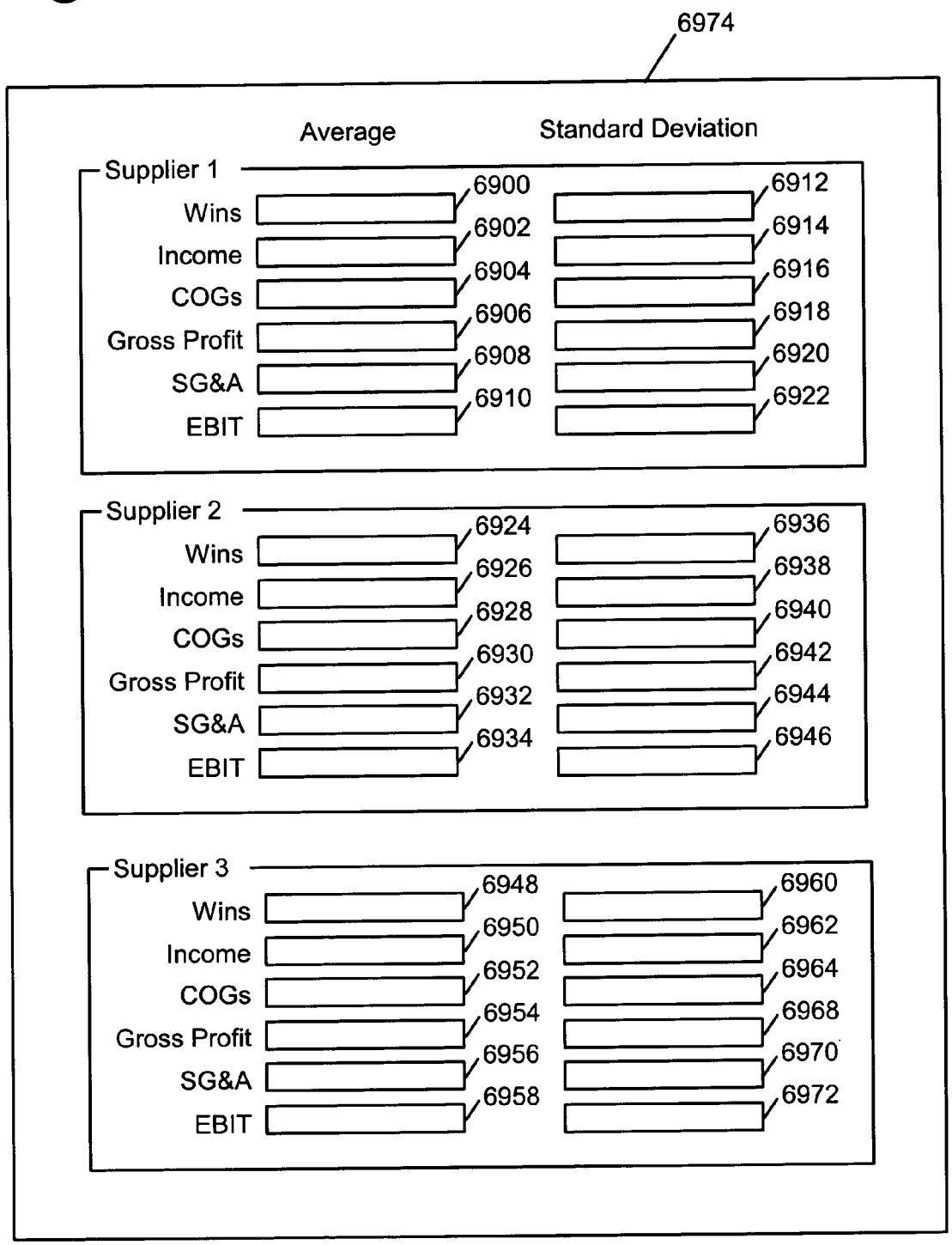
FIG. 69 is an illustration of the output display.
Figure 70:
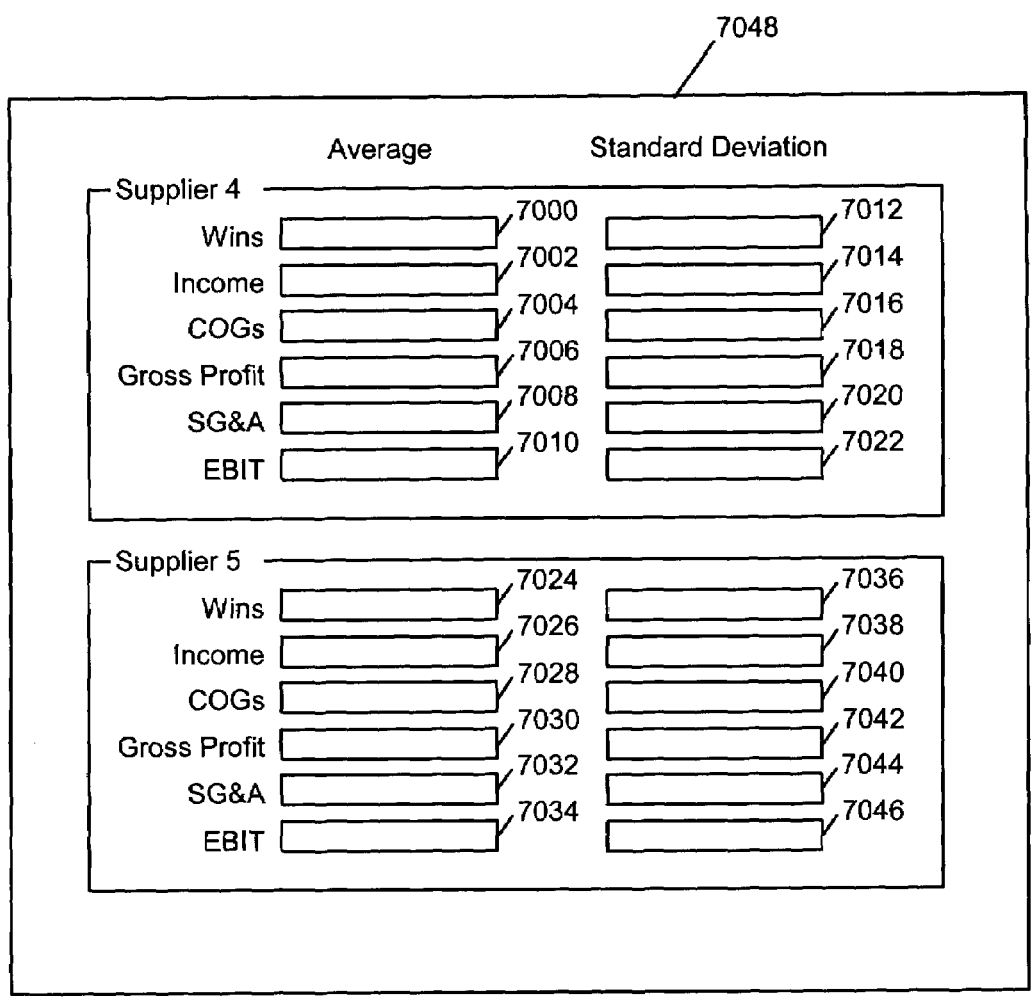
FIG. 70 is an illustration of the output display.

FIGS. 69 and 70 shows the output displays. The output display 6974 shows the simulation results for Supplier1 6974 though Supplier3 6974. The output display 7048 shows the simulation results for Supplier4 7048 and Supplier5 7048. The manner in which the fields contained in the output displays are populated are described in the following table. The Source of the Data describes the variable name and drawing reference number. The Display Field Reference Number indicates the display field that corresponds to the variable that will be displayed. See Table 1 below.

TABLE 1

| Source of Data | | Display Field Reference Number |
|---|---|---|
| Variable Name | Reference Number | |
| Supplier1_Avg_Wins | 6402 | 6900 |
| Supplier1_Std_Dev_Wins | 6404 | 6912 |
| Supplier1_Avg_Income | 6406 | 6902 |
| Supplier1_Std_Dev_Income | 6408 | 6914 |
| Supplier1_Avg_COGs | 6410 | 6904 |
| Supplier1_Std_Dev_COGs | 6412 | 6916 |
| Supplier1_Avg_Gross_Profit | 6414 | 6906 |
| Supplier1_Std_Dev_Gross_Profit | 6414 | 6918 |
| Supplier1_Avg_SGandA | 6418 | 6908 |
| Supplier1_Std_Dev_SGandA | 6418 | 6920 |
| Supplier1_Avg_EBIT | 6422 | 6910 |
| Supplier1_Std_Dev_EBIT | 6422 | 6922 |
| Supplier2_Avg_Wins | 6502 | 6924 |
| Supplier2_Std_Dev_Wins | 6504 | 6936 |
| Supplier2_Avg_Income | 6506 | 6926 |
| Supplier2_Std_Dev_Income | 6508 | 6938 |
| Supplier2_Avg_COGs | 6510 | 6928 |
| Supplier2_Std_Dev_COGs | 6512 | 6940 |
| Supplier2_Avg_Gross_Profit | 6514 | 6930 |
| Supplier2_Std_Dev_Gross_Profit | 6516 | 6942 |
| Supplier2_Avg_SGandA | 6518 | 6932 |
| Supplier2_Std_Dev_SGandA | 6520 | 6944 |
| Supplier2_Avg_EBIT | 6522 | 6934 |
| Supplier2_Std_Dev_EBIT | 6524 | 6946 |
| Supplier3_Avg_Wins | 6602 | 6948 |
| Supplier3_Std_Dev_Wins | 6604 | 6960 |
| Supplier3_Avg_Income | 6606 | 6950 |
| Supplier3_Std_Dev_Income | 6608 | 6962 |
| Supplier3_Avg_COGs | 6610 | 6952 |
| Supplier3_Std_Dev_COGs | 6612 | 6964 |
| Supplier3_Avg_Gross_Profit | 6614 | 6954 |
| Supplier3_Std_Dev_Gross_Profit | 6616 | 6968 |
| Supplier3_Avg_SGandA | 6618 | 6956 |
| Supplier3_Std_Dev_SGandA | 6620 | 6970 |
| Supplier3_Avg_EBIT | 6622 | 6958 |
| Supplier3_Std_Dev_EBIT | 6624 | 6972 |
| Supplier4_Avg_Wins | 6702 | 7000 |
| Supplier4_Std_Dev_Wins | 6704 | 7012 |
| Supplier4_Avg_Income | 6706 | 7002 |
| Supplier4_Std_Dev_Income | 6708 | 7014 |
| Supplier4_Avg_COGs | 6710 | 7004 |
| Supplier4_Std_Dev_COGs | 6712 | 7016 |
| Supplier4_Avg_Gross_Profit | 6714 | 7006 |
| Supplier4_Std_Dev_Gross_Profit | 6716 | 7018 |
| Supplier4_Avg_SGandA | 6718 | 7008 |
| Supplier4_Std_Dev_SGandA | 6720 | 7020 |
| Supplier4_Avg_EBIT | 6722 | 7010 |
| Supplier4_Std_Dev_EBIT | 6724 | 7022 |
| Supplier5_Avg_Wins | 6802 | 7024 |
| Supplier5_Std_Dev_Wins | 6804 | 7036 |
| Supplier5_Avg_Income | 6806 | 7026 |
| Supplier5_Std_Dev_Income | 6808 | 7038 |
| Supplier5_Avg_COGs | 6810 | 7028 |
| Supplier5_Std_Dev_COGs | 6812 | 7040 |
| Supplier5_Avg_Gross_Profit | 6814 | 7030 |
| Supplier5_Std_Dev_Gross_Profit | 6816 | 7042 |
| Supplier5_Avg_SGandA | 6818 | 7032 |
| Supplier5_Std_Dev_SGandA | 6820 | 7044 |
| Supplier5_Avg_EBIT | 6822 | 7034 |
| Supplier5_Std_Dev_EBIT | 6824 | 7046 |

What is claimed is:

1. A method performed utilizing a computer system, the method comprising:
   receiving via an input device of the computer system a price-frequency mathematical distribution of prices associated with at least one non-optimized supplier;
   storing the distribution of prices in memory of the computer system;
   receiving via the input device of the computer system, a number of competitors, a business objective, and a cost associated with a good or service;
   storing the number of competitors, business objective, and cost associated with the good or service in the memory of the computer system;
   producing a set of non-optimized prices based on the distribution of prices, by selecting at least one non-optimized price for each competitor from the distribution of prices, utilizing a processor of the computer system;
   calculating an optimal price based on the selected non-optimized prices, number of competitors, business objective, and cost associated with the good or service, wherein the business objective is selected from the group consisting of maximizing revenue for the good or service, maximizing gross profit for the good or service, maximizing factory utilization for the good or service, maximizing market share for the good or service, and maximizing earnings before income tax (EBIT) for the good or service, utilizing the processor of the computer system;

displaying via an output device of the computer system the calculated optimal price for accomplishing the business objective;

simulating the optimal price to generate an updated optimal price by identifying a result of utilizing the optimal price, where the result is stored, and a search is performed for the updated optimal price that optimizes a user-selected business objective selected from the group consisting of maximizing revenue for the good or service, maximizing gross profit for the good or service, maximizing factory utilization for the good or service, maximizing market share for the good or service, and maximizing earnings before interest and tax (EBIT) for the good or service, utilizing the processor of the computer system, where
a) the result includes an expected result,
b) the expected result is compared with an actual result,
c) it is determined whether an optimization is required based on the comparison, and
d) if it is determined that the optimization is required, the updated optimal price is identified; and displaying via the output device of the computer system the updated optimal price for further accomplishing the business objective.

2. A method as recited in claim 1, and further comprising receiving a plurality of sets of one or more prices.

3. A method as recited in claim 2, wherein the sets of one or more prices are customizable.

4. A method as recited in claim 2, and further comprising comparing the sets of one or more prices.

5. A method as recited in claim 4, and further comprising reporting on the comparison.

6. A method as recited in claim 1, wherein the method is performed by a plurality of components including a frequency distribution engine, a probability of win engine, an expected results engine, an optimization update engine, a bid engine, a market place engine, and a financial accumulator engine.

7. A method as recited in claim 1, wherein the method is performed by a plurality of components selected from the group of a frequency distribution engine, a probability of win engine, an expected results engine, an optimization update engine, a bid engine, a market place engine, and a financial accumulator engine.

8. A method as recited in claim 1, wherein a graphical user interface is included for inputting a set of the competitor prices and the number of competitors.

9. A method as recited in claim 8, wherein the graphical user interface is adapted for inputting the business objective.

10. A method as recited in claim 8, wherein a graphical user interface is included for inputting a value for a cost-per-unit, an error rate, and an optimization update.

11. A method as recited in claim 10, wherein the price-frequency mathematical distribution is used to estimate the set of the competitor prices.

12. The method as described in claim 11, wherein the price-frequency mathematical distribution is estimated using the set of competitor prices.

13. The method as described in claim 11, wherein the price-frequency mathematical distribution is converted to an expected probability of a customer purchase based on the number of competitors.

14. A method as recited in claim 11, wherein the price-frequency mathematical distribution is converted to a table of prices with a frequency of a price within the table corresponding to the price-frequency mathematical distribution.

15. A method as recited in claim 14, wherein each price, probability of a customer purchase, and cost-per-unit are used to form a partial income statement for each member of the plurality of prices.

16. A method as recited in claim 15, wherein each partial income statement is comprised of financial terms including revenue, cost-of-goods, and gross profit.

17. A method as recited in claim 16, wherein a set of the partial income statements are stored within a table.

18. A method as recited in claim 1, wherein a maximum revenue value and a maximum profit value are identified along with corresponding prices.

19. The method as described in claim 1, wherein a probability of a customer purchase is determined for the optimal price.

20. A method as recited in claim 1, wherein a number of selected prices corresponding to the number of competitors is chosen, where the selection of the prices is performed in a random manner.

21. The method as described in claim 20, wherein a lowest price in a set of prices is identified as a winning bid along with a corresponding supplier, the lowest price including the number of randomly selected prices and the optimal price.

22. The method as described in claim 21, wherein the winning bid and the probability of a customer purchase is added to an actual results table comprising of fields identifying a winning supplier, lowest price, cost-per-unit, gross profit, probability of a customer purchase, and actual winrate.

23. The method as described in claims 22, wherein a value for competition is calculated by summing each event of randomly selecting a set of prices corresponding to the number of competitors.

24. A method as recited in claim 23, wherein a value is calculated representing a sum of wins corresponding to the supplier.

25. The method as described in claim 24, wherein the actual winrate is calculated by dividing the sum of wins by the value for competition.

26. The method as described in claim 25, wherein if a condition where the value for competition is equal to or greater than an optimization update window value, and the actual winrate is greater than the expected probability of a customer purchase plus a tolerable error window value, or the actual winrate is less than the probability of a customer purchase minus the tolerable error window value, then the price-frequency mathematical distribution is adjusted so that a new expected probability of a customer purchase is equal to the actual winrate, and recorded values of wins and competition are set to zero.

27. A computer program product embodied on a computer readable medium, comprising:
- computer code for receiving via an input device of the computer system a price-frequency mathematical distribution of prices associated with at least one non-optimized supplier;
- computer code for storing the distribution of prices in memory of the computer system;
- computer code for receiving via the input device of the computer system a number of competitors, a business objective, and a cost associated with a good or service;
- computer code for storing the number of competitors, business objective, and cost associated with the good or service in the memory of the computer system;
- computer code for producing a set of non-optimized prices based on the distribution of prices, by selecting at least one non-optimized price for each competitor from the distribution of prices, utilizing a processor of the computer system;
- computer code for calculating an optimal price based on the selected non-optimized prices, number of competitors, business objective, and cost associated with the good or service, wherein the business objective is selected from the group consisting of maximizing revenue for the good or service, maximizing gross profit for the good or service, maximizing factory utilization for the good or service, maximizing market share for the good or service, and maximizing earnings before income tax (EBIT) for the good or service, utilizing the processor of the computer system;
- computer code for display via an output device of the computer system the calculated optimal price for accomplishing the business objective;
- computer code for simulating the optimal price to generate an updated optimal price by identifying a result of utilizing the optimal price, where the result is stored, and a search is performed for the updated optimal price that optimizes a user-selected business objective selected from the group consisting of maximizing revenue for the good or service, maximizing gross profit for the good or service, maximizing factory utilization for the good or service, maximizing market share for the good or service, and maximizing earnings before interest and tax (EBIT) for the good or service, utilizing the processor of the computer system, where
- a) the result includes an expected result,
- b) the expected result is compared with an actual result,
- c) it is determined whether an optimization is required based on the comparison, and
- d) if it is determined that the optimization is required, the updated optimal price is identified; and computer code for displaying via the output device of the computer system the updated optimal price for further accomplishing the business objective.

28. An optimal price simulator system, comprising:
- logic for receiving via an input device of the computer system a price-frequency mathematical distribution of prices associated with at least one non-optimized supplier;
- logic for storing the distribution of prices in memory of the computer system;
- logic for receiving via the input device of the computer system a number of competitors, a business objective, and a cost associated with a good or service;
- logic for storing the number of competitors, business objective, and cost associated with the good or service in the memory of the computer system;
- logic for producing a set of non-optimized prices based on the distribution of prices, by selecting at least one non-optimized price for each competitor from the distribution of prices, utilizing a processor of the computer system;
- logic for calculating an optimal price based on the selected non-optimized prices, number of competitors, business objective, and cost associated with the good or service, wherein the business objective is selected from the group consisting of maximizing revenue for the good or service, maximizing gross profit for the good or service, maximizing factory utilization for the good or service, maximizing market share for the good or service, and maximizing earnings before income tax (EBIT) for the good or service, utilizing the processor of the computer system;
- logic for displaying via an output device of the computer system the calculated optimal price for accomplishing the business objective;
- logic for simulating the optimal price to generate an updated optimal price by identifying a result of utilizing the optimal price, where the result is stored, and a search is performed for the updated optimal price that optimizes a user-selected business objective selected from the group consisting of maximizing revenue for the good or service, maximizing gross profit for the good or service, maximizing factory utilization for the good or service, maximizing market share for the good or service, and maximizing earnings before interest and tax (EBIT) for the good or service, utilizing the processor of the computer system, where
- a) the result includes an expected result,
- b) the expected result is compared with an actual result,
- c) it is determined whether an optimization is required based on the comparison, and
- d) if it is determined that the optimization is required, the updated optimal price is identified; and logic for displaying via the output device of the computer system the updated optimal price for further accomplishing the business objective.

* * * * *

UNITED STATES PATENT AND TRADEMARK OFFICE
CERTIFICATE OF CORRECTION

| | | |
|---|---|---|
| PATENT NO. | : 7,209,904 B1 | Page 1 of 1 |
| APPLICATION NO. | : 10/652640 | |
| DATED | : April 24, 2007 | |
| INVENTOR(S) | : Abe | |

It is certified that error appears in the above-identified patent and that said Letters Patent is hereby corrected as shown below:

In the claims:
    Col. 29, line 31, please replace "display" with --displaying--.

Signed and Sealed this
Twelfth Day of July, 2011

David J. Kappos
*Director of the United States Patent and Trademark Office*